US012780172B2

(12) United States Patent
Yang et al.

(10) Patent No.: US 12,780,172 B2
(45) Date of Patent: Nov. 3, 2026

(54) ACTIVE COMPENSATION ALGORITHM FOR INERTIA FORCE OF ON-BOARD EQUIPMENT AND DAMPING DEVICE

(71) Applicant: Ningbo Gauss Robot Co., Ltd., Ningbo (CN)

(72) Inventors: Jiangdong Yang, Ningbo (CN); Qiyin Guo, Ningbo (CN); Miao Chen, Ningbo (CN); Pingying Wei, Ningbo (CN); Yong Xiao, Ningbo (CN); Nan Hu, Ningbo (CN); Yanjun Zeng, Ningbo (CN)

(73) Assignee: Ningbo Gauss Robot Co., Ltd., Ningbo (CN)

( * ) Notice: Subject to any disclaimer, the term of this patent is extended or adjusted under 35 U.S.C. 154(b) by 153 days.

(21) Appl. No.: 18/371,501

(22) Filed: Sep. 22, 2023

(65) Prior Publication Data

US 2024/0174212 A1 May 30, 2024

(30) Foreign Application Priority Data

Nov. 21, 2022 (CN) ......................... 202211453497.3
Dec. 2, 2022 (CN) ......................... 202223212561.7
(Continued)

(51) Int. Cl.
*B60N 2/50* (2006.01)
*A61G 3/08* (2006.01)
(Continued)

(52) U.S. Cl.
CPC ........... *B60W 10/30* (2013.01); *A61G 3/0816* (2013.01); *B60N 2/501* (2013.01);
(Continued)

(58) Field of Classification Search
CPC ........... B60W 10/30; B60W 2050/001; B60W 2050/0037; B60W 2050/0055;
(Continued)

(56) References Cited

U.S. PATENT DOCUMENTS 10,029,586 B2 7/2018 Hein
10,625,641 B2 4/2020 Park
(Continued)

FOREIGN PATENT DOCUMENTS

CN 107415788 A * 12/2017 ............. B60N 2/502
CN 113442802 A * 9/2021 ............. B60N 2/527
(Continued)

OTHER PUBLICATIONS

"Search Report of Europe Counterpart Application", issued on Jul. 19, 2024, p. 1-p. 9.

*Primary Examiner* — B M M Hannan
(74) *Attorney, Agent, or Firm* — JCIPRNET

(57) ABSTRACT

An active compensation algorithm for an inertia force of on-board equipment and a damping device are provided. The algorithm includes the following steps: a compensation angle acquisition step: acquiring an expected real-time inertia force compensation angle of a damped target when a vehicle takes a sudden turn or emergency braking based on velocity information, acceleration information, and angular velocity information of a vehicle chassis; and a control step: adjusting an angle of a damping motor by adopting a control algorithm according to the real-time inertia force compensation angle, where the damping motor keeps pace with the expected inertia force compensation angle in real time. The active compensation algorithm for the inertia force of on-board equipment can calculate the inertia force compensa-
(Continued)

tion angle of the vehicle in real time, so as to achieve a better inertia force compensation function to the damped target through the damping motor.

20 Claims, 30 Drawing Sheets

(30) Foreign Application Priority Data

| | | | |
|---|---|---|---|
| Apr. 19, 2023 | (CN) | ......................... | 202310425505.1 |
| Apr. 26, 2023 | (CN) | ......................... | 202310465987.3 |
| May 5, 2023 | (CN) | ......................... | 202310499408.7 |

(51) Int. Cl.
*B60W 10/30* (2006.01)
*B60W 50/00* (2006.01)

(52) U.S. Cl.
CPC ................. *B60W 2050/001* (2013.01); *B60W 2050/0037* (2013.01); *B60W 2050/0055* (2013.01); *B60W 2400/00* (2013.01); *B60W 2520/125* (2013.01); *B60W 2710/30* (2013.01)

(58) Field of Classification Search
CPC ....... B60W 2400/00; B60W 2520/125; B60W 2710/30; A61G 3/0816; B60N 2/501; B60N 2/24; B60N 2/527; B60N 2/39; B60N 2/067; B60N 2/146; B60N 2/34; B60N 2/504; B60N 2/508; B60N 2/52; B60N 2/0276; B60N 2/0244; B25J 9/1623; B25J 9/1638; G05B 2219/33026; G05B 2219/39199; G05B 2219/40298; G05B 2219/41151; G05B 2219/49048; G05B 13/027; G05B 2219/42034
USPC ............................................................ 701/36
See application file for complete search history.

(56) References Cited

U.S. PATENT DOCUMENTS

| | | | | |
|---|---|---|---|---|
| 11,034,269 | B2 | 6/2021 | Saigo et al. | |
| 2010/0133046 | A1* | 6/2010 | Allwardt ................. | B66B 7/123 187/251 |
| 2019/0084447 | A1* | 3/2019 | Lee .......................... | B60N 2/14 |
| 2019/0176736 | A1* | 6/2019 | Jang .................... | B60R 21/0132 |
| 2020/0130546 | A1* | 4/2020 | Foltin .................. | B60N 2/6673 |
| 2022/0001847 | A1* | 1/2022 | Masuda .................. | F16D 55/02 |
| 2022/0080952 | A1* | 3/2022 | Um ................. | B60W 30/18172 |
| 2022/0124974 | A1* | 4/2022 | Guan ................... | A01D 34/866 |

FOREIGN PATENT DOCUMENTS

| | | | | |
|---|---|---|---|---|
| CN | 114919473 A * | 8/2022 | ........... | B60N 2/0244 |
| CN | 115675214 | 2/2023 | | |
| CN | 218536441 | 2/2023 | | |
| CN | 116331077 | 6/2023 | | |
| CN | 116461397 | 7/2023 | | |
| CN | 116492155 | 7/2023 | | |
| DE | 4415585 | 1/1995 | | |
| JP | H08216747 | 8/1996 | | |

* cited by examiner

Inertia force compensation control algorithm

ACTIVE COMPENSATION ALGORITHM FOR INERTIA FORCE OF ON-BOARD EQUIPMENT AND DAMPING DEVICE

CROSS REFERENCE TO THE RELATED APPLICATIONS

This application is based upon and claims priority to Chinese Patent Applications No. 202310499408.7, filed on May 5, 2023; No. 202310425505.1, filed on Apr. 19, 2023; No. 202310465987.3, filed on Apr. 26, 2023; No. 202223212561.7, filed on Dec. 2, 2022; and No. 202211453497.3, filed on Nov. 21, 2022; the entire contents of which are incorporated herein by reference.

TECHNICAL FIELD

The present invention relates to the technical field of damping, and particularly relates to an active compensation algorithm for an inertia force of on-board equipment and a damping device.

BACKGROUND

In occasions of transporting precision instruments, blood, passengers, and the like, transported objects are often susceptible to adverse effect caused by situations such as sudden turning and jolting of vehicles. With respect to up and down pavements, a vehicle suspension system can play an attenuating role. However, there have been no intensive studies yet to overcome the adverse effect caused by sudden turning of vehicles. With respect to vehicle seats, when the vehicle takes a sudden turn, passengers will have the "feeling of being thrown away" owning to inertia, and the passengers even bump into vehicle doors to be injured in emergencies. Therefore, in many scenarios, to eliminate the adverse effect caused by the inertial motion of the vehicle on the transported objects is of great significance.

SUMMARY

To overcome the defects in the prior art, an objective of the present invention is to provide an active compensation algorithm for an inertia force of on-board equipment and a damping device.

An active compensation algorithm for an inertia force of on-board equipment provided by the present invention, including the following steps:

a compensation angle acquisition step: acquiring an expected real-time inertia force compensation angle of a damped target when a vehicle takes a sudden turn or emergency braking based on velocity information, acceleration information, and angular velocity information of a vehicle chassis; and a control step: adjusting an angle of a damping motor by adopting a control algorithm according to the real-time inertia force compensation angle, wherein the damping motor keeps pace with the expected inertia force compensation angle in real time.

Preferably, the compensation angle acquisition step includes the following specific step:

calculating the expected real-time inertia force compensation angle of the damped target by a sensor fusion algorithm when the vehicle takes a sudden turn based on the velocity information, the acceleration information, and the angular velocity information of the vehicle chassis.

Preferably, the control step includes the following specific step: adjusting an angle of a damping motor by adopting a proportional integral (PI) control algorithm according to the real-time inertia force compensation angle, wherein the damping motor keeps pace with the expected inertia force compensation angle in real time.

Preferably, the control step specifically includes the following steps:

a trajectory planning step: planning a trajectory of the damped target in a rebounding process after the vehicle turns according to a maximum inertia force compensation angle; and a PI control step: adjusting the angle of the damping motor by adopting the PI control algorithm according to the real-time inertia force compensation angle and a trajectory planning result, wherein the damping motor keeps pace with the expected inertia force compensation angle in real time.

Preferably, the compensation angle acquisition step specifically includes the following steps:

step a1: acquiring lateral acceleration, normal angular velocity and velocity information of the vehicle in an inertial space;

step a2: filtering high frequency noise of the information acquired in the step a1, and normalizing the filtered information to obtain a normalized value; and step a3: acquiring the expected inertia force compensation angle of the damping motor according to a mapping relation among the normalized value in the step a2, the vehicle velocity and the inertia force compensation angle.

Preferably, in the step a2, the high frequency noise of the acquired information is filtered by a finite impulse response (FIR) digital filter, and the filtered information is normalized by a fusion algorithm;

in the step a3, the mapping relation is a mapping model based on a wavelet neural network;

the wavelet neural network model is set as a three-layered network, including an input layer, a hidden layer, and an output layer, respectively;

there are 3 nodes in the input layer of the neural network: vehicle velocity $x_1$, normalized value $x_2$, and error feedback value $x_3$, respectively; there are 4 nodes in the hidden layer of the neural network; and there is one node in the output layer of the neural network: the inertia force compensation angle;

an output formula of the wavelet neural network model is as follows:

$$y = \sum_{j=1}^{4} w_j \left\{ 1 - \frac{1}{b_j^2} \left[ \left( \sum_{i=1}^{3} w_{ij} x_i \right) - a_j \right]^2 e^{-\frac{\frac{1}{b_j^2}\left[\left(\sum_{i=1}^{3} w_{ij} x_i\right) - a_j\right]^2}{2}} \right\}$$

where $a_j$ and $b_j$ are a compression and stretching factor and a translational factor of a wavelet basis function, respectively, $w_{ij}$ is a weight from the $i^{th}$ node of the input layer to the $j^{th}$ node of the hidden layer, $w_j$ is a weight from the $j^{th}$ node of the hidden layer to the output layer, and y is the inertia force compensation angle; and in the step a3, when the absolute value of the normalized value is greater than a preset threshold, the inertia force compensation angle of the damping motor is calculated; and when the absolute value of the normalized value is less than or equal to the preset threshold, the inertia force compensation angle of the damping motor is not calculated.

Preferably, the trajectory planning step includes the following specific step: acquiring a maximum turning angle of the damped target in an inertia force compensation stage to plan a trajectory within a preset time by taking the maximum turning angle as an initial point and a zero angle as an endpoint.

Preferably, the PI control step includes the following specific step: tracking the angle of the damping motor, wherein by taking position information of a motor encoder as a feedback signal, the damping motor keeps pace with the expected inertia force compensation angle by adjusting a proportional integral parameter.

Preferably, the active compensation algorithm for an inertia force of on-board equipment further includes a turning type detection step, specifically including: detecting a turning type of the vehicle, the turning type including general turning, consecutive turning, and S turning; wherein the general turning is turning within 90 degrees, the consecutive turning is turning consecutively within 3 seconds in a same direction, and the S turning is turning consecutively within 3 seconds in different directions;

when the turning is the consecutive turning, plus and minus signs of the normalized value calculated in a compensation angle calculation step are same within the preset time;

when the turning is the S turning, plus and minus signs of the normalized value calculated in the compensation angle calculation step are opposite within the preset time; and when the turning is the general turning, the normalized value calculated in the compensation angle calculation step appears only once within the preset time.

Preferably, the compensation angle acquisition step specifically includes the following steps:

step S1: collecting, by a sensor module, a transverse acceleration and a longitudinal acceleration of a body in real time; and step S2: establishing a dynamics model of the damped target, calculating an expected control target of a rotary driving assembly relative to the transverse acceleration and the longitudinal acceleration according to the dynamics model, and acquiring the expected real-time inertia force compensation angle when the vehicle takes the sudden turn.

Preferably, the control step is step S3, specifically comprising the following step: controlling the rotary driving assembly based on the expected control target by adopting a model predictive control (MPC) algorithm.

Preferably, the damped target is a stretcher, and the step S2 includes the following step:

setting a pitch angle of an upper table top of the stretcher relative to a base to be $\beta_h$, and a roll angle to be $\alpha_h$; then $$\tan(\beta_h + \beta_e) = \frac{F}{G} = \frac{a_y}{g}$$

where G is the gravity acting on a patient, F is a longitudinal impact force acting on the patient lying on the stretcher, $a_y$ is a longitudinal acceleration acting on a compartment, $\beta_e$ is a pitch angle of the body relative to the ground, and from the above formula, an expected value of $\beta_h$ is $$\beta_{hd} = \arctan\left(\frac{a_y}{g} - \beta_e\right)$$

in a similar way, an expected value $\alpha_{hd}$ of a roll angle of a stretcher body is $$\alpha_{hd} = \arctan\left(\frac{a_y}{g} - \alpha_e\right)$$

where $\alpha_e$ is the roll angle of the body relative to the ground.

Preferably, the step S3 includes the following steps:

step S3.1: rotating a first driving assembly and a second driving assembly according to a control decision module; and step S3.2: adjusting the control decision module in real time according to an attitude angle of the stretcher body relative to a vehicle body acquired by the sensor module in real time to track an expected trajectory;

the step S3.2 includes the following steps:

step S3.2.1: establishing dynamics equations of two axes of motion of a first rotary driving assembly and a second rotary driving assembly, and constructing a target function according to an error between a predicted output and a real output of a system; and step S3.2.2: setting rotation range constraints of the first rotary driving assembly and the second rotary driving assembly, and calculating control input quantities of the first rotary driving assembly and the second rotary driving assembly under the rotation range constraints;

the dynamics equation of the axis of motion of the first rotary driving assembly is:

$$J(\alpha_h)\ddot{\alpha}_h + C(\alpha_h,\dot{\alpha}_h)\dot{\alpha}_h + G(\alpha_h) = B(\alpha_h)u_\alpha$$

the dynamics equation of the axis of motion of the second rotary driving assembly is:

$$J(\beta_h)\ddot{\beta}_h + C(\beta_h,\dot{\beta}_h)\dot{\beta}_h + G(\beta_h) = B(\beta_h)u_\beta$$

where $u_\alpha$ is a driving force of the first rotary driving assembly, and $u_\beta$ is a driving force of the second rotary driving assembly; $J(\alpha_h)$ and $J(\beta_h)$ are respectively moment of inertia of the axes of motion of the first rotary driving assembly and the second rotary driving assembly, $C(\alpha_h,\dot{\alpha}_h)$ and $C(\beta_h,\dot{\beta}_h)$ are Coriolis force, centrifugal force, and frictional force matrixes of the first rotary driving assembly and the second rotary driving assembly, $G(\alpha_h)$ and $G(\beta_h)$ are gravity matrixes of the first rotary driving assembly and the second rotary driving assembly, and $B(\alpha_h)$ and $B(\beta_h)$ are input matrixes of the first rotary driving assembly and the second rotary driving assembly;

the target function is constructed in the following way:

the pitch angle $\beta_h$ and the roll angle $\alpha_h$ of the stretcher body are made accurate by controlling $u_\alpha$ and $u_\beta$ that the control target is an expected tracking target;

the dynamics equations are discretized using Forward Euler method to obtain:

$$\beta_h(k+1) = A_\beta(k)\beta_h(k) + B_\beta(k)u_\beta(k)$$

$$\alpha_h(k+1) = A_\alpha(k)\alpha_h(k) + B_\alpha(k)u_\alpha(k)$$

where $A_\beta(k)$, $B_\beta(k)$, $A_\alpha(k)$ and $B_\alpha(k)$ are corresponding coefficient matrixes;

the target function is constructed as follows according to the error between the predicted output and the real output of the system:

$$J(k) = \sum_{i=1}^{N_P}[\hat{\theta}(k+i|k) - \hat{\theta}_r(k+i|k)]^T Q(k)[\hat{\theta}(k+i|k) - \hat{\theta}_r(k+i|k)] + \sum_{i=1}^{N_C-1}[\Delta u(k+i|k)]^T R(k)[\Delta u(k+i|k)] + \rho\varepsilon^2,\ \theta = \beta_h \text{ or } \alpha_h$$

where $N_P$ is a predicted time domain, $N_C$ is a control time domain, Q is an error weight matrix of a control system, R is a control weight matrix of the control system, ρ is a weight coefficient, and ε is a relaxing factor; $\hat{\theta}(k+i|k)$ is an estimated value of θ on a time k+i at a time k, $\hat{\theta}_r(k+i|k)$ is a reference estimated value of θ on the time k+i at the time k, and $\Delta u(k+i|k)$ is a control quantity on the time k+i at the time k;

the step S3.2 includes the following steps:

setting motion constraints of the rotary driving assemblies as follows:

$$\begin{cases} \theta_{min}(k) \le \theta(k) \le \theta_{max}(k) \\ \Delta u_{min}(k) \le \Delta u(k) \le \Delta u_{max}(k) \end{cases}$$

where k=0, 1, . . . , $N_c-1$; $\theta_{min}(k)$ and $\theta_{max}(k)$ are respectively a minimum value and a maximum value of the output, and $\Delta u_{min}(k)$ and $\Delta u_{max}(k)$ are respectively a minimum value and a maximum value of corresponding control quantity;

converting control quantity solving into solving of the following optimized problems:

$$\min J(k)$$

s.t.

$$\theta(k+1)=A(k)\theta(k)+B(k)u(k), k=0,1, \ldots, N_{c-1}$$

$$\theta(k|k)=\theta_0(k)$$

$$\theta_{min}(k)\le\theta(k)\le\theta_{max}(k)$$

$$\Delta u_{min}(k)\le\Delta u(k)\le\Delta u_{max}(k)$$

solving the above formula at a sampling time once, wherein a series of control input increments in the control time domain obtained are:

$$\Delta U_i^* = \left[\Delta u_t^*, \Delta u_{t+1}, \ldots, \Delta u_{t+N_{c-1}}\right]^T$$

and applying the first element in the control sequence as the actual control input increment to the system, i.e., $$u(t) = u(t-1) + \Delta u_t^*.$$

Preferably, the damped target is the stretcher;

the stretcher comprises the base, the stretcher body, the sensor module, the control decision module, a passive damping module, the first rotary driving assembly, and the second rotary driving assembly;

the sensor module is arranged on the base to acquire acceleration data and an attitude of the base;

the first rotary driving assembly is fixedly arranged on the base, the second rotary driving assembly is fixedly arranged on a driving shaft of the first rotary driving assembly, the driving shaft of the first rotary driving assembly and the driving shaft of the second rotary driving assembly are connected in series and orthogonally arranged, and the driving shaft of the second rotary driving assembly is connected to the stretcher body through the passive damping module;

the control decision module is electrically connected to the sensor module, the first rotary driving assembly and the second rotary driving assembly, and the first rotary driving assembly and the second rotary driving assembly adjust an attitude of a seat body according to swing data;

the passive damping module uses an air bag; and the damping stretcher further includes a fuse device, and the fuse device is electrically connected to the first rotary driving assembly and the second rotary driving assembly for overload protection.

Preferably, the damped target is a seat;

the seat damping mechanism includes a passive damping mechanism, an active stabilizing mechanism, and a rotary slip anti-impact mechanism arranged from top to bottom in sequence, and a seat surface is mounted above the passive damping mechanism;

the passive damping mechanism drives the seat surface to be compressed or released in a direction perpendicular to the seat surface, so as to absorb a force in the direction perpendicular to the seat surface;

the active stabilizing mechanism drives the passive damping mechanism and the seat surface to perform a roll motion, so as to compensate the centrifugal force; and the rotary slip anti-impact mechanism drives the active stabilizing mechanism, the passive damping mechanism, and the seat surface to slide in a horizontal plane, so as to absorb the inertia force.

Preferably, the passive damping mechanism includes a damping seat mounting plate, a damping base, an internal intersecting arm, an external intersecting arm, and an elastic assembly;

the internal intersecting arm and the external intersecting arm are arranged between the damping seat mounting plate and the damping base, a middle portion of the internal intersecting arm is rotatably connected to a middle portion of the external intersecting arm, a lower end of the internal intersecting arm is rotatably connected to the damping base, an upper end of the internal intersecting arm is slidably connected to the damping seat mounting plate, a lower end of the external intersecting arm is slidably connected to the damping base, and an upper end of the external intersecting arm is rotatably connected to the damping seat mounting plate;

the elastic assembly acts on the internal intersecting arm and/or the external intersecting arm, and the elastic action direction of the elastic assembly is the direction perpendicular to the seat surface;

the elastic assembly includes a magnetorheological damper and an elastic part, the elastic action direction of the elastic part is the direction perpendicular to the seat surface, the magnetorheological damper acts on the internal intersecting arm and/or the external intersecting arm, and the elastic action direction of the magnetorheological damper intersects with the elastic action direction of the elastic part;

the damping base is provided with a displacement sensor for measuring a vertical distance between the damping base and the damping seat mounting plate, and the damping seat mounting plate is provided with a weight sensor for measuring the weight of an object on the damping seat mounting plate;

the active stabilizing mechanism includes a stabilizing mechanism mounting plate, a roll output plate, a driving assembly, and a master control module, and the roll output plate and the driving assembly both are mounted on the stabilizing mechanism mounting plate;

an output shaft of the driving assembly is horizontally arranged, the roll output plate is tightly connected to the output shaft of the driving assembly, and the passive damping mechanism is mounted on the roll output plate;

the master control module collects attitude data of the vehicle body, and controls the driving assembly through the attitude data of the vehicle body to drive the roll output plate to rotate; and the active stabilizing mechanism further includes a limiting buffer pad, and the limiting buffer pad defines a rotating range of the roll output plate to be ±30°.

Preferably, the rotary slip anti-impact mechanism includes a whole mechanism base, a seat sliding bottom plate, a position adjusting assembly, and a buffer assembly;

the seat sliding bottom plate is slidably mounted on the overall mechanism base, the position adjusting assembly adjusts the relative positions of the seat sliding bottom plate and the overall mechanism base, and the buffer assembly inhibits the relative motions of the seat sliding bottom plate and the overall mechanism base;

the position adjusting assembly includes two ball screw structures, and the two ball screw structures are parallelly mounted on two opposite sides of the seat sliding bottom plate respectively and slidably connected to the overall mechanism base;

the buffer assembly includes a plurality of buffer parts, and the direction of an action force of any one buffer part is parallel to a moving direction of each of the ball screw structures;

one end of any one buffer part is fixedly connected to the overall mechanism base and the other end thereof is fixedly connected to the seat sliding bottom plate and/or the position adjusting assembly; and the rotary slip anti-impact mechanism includes a rotating assembly, wherein the rotating assembly includes a seat rotating bottom plate, a rotary locking hook and a locking hook top plate, the seat rotating bottom plate is rotatably connected to the seat sliding bottom plate, and the locking hook top plate acts on the rotary locking hook to lock the seat rotating bottom plate and the seat sliding bottom plate or separate the lock the seat rotating bottom plate and the seat sliding bottom plate.

The present invention further provides a damping device, adopting the active compensation algorithm for an inertia force of on-board equipment, including a first rotating assembly and a second rotating assembly, wherein the first rotating assembly is adapted to be mounted on carrying equipment, the second rotating assembly is mounted at a driving end of the first rotating assembly, and the first rotating assembly and the second rotating assembly can drive the damped target to perform roll and pitch motions;

when the first rotating assembly drives the damped target to perform the roll motion, the second rotating assembly drives the damped target to perform the pitch motion; or when the first rotating assembly drives the damped target to perform the pitch motion, the second rotating assembly drives the damped target to perform the roll motion.

Preferably, the first rotating assembly is an active roll damping device, and the second rotating assembly is an active pitch damping device;

the damping device further includes:

a movable platform, connected to the damped target, wherein a top end of the active pitch damping device is fixedly mounted on the movable platform, and the movable platform is detachably mounted on the damped target;

a bottom platform, wherein the active pitch damping device is fixed on the bottom plate; the active pitch damping device includes a pitch motor; the bottom platform is adapted to be mounted on the carrying equipment; and a slide rail is arranged under the bottom platform and is used for adjusting a distance between the bottom platform and the carrying equipment;

the active roll damping device, arranged on the active pitch damping device and driven by the pitch motor to rotate around a rotating shaft of the pitch motor, wherein the active roll damping device includes a roll motor for driving the active roll damping device to rotate;

a damping output device, wherein the damping output device specifically includes a guide pillar and an output support, the output support is fixed on the active roll damping device, and the output support is internally provided with a guide hole;

the guide pillar passes through the guide hole and is connected to the movable platform;

the damping device further includes a sensing module and a control module, wherein the sensing module is configured to acquire motion data of the carrying equipment, and the control module is configured to receive the data of the sensing module and to control motion parameters of the damping device;

the sensing module includes an attitude sensor, and the control module includes a master control panel and a motor driver;

the attitude sensor is electrically connected to the master control panel and is configured to detect the acceleration of the damped target to generate an acceleration signal and transmit the acceleration signal to the master control panel, and the master control panel controls the motor driver according to the acceleration signal to drive the pitch motor and the roll motor to operate;

when the attitude sensor detects a linear acceleration of the damped target, the master control panel controls the motor driver according to the linear acceleration to drive the pitch motor to operate;

when the attitude sensor detects a centripetal acceleration of the damped target, the master control panel controls the motor driver according to the centripetal acceleration to drive the roll motor to operate;

the sensing module, the control module, and the damping device form a self-balancing damping device, and the damped target is arranged on the self-balancing damping device, wherein the active pitch damping device further specifically includes a pitch decelerator support, a pitch decelerator, a pitch motion output support, and a bearing pedestal;

the pitch decelerator support is fixed on the bottom platform;

one end of the pitch decelerator support is connected to the pitch motor and the other end thereof is connected to the pitch decelerator;

one end of the pitch motion output support is connected to the pitch decelerator, and the other end thereof is connected to the bearing pedestal; and the bearing pedestal is fixed on the bottom platform;

the pitch motion output support specifically includes a pitch mounting base and a motor mounting block;

one end of the pitch mounting base is fixedly mounted on the pitch decelerator, and the other end thereof extends outwards along a center of the pitch mounting base to form the motor mounting block; and the pitch mounting base and the motor mounting block form a T-shaped structure;

a roll device mounting hole is formed at a center of the motor mounting block, and the active roll damping device is mounted on the pitch motion output support through the roll device mounting hole;

the active pitch damping device further includes pitch anti-collision blocks and a pitch anti-collision pad;

the pitch anti-collision pad is mounted on the bottom platform and is located below the pitch decelerator support;

the pitch anti-collision blocks are mounted on both sides of the pitch motion output support, and rotate along with rotation of the active pitch damping device;

when the pitch anti-collision blocks impact to the pitch anti-collision pad in a rotating process, the pitch anti-collision pad is matched with the pitch anti-collision blocks to limit further rotation of the active pitch damping device;

the active roll damping device further specifically includes a roll decelerator and a roll motion output support, wherein one side of the roll motion output support is connected to the output support and the other side thereof is connected to the roll decelerator; and one side of the roll decelerator is connected to the roll motion output support and the other side thereof is connected to the pitch motion output support;

the roll motion output support specifically includes a mounting base and an output connecting block, wherein one side of the mounting base is connected to the output connecting block and the other side thereof is connected to the roll decelerator; and one end of the output connecting block is connected to the mounting base and the other end thereof is connected to the output support;

the active roll damping device further includes a damper, wherein one end of the damper is connected to the output connecting block and the other end thereof is connected to the movable platform through a revolute pair;

the roll motion output support further includes a roll anti-collision block and a roll anti-collision pad, wherein the roll anti-collision pad is arranged on a side, adjacent to the damping output device, of the pitch motion output support;

the roll anti-collision block is arranged on a side surface of the mounting base, and rotates along with rotation of the roll motor;

when the roll anti-collision block impacts to the roll anti-collision pad in a rotating process, the roll anti-collision pad limits further rotation of the active roll damping device;

an axis of rotation of the pitch motor perpendicularly intersects with an axis of rotation of the roll motor all along;

a ball guide sleeve is arranged between the output support and the guide pillar;

the output support moves up and down along the guide pillar through the ball guide sleeve; and both ends of the guide pillar are provided with limiting bosses, and when the output support impacts to the limiting bosses in the up-down moving process, the limiting bosses limit further movement of the output support towards an edge of the guide pillar.

Preferably, the damping device further includes a passive damping device; the passive damping device is an elastic damping assembly;

a top end of the elastic damping assembly is mounted on the movable platform, and a bottom end thereof is fixed on the bottom platform for applying an action force to the damped target in a height direction;

the elastic damping assembly specifically includes an air spring, wherein one end of the air spring is arranged on the movable platform and the other end thereof is arranged on the bottom platform;

the elastic damping assembly further includes an air pump, wherein the air pump is connected to the air spring, the air pump is further connected to the control module, and the control module is capable of controlling work of the air pump based on data of the sensing module, so as to control the air spring to drive the damped target to move in the height direction;

the air pump is arranged on the bottom plate and is connected to the air spring through a gas pipeline for maintaining a pressure of the air spring;

the sensing module includes an air pressure sensor, the air pressure sensor is arranged in the air spring, the control module includes an automatic air pressure inflating control panel, and the air pressure sensor is electrically connected to the automatic air pressure inflating control panel;

when the air pressure sensor detects that the air pressure in the air spring is lower than a preset air pressure, the automatic air pressure inflating control panel controls the air pump to inflate the air spring through the gas pipeline;

there are four elastic damping assemblies located at four corners of the movable platform, respectively;

the passive damping device further includes an air spring bottom pillar arranged on the bottom platform for fixedly connecting the air spring and the bottom platform;

the gas pipeline is connected to the air spring through the air spring bottom pillar;

the damping device further includes a telescopic rod, wherein one end of the telescopic rod is connected to the damped target and the other end thereof is connected to a plane where the damping device is mounted for controlling the damped target to move within a limited range in the process that the damping device controls the damped target to move; and the telescopic rod is located on an outer side of a driving end of the second rotating assembly, and the damped target is provided with a mounting plate in a position corresponding to the telescopic rod for fixing one end of the telescopic rod facing the damped target.

BRIEF DESCRIPTION OF THE DRAWINGS

By reading and referring to detailed description made by the following drawings to non-restrictive embodiments, other features, purposes and advantages of the present invention will become more obvious.

Figure 1:
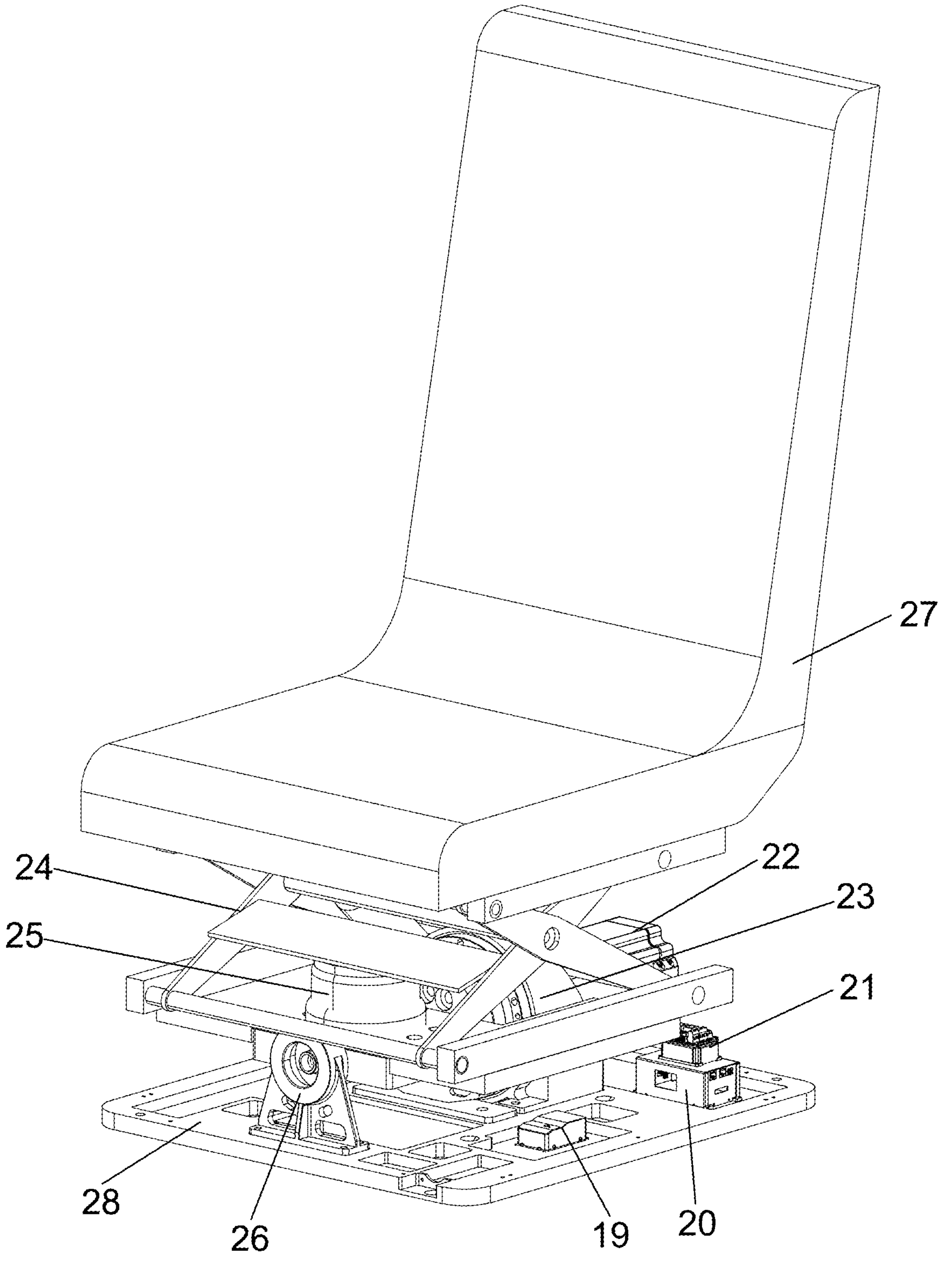
FIG. 1 is a schematic structural diagram of a device of a vibration isolation system of a vehicle in an embodiment.
Figure 2:
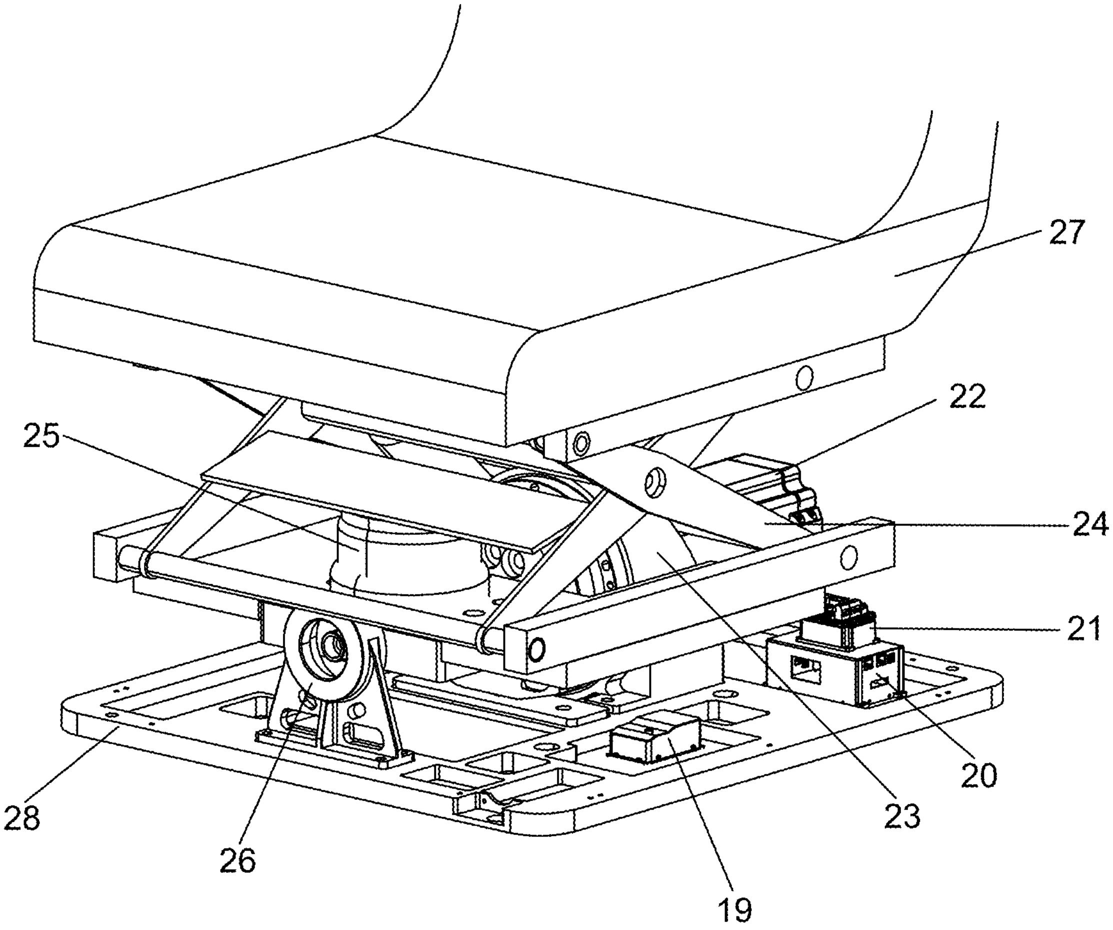
FIG. 2 is a partial enlarged drawing of FIG. 1.
Figure 3:
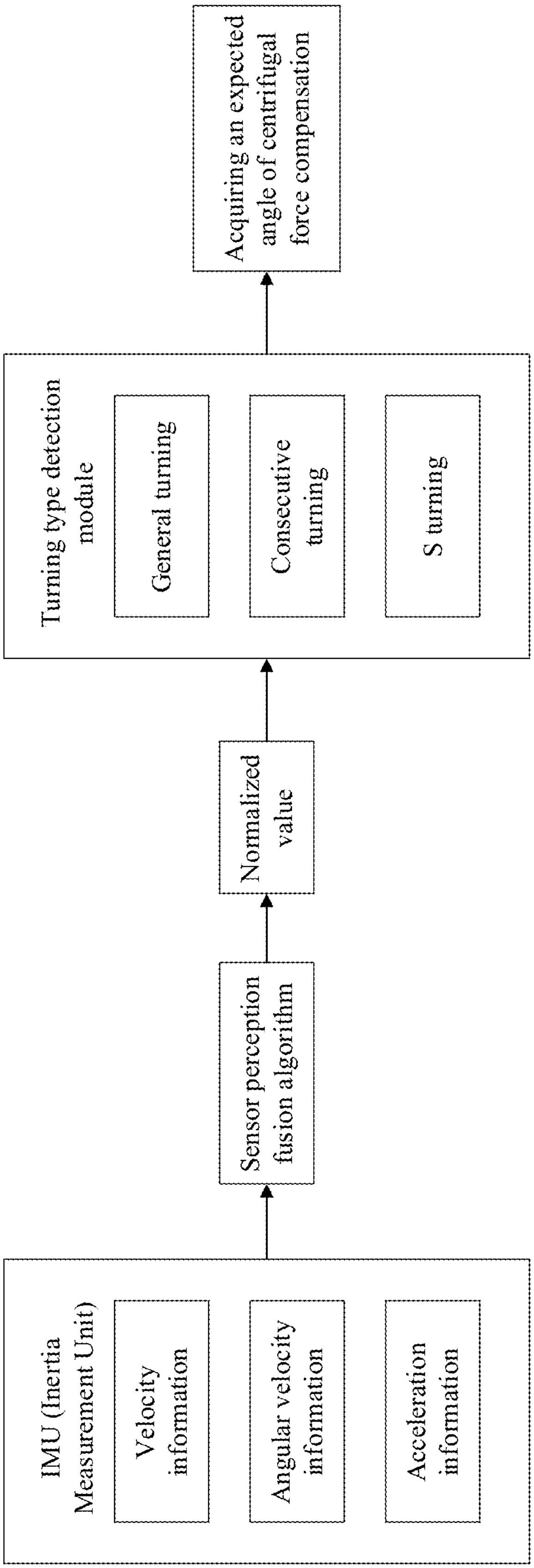
FIG. 3 is a schematic diagram of acquiring an expected angle of centrifugal force compensation.
Figure 4:
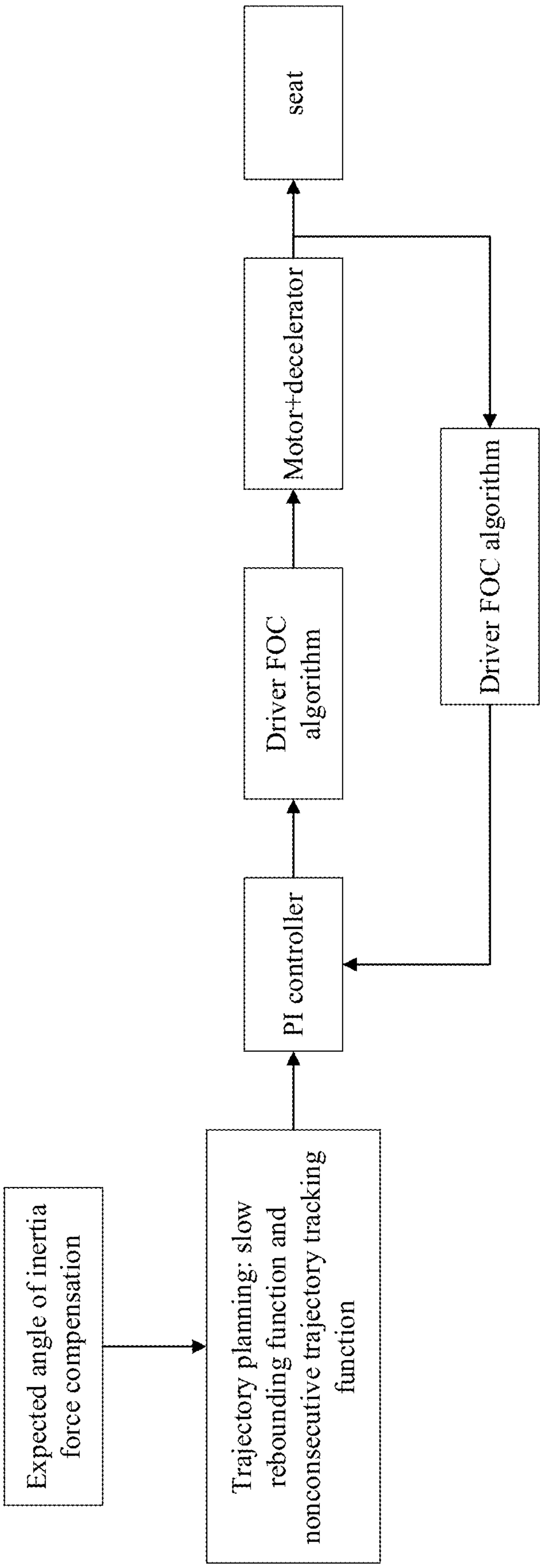
FIG. 4 is a schematic diagram of a method for controlling a centrifugal force compensation motion.

| In the drawing: | | |
|---|---|---|
| 001-seat surface; | 325-lead screw nut; | 46-bearing pedestal; |
| 101-passive damping mechanism; | 326-seat sliding slide block; | 47-pitch decelerator; |
| | | 48-pitch anti-collision |

-continued

| In the drawing: |
| --- |
| 102-damping seat mounting plate; |
| 103-damping base; |
| 104-connecting plate; |
| 105-internal intersecting arm; |
| 106-external intersecting arm; |
| 107-magnetorheological damper; |
| 108-elastic part; |
| 109-roll shaft; |
| 110-rotating pin shaft; |
| 201-active stabilizing mechanism; |
| 202-stabilizing mechanism mounting plate; |
| 203-active mounting seat; |
| 204-roll output plate; |
| 205-bearing pedestal; |
| 206-roll motor; |
| 207-reducer; |
| 208-limiting buffer pad; |
| 209-master control module; |
| 210-roll bearing; |
| 301-rotary slip anti-impact mechanism; |
| 302-overall mechanism base; |
| 303-seat sliding bottom plate; |
| 304-seat rotating bottom plate; |
| 305-rotary locking hook; |
| 306-lead screw tail stock; |
| 307-gas spring tail stock; |
| 308-structural reinforcing bar; |
| 309-ball screw; |
| 310-seat sliding motor; |
| 311-sliding motor base; |
| 312-damper mounting plate; |
| 313-buffer damper; |
| 314-gas spring fixing seat; |
| 315-buffer gas spring; |
| 316-nut mounting seat; |
| 317-bottom slide block; |
| 318-motor base connecting plate; |
| 319-locking hook top plate; |
| 320-base tray; |
| 321-seat rotating bearing; |
| 322-seat turnplate tightening nut; |
| 323-sliding sleeve; |
| 324-coupling; |
| 327-lead screw bearing; |
| 4-base; |
| 5-first motor; |
| 6-first decelerator; |
| 7-first rotary shaft; |
| 8-fuse device; |
| 9-driver and heat dissipating device; |
| 10-control decision module; |
| 11-second motor; |
| 12-second decelerator; |
| 13-second rotary shaft; |
| 14-sensor module; |
| 15-connecting frame; |
| 16-passive damping module; |
| 17-locking device; |
| 18-stretcher body; |
| 19-inertia measurement unit; |
| 20-controller; |
| 21-motor driver; |
| 22-damping motor; |
| 23-decelerator; |
| 24-scissors mechanism; |
| 25-air spring; |
| 26-rotating bearing; |
| 27-seat body; |
| 28-vehicle chassis; |
| 29-bottom platform; |
| 30-pitch motor; |
| 31-pitch decelerator support; |
| 32-movable platform; |
| 33-pitch motion output support; |
| 34-roll motor; |
| 35-air pump; |
| 36-automatic air pressure inflating control board; |
| 37-master control board; |
| 38-air spring bottom pillar; |
| 39-air spring; |
| 40-guide pillar support; |
| 41-guide pillar; |
| 42-ball guide sleeve; |
| 43-output support; |
| 44-damper; |
| 45-roll decelerator; |
| pad; |
| 49-pitch anti-collision block; |
| 50-gas pipeline; |
| 51-roll anti-collision block; |
| 52-roll anti-collision pad; |
| 53-attitude sensor; |
| 54-motor driver; |
| 55-power interface; |
| 56-air spring bottom pillar mounting hole; |
| 57-roll anti-collision pad mounting hole; |
| 58-pitch decelerator mounting hole; |
| 59-pitch anti-collision block mounting hole; |
| 60-roll limiting switch reserved hole; |
| 61-roll decelerator mounting hole; |
| 62-bearing pedestal mounting hole; |
| 63-roll motor base mounting hole; |
| 64-roll anti-collision block mounting hole; |
| 65-guide hole; |
| 66-damper mounting hole; |
| 67-roll decelerator mounting hole; |
| 68-pitch mounting base; |
| 69-motor mounting block; |
| 70-output connecting block; |
| 71-seat base; |
| 711-seat back; |
| 712-armrest; |
| 713-rubber ring; |
| 72-self-balancing damping device; |
| 721-sensing module; |
| 722-damping device; |
| 7221-first rotating assembly; |
| 7222-second rotating assembly; |
| 7223-elastic damping assembly; |
| 72231-air spring; |
| 72232-air pump; |
| 7224-telescopic rod; |
| 7225-mounting plate; |
| 723-control module; |
| 73-base; |
| 74-slide rail; |
| 75-fixed plate. |

DETAILED DESCRIPTION OF THE EMBODIMENTS

The present invention will be described in detail below in combination with specific embodiments. The embodiments below contribute to further understanding the present invention by those skilled in the art but do not limit the present invention in any form. It should be noted that variations and improvements still can be made by those skilled in the technical field without departing the concept of the present invention. These fall into the scope of protection of the present invention.

Embodiment 1

Figure 5:
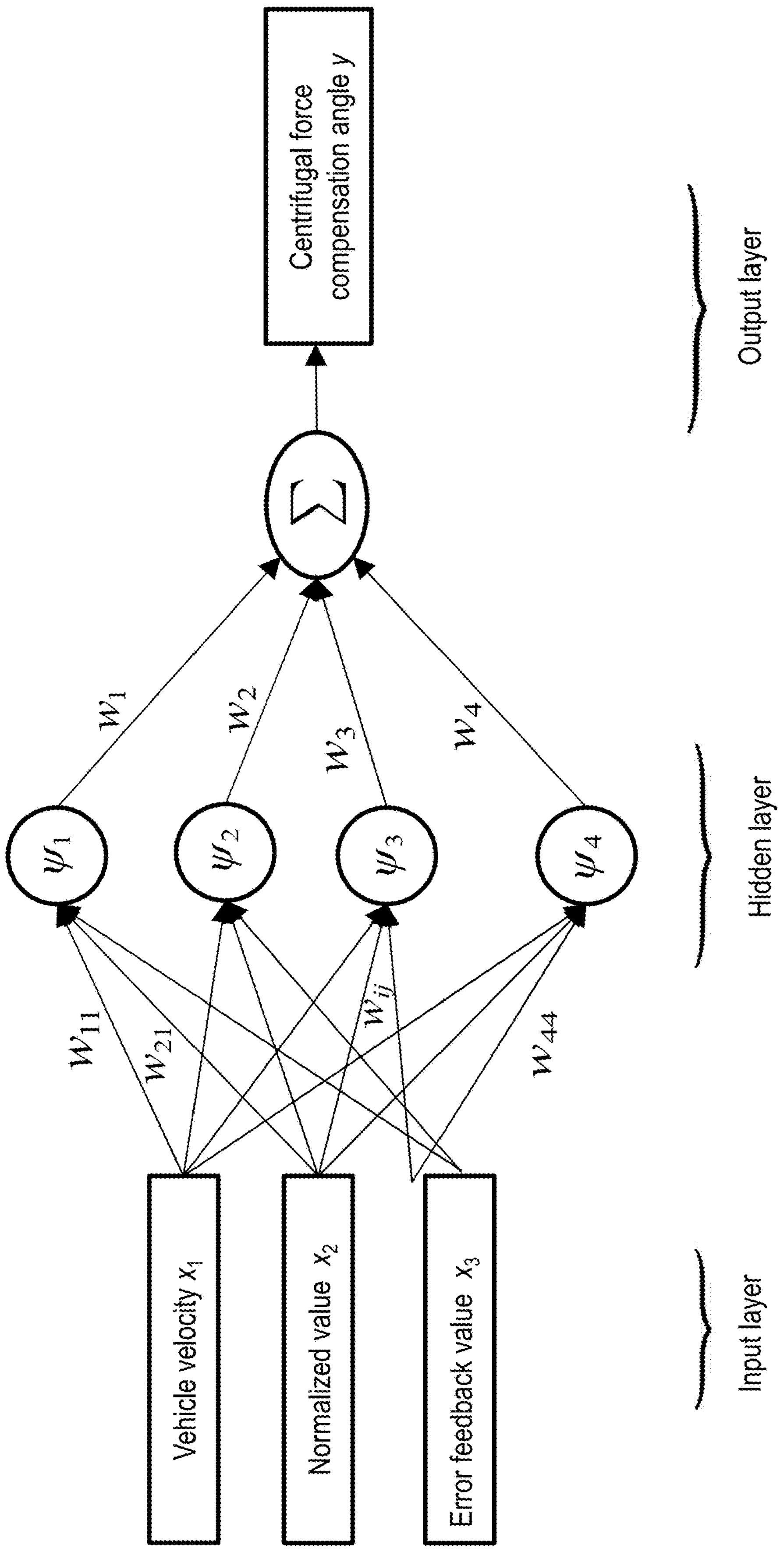
FIG. 5 is a schematic diagram of a mapping relation.

As shown in FIGS. 1-5, the embodiment of the present invention provides an active compensation algorithm for an inertia force of on-board equipment, including the following steps:

a compensation angle calculation step: an expected real-time inertia force compensation angle of a damped target when the vehicle takes a sudden turn is calculated by a sensor fusion algorithm based on velocity information, acceleration information, and angular velocity information of a vehicle chassis; wherein the compensation angle calculation step specifically includes the following steps:

step a1: lateral acceleration, normal angular velocity and velocity information of the vehicle in an inertial space are acquired;

step a2: high frequency noise of the information acquired in the step a1 is filtered; the filtered information is normalized to obtain a normalized value; the high frequency noise of the acquired information is filtered by an FIR digital filter; and the filtered information is normalized by a fusion algorithm;

step a3: the expected centrifugal force compensation angle of the damping motor is acquired according to a mapping relation among the normalized value in the step a2, the vehicle velocity and the centrifugal force compensation angle; when the absolute value of the normalized value is greater than a preset threshold, the centrifugal force compensation angle of the damping motor is calculated, with the preset threshold being 0.1; and when the absolute value of the normalized value less than or equal to the preset threshold, the centrifugal force compensation angle of the damping motor is not calculated, with the preset threshold being 0.1;

in the step a3, the mapping relation is a mapping model based on a wavelet neural network model. As shown in FIG. 5, the wavelet neural network model is set as a three-layered network with an input layer, a hidden layer, and an output layer, respectively, so that the realtime of the control process is guaranteed; there are 3 nodes in the input layer of the neural network: vehicle velocity $x_1$, normalized value $x_2$, and error feedback value $x_3$, respectively; there are 4 nodes in the hidden layer of the neural network; and there is one node in the output layer of the neural network: the centrifugal force compensation angle; an output formula of the wavelet neural network model is:

$$y=\sum_{j=1}^{4} w_j\left\{1-\frac{1}{b_j^2}\left[\left(\sum_{i=1}^{3} w_{ij}x_i\right)-a_j\right]^2 e^{-\frac{\frac{1}{b_j^2}\left[\left(\sum_{i=1}^{3} w_{ij}x_i\right)-a_j\right]^2}{2}}\right\}$$

where $a_j$ and $b_j$ are a compression and stretching factor and a translational factor of a wavelet basis function, respectively, $w_{ij}$ is a weight from the $i^{th}$ node of the input layer to the $j^{th}$ node of the hidden layer, $w_j$ is a weight from the $j^{th}$ node of the hidden layer to the output layer, and y is the centrifugal force compensation angle;

a trajectory planning step: a trajectory of a seat body in the rebounding process is planned after the vehicle turns according to the maximum centrifugal force compensation angle; the trajectory planning step specifically includes the following step: a maximum turning angle of the seat body in an centrifugal force compensation stage is acquired to plan the trajectory within a preset time by taking the maximum turning angle as an initial point and a zero angle as an endpoint, wherein the preset time is 3-4 s;

a PI control step: the angle of the damping motor is adjusted according to the real-time centrifugal force compensation angle and a trajectory planning result, wherein the damping motor keeps pace with the expected centrifugal force compensation angle in real time; and the PI control step includes the following specific step: the angle of the damping motor tracked, wherein by taking position information of a motor encoder as a feedback signal, the damping motor keeps pace with the expected centrifugal force compensation angle by adjusting a proportional integral parameter.

The method for controlling an active and passive vibration isolation system device of an automobile in the embodiment further includes a turning type detection step, specifically including: detecting a turning type of the vehicle, the turning type including general turning, consecutive turning, and S turning; wherein the general turning is turning within 90 degrees, the consecutive turning is turning consecutively within 3 seconds in a same direction, and the S turning is turning consecutively within 3 seconds in different directions;

when the turning is the consecutive turning, plus and minus signs of the normalized value calculated in a compensation angle calculation step are same within the preset time of 3 s; when the turning is the S turning, plus and minus signs of the normalized value calculated in the compensation angle calculation step are opposite within the preset time of 3 s; and when the turning is the general turning, the normalized value calculated in the compensation angle calculation step appears only once within the preset time of 3 s.

The embodiment further provides a vibration isolation system for an automobile seat, adopting the active centrifugal force compensation control algorithm for the automobile seat, including a control assembly, a damping motor 22, a scissors mechanism 24, and an air spring 25, wherein the scissors mechanism 24 is rotatably arranged on a vehicle chassis 28, a seat body 27 is connected to the vehicle chassis 28 through the scissors mechanism 24, the damping motor 22 drives the scissors mechanism 24 to rotate, the air spring 25 is arranged on the scissors mechanism 24 and is used for buffering compression of the scissors mechanism 24 between the vehicle chassis 28 and the seat body 27, and the control assembly is electrically connected to the damping motor 22 and is used for adjusting rotation of the damping motor 22.

The control assembly includes an inertia measurement unit 19, a controller 20, and a motor driver 21, wherein the inertia measurement unit 19 is electrically connected to the controller 20, the controller 20 is electrically connected to the motor driver 3, and the motor driver 21 is electrically connected to the damping motor 22.

The vehicle chassis 28 is provided with a mounting base, and the scissors mechanism 24 is arranged on the mounting base through a rotating bearing 26.

The scissors mechanism 24 includes a first connecting plate, a first scissors structure, a second scissors structure, and a second connecting plate, wherein the first connecting plate and the second connecting plate are connected through the first scissors structure and the second scissors structure, both ends of the first connecting plate are rotatably arranged on the mounting base through the rotating bearing 26, the second connecting plate is connected to the seat body 27, the damping motor 22 drives the first connecting plate to rotate to further drive the whole scissors mechanism 24 to rotate, so as to drive the seat body 27 to rotate, a driving end of the damping motor 22 is provided with a decelerator 23, and the first connecting plate is connected to the decelerator 23.

The air spring 25 is arranged on the first connecting plate, a compression plate is connected between the first scissors structure and the second scissors structure, and the end, away from the air spring 25, of the first connecting plate is connected to the compression plate.

The scissors mechanism 24 is further provided with a damper, through which a slow rebounding process can be achieved.

Embodiment 2

Those skilled in the art can construe the embodiment as a more specific description of the embodiment 1.

As shown in FIGS. 1-5, the embodiment provides an active centrifugal force compensation control algorithm and an active and passive vibration isolation system in a complicated scenario. The algorithm is an active compensation algorithm for on-board equipment.

The centrifugal force compensation control algorithm in the embodiment mainly includes a sensor fusion algorithm, trajectory planning, and PD control.

The centrifugal force compensation control algorithm can achieve centrifugal force motion compensation in various complicated road conditions such as general turning, consecutive turning and S turning; the general turning is turning within 90 degrees, the consecutive turning is turning consecutively within 3 seconds in a same direction, and the S turning is turning consecutively within 3 seconds in different directions.

An active and passive hybrid damping system mainly includes an IMU (Inertial Measurement Unit), a controller, a driver, a motor, a decelerator, a scissors mechanism, an air spring, a damper, and a seat.

The centrifugal force compensation control algorithm:

the sensor fusion algorithm is mainly used for calculating an expected centrifugal force compensation angle when a vehicle takes a sudden turn. First, lateral acceleration, a normal angular velocity, and velocity information of a vehicle in an inertial space is acquired; high frequency noise of the acquired information is filtered by an FIR digital filter; then the two types of the filtered information are normalized by adopting the fusion algorithm; and finally, the excepted angle of the motor is acquired according to a mapping relation among a normalized value, a vehicle velocity, and a centrifugal force compensation angle. To guarantee the anti-interference performance of the system, can the centrifugal force compensation angle of the motor be calculated only when the absolute value of the normalized value is greater than a certain threshold.

A trajectory planning algorithm is used for acquiring a maximum turning angle of the seat in the previous step first in the process that the seat rebounds slowly after the vehicle turns, and then planning a trajectory within a longer time by taking the maximum turning angle as an initial point and a zero angle as an endpoint, which aims to alleviate the discomfort when the seat rebounds rapidly.

The PI control is used for tracking the angle of the damping motor, wherein by taking position information of a coder as a feedback signal, the motor keeps pace with the expected angle by adjusting a proportional integral parameter.

The turning type detection module is arranged in the centrifugal force compensation control algorithm to differentiate general turning, consecutive turning, and S turning. When the turning is the consecutive turning, plus and minus signs of the normalized value calculated by a sensor fusion algorithm are same within a short time; when the turning is the S turning, plus and minus signs of the normalized value calculated by the sensor fusion algorithm are opposite within the short time; and when the turning is the general turning, the normalized value appears only once within the short time.

The following beneficial effects are achieved by the embodiments 1 and 2:

(1) the compensation method has a centrifugal force compensation function for the vehicle in various complicated road conditions, and the sensor fusion perception algorithm integrates the acceleration, angular velocity, and velocity information of the vehicle chassis to calculate the compensation angles needed at different turning radii and curve curvatures, so that the application range is wide;

(2) the centrifugal force compensation motion control algorithm features high anti-interference performance and stable and reliable tracking precision and response speed under different loads, and has a load adaptive capacity, and thanks to the slow rebounding function after the vehicle turns, it has the functions of alleviating impact and enhancing the riding comfort; and (3) the scissors mechanism and the air spring are combined in the passive vibration isolation system; when there is high frequency vertical vibration, the air spring will play a passive damping role, so that influence of the high frequency vertical vibration on the riding comfort is alleviated.

Embodiment 3

The embodiment provides an active inertia force compensation algorithm for on-board equipment, and a damping stretcher. Compared with the active inertia force compensation algorithm for on-board equipment in the embodiment 1 or 2, the acquired centrifugal force compensation angle and the control algorithm adopted are different in the active inertia force compensation algorithm for on-board equipment in the embodiment.

Figure 6:
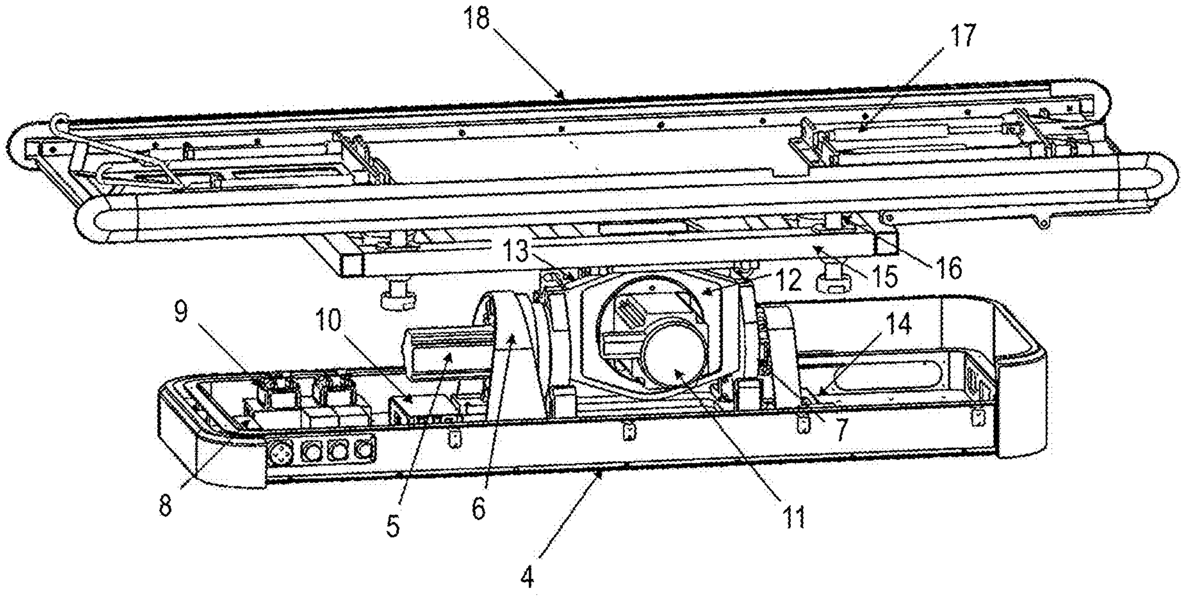
FIG. 6 is a schematic diagram of an overall structure of an active and passive hybrid damping stretcher in the present invention.

The damping stretcher in the embodiment is applicable to an ambulance. As shown in FIG. 6, the damping stretcher includes a base 4, a stretcher body 18, a sensor module 14, a control decision module 10, a passive damping module 16, a first rotary driving assembly, and a second rotary driving assembly.

The base 4 is used for fixing the stretcher on a bottom plate of the ambulance, the sensor module 14 is arranged on the base 4 to acquire acceleration data and an attitude angle of the base 4, the acceleration data including a transverse acceleration and a longitudinal acceleration. The sensor module 14 can be an IMU module.

The first rotary driving assembly is used for controlling a roll degree of freedom of the stretcher body 18, including a first motor 5, a first decelerator 6, and a first rotary shaft 7. The second rotary driving assembly is used for controlling a pitch degree of freedom of the stretcher body 18, including a second motor 11, a second decelerator 12, and a second rotary shaft 13. The first rotary driving assembly is fixedly arranged on the base 4, the second rotary driving assembly is fixedly arranged on the rotary shaft 7 of the first rotary driving assembly, the rotary shaft 7 of the first rotary driving assembly and a second rotary shaft 13 of the second rotary driving assembly are connected in series and orthogonally arranged, and the second rotary shaft 13 of the second rotary driving assembly is connected to the stretcher body 18 through the passive damping module, and the passive damping module 16 adopts an air spring.

The active and passive hybrid damping stretcher for the ambulance includes a connecting frame 15, wherein the connecting frame 15 is fixedly connected to the second rotary shaft, the connecting frame 15 is movably connected to the stretcher body 18, and the passive damping module 13 is arranged between the stretcher body 18 and the connecting frame 15 and is used for providing a vertical passive degree of freedom of the upper table of the stretcher body 18. The stretcher body 18 is further provided with a locking device 17 for locking the ambulance stretcher that conveys a patient.

The control decision module 10 is electrically connected to the sensor module 14, the first rotary driving assembly and the second rotary driving assembly, and the first rotary driving assembly and the second rotary driving assembly adjust the attitude of the seat body according to swing data.

The damping stretcher further includes a fuse device 8, the fuse device 8 being electrically connected to the first rotary driving assembly and the second rotary driving assembly for overload protection; and a driver and a heat dissipating device 9 for driving the first rotary driving assembly and the second rotary driving assembly.

Figure 7:
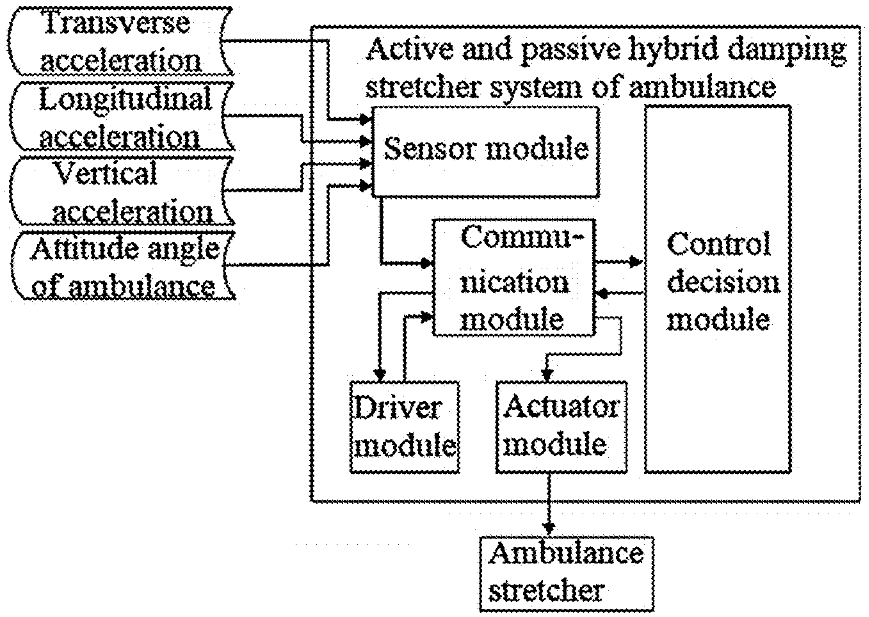
FIG. 7 is a system block diagram of the active and passive hybrid damping stretcher in the present invention.

Referring to FIG. 7, it shows a general control method for the active and passive hybrid damping stretcher for the ambulance, wherein the sensor module 14 acquires the transverse acceleration and the longitudinal acceleration in the inertial space of the ambulance in real time first, and the sensor data measured by the sensor is sent to the control decision module 10 through the communication module. The control decision module determines the target attitude of the upper table of the stretcher relative to the ambulance body by analyzing the sensor data. Therefore, the driver module controls the motor to rotate according to the control decision of the control decision module 10. Finally, the control decision module 10 is adjusted in real time according to an attitude angle of the stretcher body relative to the vehicle body acquired by the sensor module 14 in real time to track an expected trajectory precisely.

Figure 8:
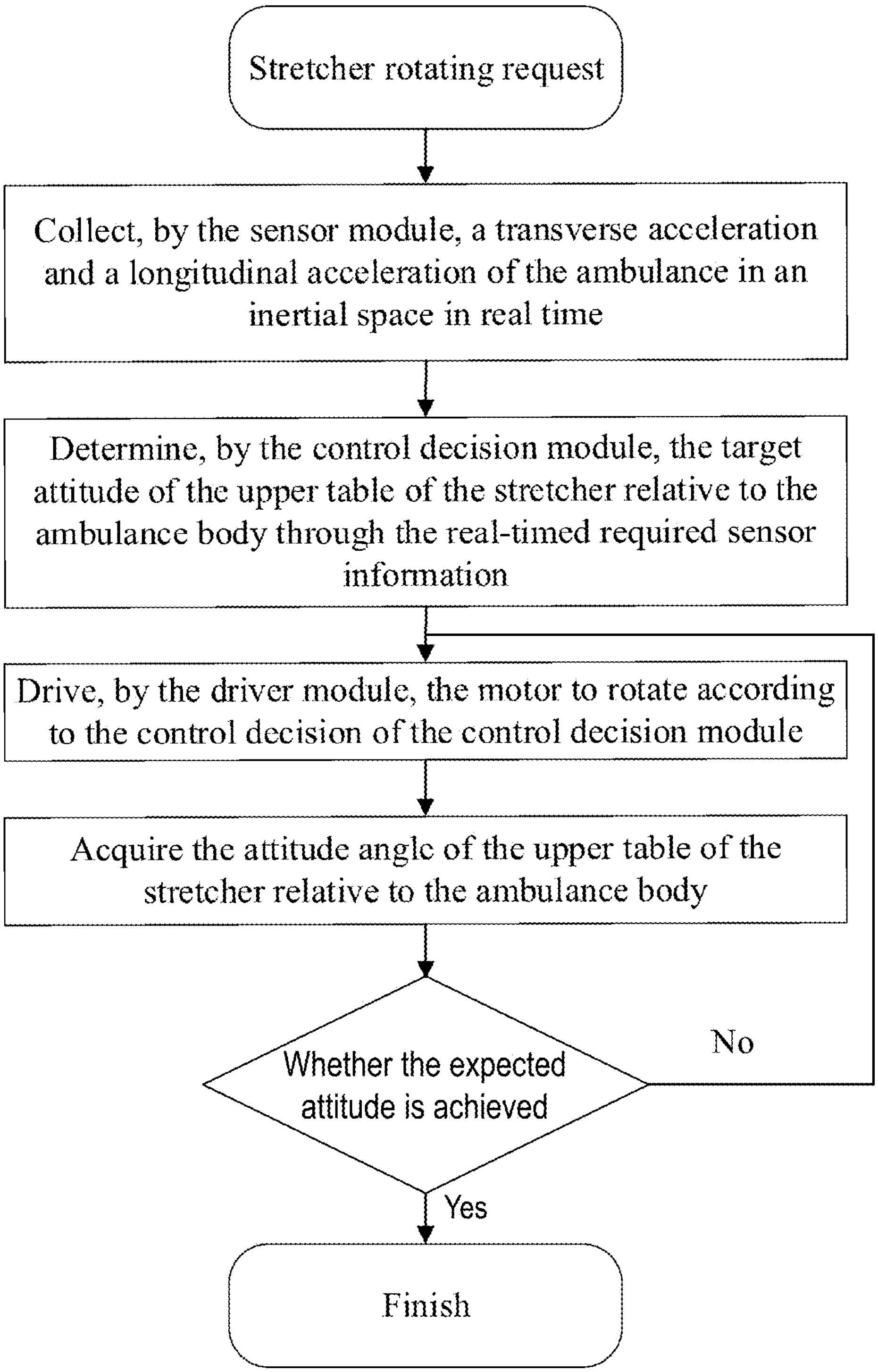
FIG. 8 is a control flow chart of the active and passive hybrid damping stretcher in the present invention.

Specifically, as shown in FIG. 8, the method includes the following steps:

step S1: the sensor module 14 collects a transverse acceleration and a longitudinal acceleration of a body in real time;

step S2: a dynamics model of the stretcher body 18 is established, and an expected control target of a rotary driving assembly relative to the transverse acceleration and the longitudinal acceleration is calculated according to the dynamics model; and step S3: the rotary driving assembly is controlled based on the expected control target by adopting an MPC control algorithm.

The step S3 includes the following steps:

step S3.1: a first driving assembly and a second driving assembly rotate according to a control decision module 10;

step S3.2: the control decision module 10 is adjust in real time according to an attitude angle of the stretcher body 18 relative to a vehicle body acquired by the sensor module 14 in real time to track an expected trajectory;

step S3.2.1: dynamics equations of two axes of motion of a first rotary driving assembly and a second rotary driving assembly are established, and a target function is constructed according to an error between a predicted output and a real output of a system; and step S3.2.2: rotation range constraints of the first rotary driving assembly and the second rotary driving assembly are set, and control input quantities of the first rotary driving assembly and the second rotary driving assembly are calculated under the rotation range constraints.

The control method for the active and passive hybrid damping stretcher is specifically described below.

Figure 9:
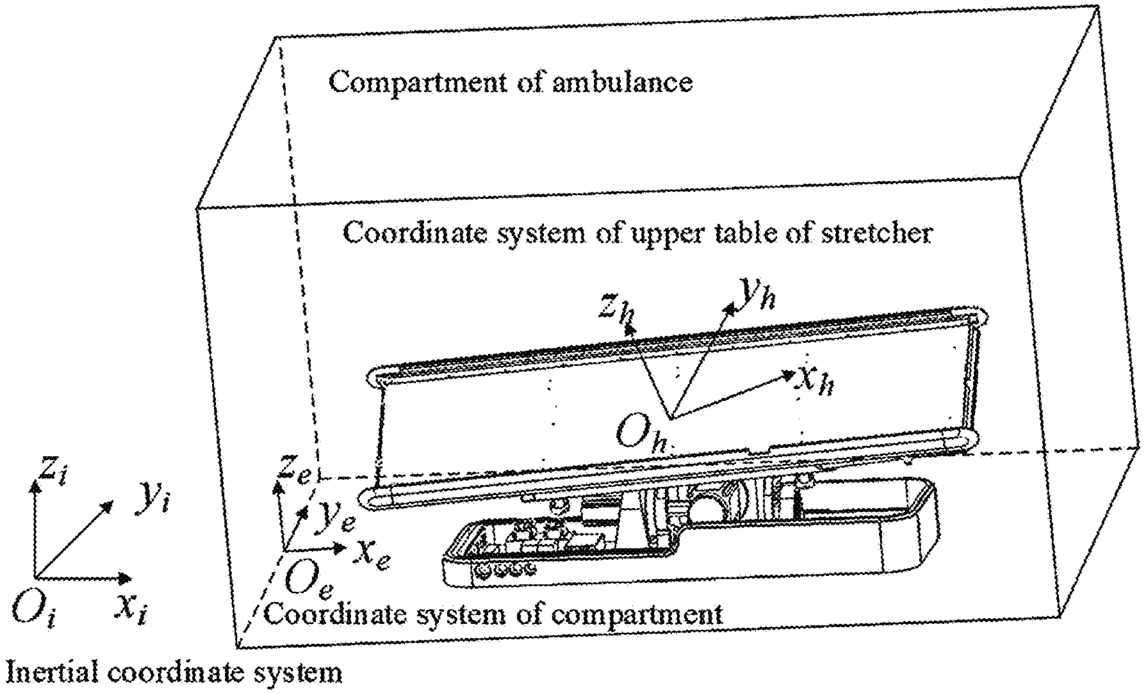
FIG. 9 is a model diagram of the stretcher in an inertial coordinate system in the present invention.

The dynamics model and control targets:

As shown in FIG. 9, it shows a model of the active and passive hybrid damping stretcher in the inertial coordinate system in the embodiment, where $O_ix_iy_iz_i$ is the inertial coordinate system, $O_ex_ey_ez_e$ is the compartment coordinate system of the ambulance, and $O_hx_hy_hz_h$ is the coordinate system of the upper table of the stretcher, i.e., the coordinate system of the stretcher where the patient lies down.

In the process of sudden accelerating, sudden braking, and sudden turning of the ambulance, owing to suspension between the compartment and the wheels of the ambulance, there will be an angle between the compartment coordinate system $O_ex_ey_ez_e$ and the inertial coordinate system $O_ix_iy_iz_i$. The pitch angle of the angle rotating around the y-axis direction is set to be $\beta_e$, and the roll angle of the angle rotating around the x-axis direction is set to be $\alpha_e$. The longitudinal acceleration acting on the compartment in the sudden accelerating and sudden braking processes is set to be $a_y$, and the transverse acceleration acting on the compartment in the turning process is set to be $a_x$.

According to Newton's second law, in the forwarding direction of the ambulance, the impact force caused by sudden acceleration and sudden braking on the patient lying on the stretcher is:

$$F=ma_y \tag{1}$$

To counteract the impact of the above acceleration $a_y$ on the patient on the upper platform, the upper platform move actively at the pitch degree of freedom to generate a compensation acceleration to counteract the impact.

The pitch angle of the upper table top of the stretcher relative to a base 4 is set to be $\beta_h$, and a roll angle to be $\alpha_h$, then $$\tan(\beta_h+\beta_e)=\frac{F}{G}=\frac{a_y}{g} \tag{2}$$

where G is the gravity acting on the patient.

It can be known from (2) that the expected value of $\beta_h$ is:

$$\beta_{hd}=\arctan\left(\frac{a_y}{g}-\beta_e\right) \tag{3}$$

In a similar way, to counteract the impact on the patient by the acceleration $a_x$ of the compartment during sudden turning, the expected value $\alpha_{hd}$ of the roll angle of the upper platform is:

$$\alpha_{hd}=\arctan\left(\frac{a_x}{g}-\alpha_e\right) \tag{4}$$

Equations (3) and (4) are the control expected targets of the two rotating mechanisms in the embodiment.

The air bag in the embodiment can provide vertical passive damping when the ambulance drives on a bumpy pavement to reduce the vertical impact of the compartment on the human body.

The MPC control algorithm:

1. Algorithm Control Logic

An MPC controller is an advanced control method, which generates a control output by predicting a dynamic model of the system. The MPC generates the control output by introducing a trajectory reference signal in the control system and predicting the system model, so as to control the reference trajectory of the system.

Figure 10:
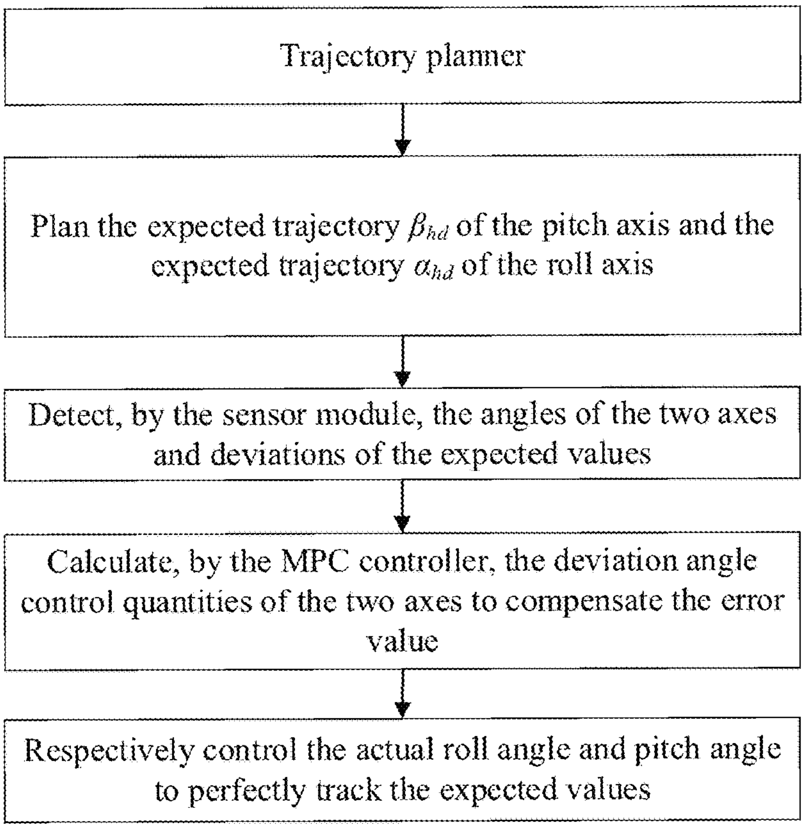
FIG. 10 is a flow chart of controlling two driving shafts by an MPC control algorithm in the present invention.

FIG. 10 below gives a specific control logic of the MPC control algorithm on the two driving shafts of the stretcher in the embodiment.

In each sampling period, the MPC controller calculates the optimum control output by predicting the dynamic model of the system, so that the pitch angles $\beta_h$ and the roll angles $\alpha_h$ of the two driving shafts approach to the expected trajectories $\beta_{hd}$ and $\alpha_{hd}$ as far as possible respectively, and finally, the reference trajectory is precisely tracked.

The tracking target function is designed first below according to the dynamics equation of the system, then the constraint condition is designed accounting for the structure and safety of the stretcher in the actual engineering, and finally, the optimum equation of the system is solved to obtain the control quality of the system, thereby precisely tracking the two driving shafts by the stretcher.

2. Target Function Design

The two rotating shafts in the embodiment intersect at one point. As the two degrees of freedom are decoupled, the two shafts can be controlled independently.

The dynamics equation of the axis of motion of the first rotary driving assembly is:

$$J(\beta_h)\ddot{\beta}_h+C(\beta_h,\dot{\beta}_h)\dot{\beta}_h+G(\beta_h)=B(\beta_h)u_\beta \tag{5}$$

The dynamics equation of the axis of motion of the second rotary driving assembly is:

$$J(\alpha_h)\ddot{\alpha}_h+C(\alpha_h,\dot{\alpha}_h)\dot{\alpha}_h+G(\alpha_h)=B(\alpha_h)u_\alpha \tag{6}$$

where $u_\alpha$ is a driving force of the first rotary driving assembly, and $u_\beta$ is a driving force of the second rotary driving assembly; $J(\alpha_h)$ and $J(\beta_h)$ are respectively moment of inertia of the axes of motion of the first rotary driving assembly and the second rotary driving assembly $C(\alpha_h,\dot{\alpha}_h)$ and $C(\beta_h,\dot{\beta}_h)$ are Coriolis force, centrifugal force, and frictional force matrixes of the first rotary driving assembly and the second rotary driving assembly $G(\alpha_h)$ and $G(\beta_h)$ are gravity matrixes of the first rotary driving assembly and the second rotary driving assembly, and $B(\alpha_h)$ and $B(\beta_h)$ are input matrixes of the first rotary driving assembly and the second rotary driving assembly.

The pitch angle $\beta_h$ and the roll angle $\alpha_h$ of the stretcher body (18) are made accurate by controlling $u_\alpha$ and $u_\beta$, so that the control target is an expected tracking target, i.e., the formulae (3) and (4).

The dynamics equations (5) and (6) are discretized using the Forward Euler method to acquire:

$$\beta_h(k+1)=A_\beta(k)\beta_h(k)+B_\beta(k)u_\beta(k) \tag{7}$$

$$\alpha_h(k+1)=A_\alpha(k)\alpha_h(k)+B_\alpha(k)u_\alpha(k) \tag{8}$$

where $A_\beta(k)$, $B_\beta(k)$, $A_\alpha(k)$ and $B_\alpha(k)$ are corresponding coefficient matrixes;

the target function is constructed as follows according to the error between the predicted output and the real output of the system:

$$J(k)=\sum_{i=1}^{N_P}[\hat{\theta}(k+i|k)-\hat{\theta}_r(k+i|k)]^T Q(k)[\hat{\theta}(k+i|k)-\hat{\theta}_r(k+i|k)]+\sum_{i=1}^{N_C-1}[\Delta u(k+i|k)]^T R(k)[\Delta u(k+i|k)]+\rho\varepsilon^2,\ \theta=\beta_h \text{ or } \alpha_h \tag{9}$$

where $N_P$ is a predicted time domain, $N_C$ is a control time domain, Q is an error weight matrix of a control system, R is a control weight matrix of the control system, $\rho$ is a weight coefficient, and $\varepsilon$ is a relaxing factor; $\hat{\theta}(k+i|k)$ is an estimated value of $\theta$ on a time k+i at a time k, $\hat{\theta}_r(k+i|k)$ is a reference estimated value of $\theta$ on the time k+i at the time k, and $\Delta u(k+i|k)$ is a control quantity on the time k+i at the time k.

3. Constraint Condition Design

In considering the structure and safety of the stretcher in the engineering, the pitch angle $\beta_h$ and the roll angle $\alpha_h$ are restrained. In the embodiment, the pitch angle and the roll angle are respectively restrained at −15 degrees and 20 degrees, and the roll angle is restrained at ±20 degrees. Therefore, the constraints of the two active degrees-of-freedom robots in the motion process are:

$$\begin{cases}\theta_{min}(k)\le\theta(k)\le\theta_{max}(k)\\ \Delta u_{min}(k)\le\Delta u(k)\le\Delta u_{max}(k)\end{cases} \tag{10}$$

where k=0, 1, . . . , $N_c-1$; $\theta_{min}(k)$ and $\theta_{max}(k)$ are respectively a minimum value and a maximum value of the output, and $\Delta u_{min}(k)$ and $\Delta u_{max}(k)$ are respectively a minimum value and a maximum value of corresponding control quantity;

converting control quantity solving into solving of the following optimized problems:

$$\min J(k)$$

$$\text{s.t.}$$

$$\theta(k+1)=A(k)\theta(k)+B(k)u(k),k=0,1,\ldots,N_{c-1}$$

$$\theta(k|k)=\theta_0(k)$$

$$\theta_{min}(k)\le\theta(k)\le\theta_{max}(k)$$

$$\Delta u_{min}(k)\le\Delta u(k)\le\Delta u_{max}(k) \tag{11}$$

solving the above formula at a sampling time once, wherein a series of control input increments in the control time domain obtained are:

$$\Delta U_t^*=\left[\Delta u_t^*,\Delta u_{t+1},\ldots,\Delta u_{t+N_{c-1}}^*\right]^T \tag{12}$$

and applying the first element in the control sequence as the actual control input increment to the system, i.e., $$u(t)=u(t-1)+\Delta u_t^* \tag{13}$$

Figure 11:
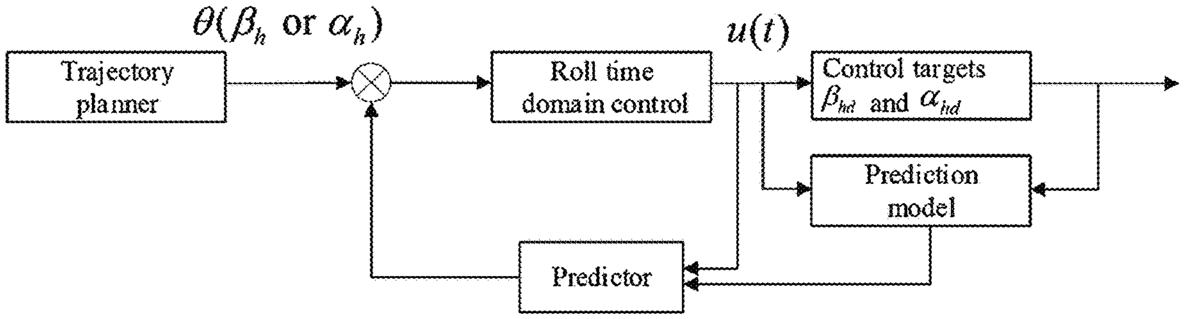
FIG. 11 is a block diagram of the MPC control algorithm in the present invention.

After entering the next control period, the above processes are repeated and cycled in turn to track and control the trajectory with two active degrees-of-freedom. The block diagram of the control algorithm is shown in FIG. 11.

The using effect of the active and passive hybrid damping stretcher for the ambulance disclosed in the embodiment is verified below.

To verify the validness of the mechanism and the MPC algorithm in the embodiment, the active and passive hybrid damping stretcher in the embodiment is mounted on a certain ambulance for actual road test. IMUs are respectively mounted in the compartment and on the upper table of the stretcher of the ambulance. Under the road condition of sudden braking and sudden turning, the longitudinal and transverse damping efficiencies are calculated according to different measured values of the two IMUs. Meanwhile, the vertical passive damping effect is also calculated.

Longitudinal Acceleration Attenuation Efficiency.

The ambulance travels on an urban grade B pavement, and takes sudden braking at vehicle velocities of 20 km/h, 30 km/h, 40 km/h, and 50 km/h. The damping results are shown in table 1:

TABLE 1

Longitudinal acceleration attenuation efficiency of the active and passive hybrid damping stretcher
Longitudinal acceleration attenuation efficiency of the active and passive hybrid damping stretcher

| Tested vehicle velocity | Upper table of stretcher | Compartment bottom | Attenuation efficiency |
|---|---|---|---|
| Sudden braking at 20 km/h | 1.457 $m/s^2$ | 2.449 $m/s^2$ | 40.51% |
| Sudden braking at 30 km/h | 2.241 $m/s^2$ | 3.869 $m/s^2$ | 42.08% |
| Sudden braking at 40 km/h | 2.282 $m/s^2$ | 4.303 $m/s^2$ | 46.97% |
| Sudden braking at 50 km/h | 2.941 $m/s^2$ | 6.212 $m/s^2$ | 52.66% |

It can be obtained from the above table that the higher the vehicle velocity is, the higher the longitudinal acceleration attenuation efficiency of the active and passive hybrid damping stretcher is, and the attenuation efficiency at 50 km/h is the highest: 52.66%.

Transverse Acceleration Attenuation Efficiency.

The ambulance takes sudden turns at vehicle velocities of 20 km/h, 30 km/h, 40 km/h, and 50 km/h. The damping results are shown in table 2:

TABLE 2

Transverse acceleration attenuation efficiency of the active and passive hybrid damping stretcher
Transverse acceleration attenuation efficiency of the active and passive hybrid damping stretcher

| Tested vehicle velocity | Upper table of stretcher | Compartment bottom | Attenuation efficiency |
|---|---|---|---|
| Sudden turning at 20 km/h | 0.924 $m/s^2$ | 1.516 $m/s^2$ | 39.05% |
| Sudden turning at 30 km/h | 1.537 $m/s^2$ | 2.792 $m/s^2$ | 44.95% |
| Sudden turning at 40 km/h | 1.976 $m/s^2$ | 3.727 $m/s^2$ | 46.98% |
| Sudden turning at 50 km/h | 2.213 $m/s^2$ | 4.509 $m/s^2$ | 50.92% |

It can be obtained from the above table that the higher the vehicle velocity is, the higher the transverse acceleration attenuation efficiency of the active and passive hybrid damping stretcher is, and the attenuation efficiency at 50 km/h in the sudden turn is the highest: 50.92%.

Vertical Acceleration Attenuation Efficiency.

The tested road condition is between the grade B pavement and a grade C paved, and the ambulance travels respectively at average velocities of 20 km/h, 30 km/h, 40 km/h, and 50 km/h. The damping result are shown in Table 3:

TABLE 3

Vertical acceleration attenuation efficiency of the active and passive hybrid damping stretcher
Vertical acceleration attenuation efficiency of the active and passive hybrid damping stretcher

| Tested vehicle velocity | Average fluctuation amplitude of upper table of stretcher | Average fluctuation amplitude of compartment bottom | Attenuation efficiency |
|---|---|---|---|
| Average velocity of 20 km/h | 8.15% g | 11.5% g | 29.13% |
| Average velocity of 30 km/h | 8.21% g | 12.2% g | 32.70% |
| Average velocity of 40 km/h | 8.22% g | 12.5% g | 34.24% |
| Average velocity of 50 km/h | 8.3% g | 12.6% g | 34.13% |

As the compartment of the ambulance has the suspension, it can be seen from the table 3 that without passive damping in the embodiment, the average fluctuation amplitude of the vertical acceleration is about 12% of the gravitational acceleration, and without the passive damping in the embodiment, the average fluctuation amplitude of the vertical acceleration decreases to about 8%, with the attenuation efficiency being about 30%, which has a comparatively apparent effect.

The technical solution of the embodiment greatly reduces the longitudinal acceleration impact caused by sudden acceleration and sudden deceleration of the ambulance, with the maximum damping efficiency reaching over 50%.

The technical solution of the embodiment greatly reduces the transverse acceleration impact caused by sudden turning of the ambulance, with the maximum damping efficiency reaching over 50%.

The technical solution of the embodiment further reduces the impact caused by the vertical acceleration on a basis that the vehicle suspension has vertical damping under a condition that the vehicle travels on the bumpy road, with the maximum damping efficiency reaching over 30%.

Embodiment 4

A seat damping structure provided in the embodiment adopts the active compensation algorithm for an inertia force of on-board equipment in the embodiment 3.

Figure 12:
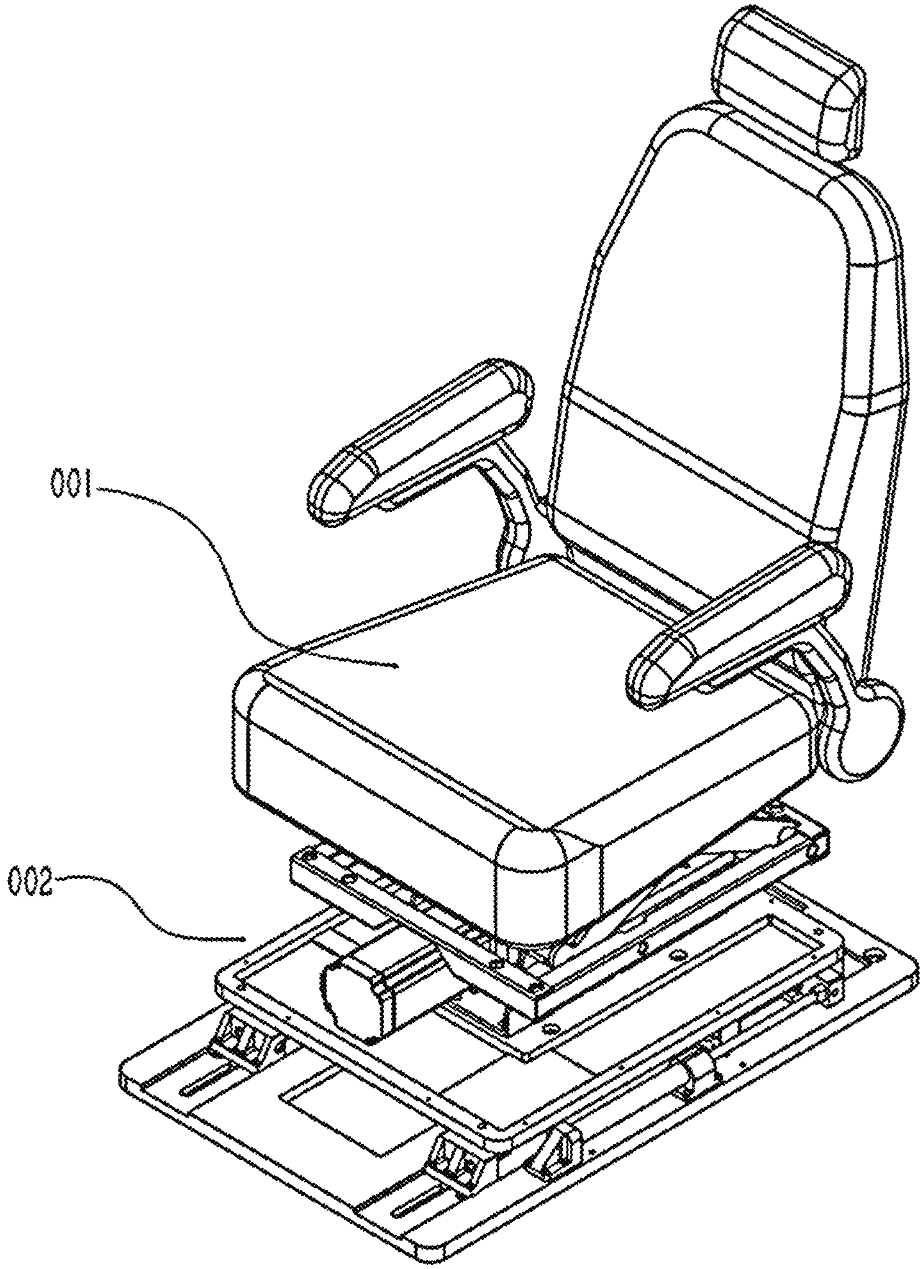
FIG. 12 is a side view mainly reflecting an overall structure of a seat in the present invention.
Figure 13:
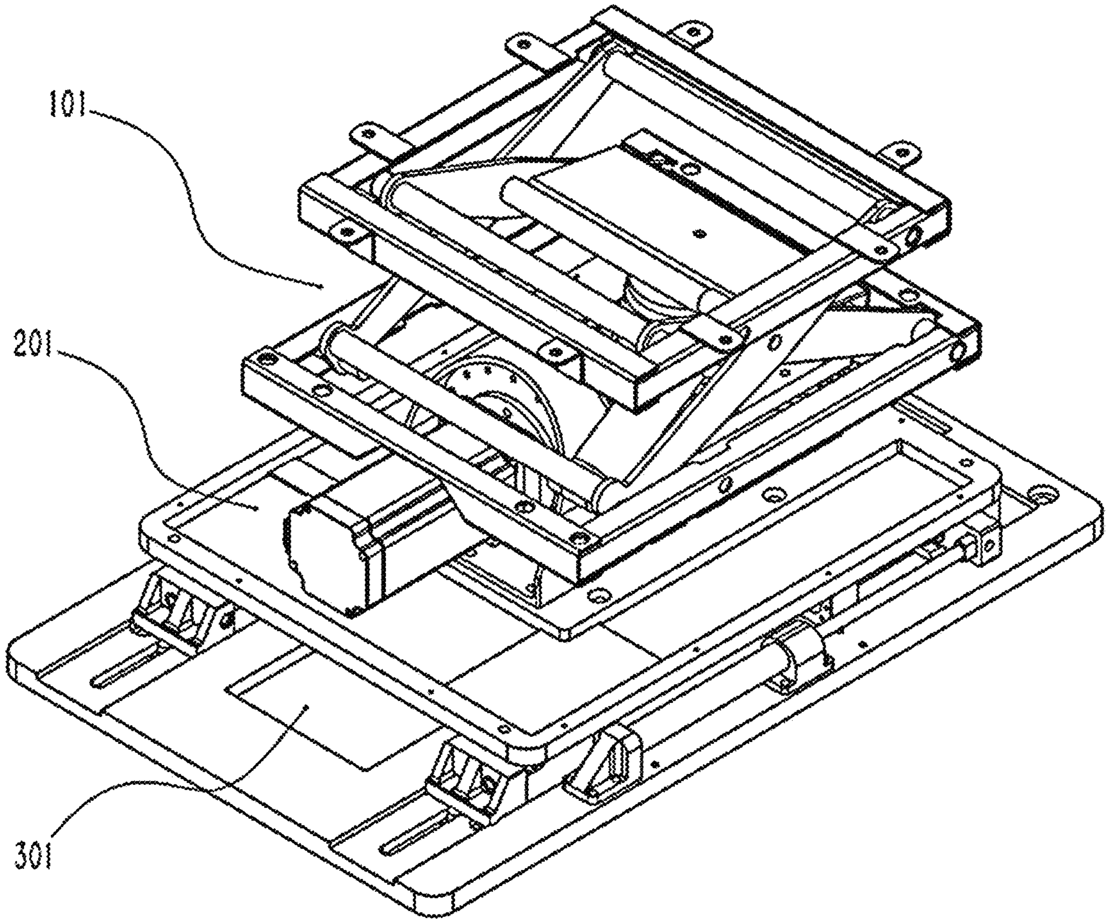
FIG. 13 is a schematic diagram mainly reflecting an overall structure of a damping and stabilizing anti-impact structure in the present invention.
Figure 14:
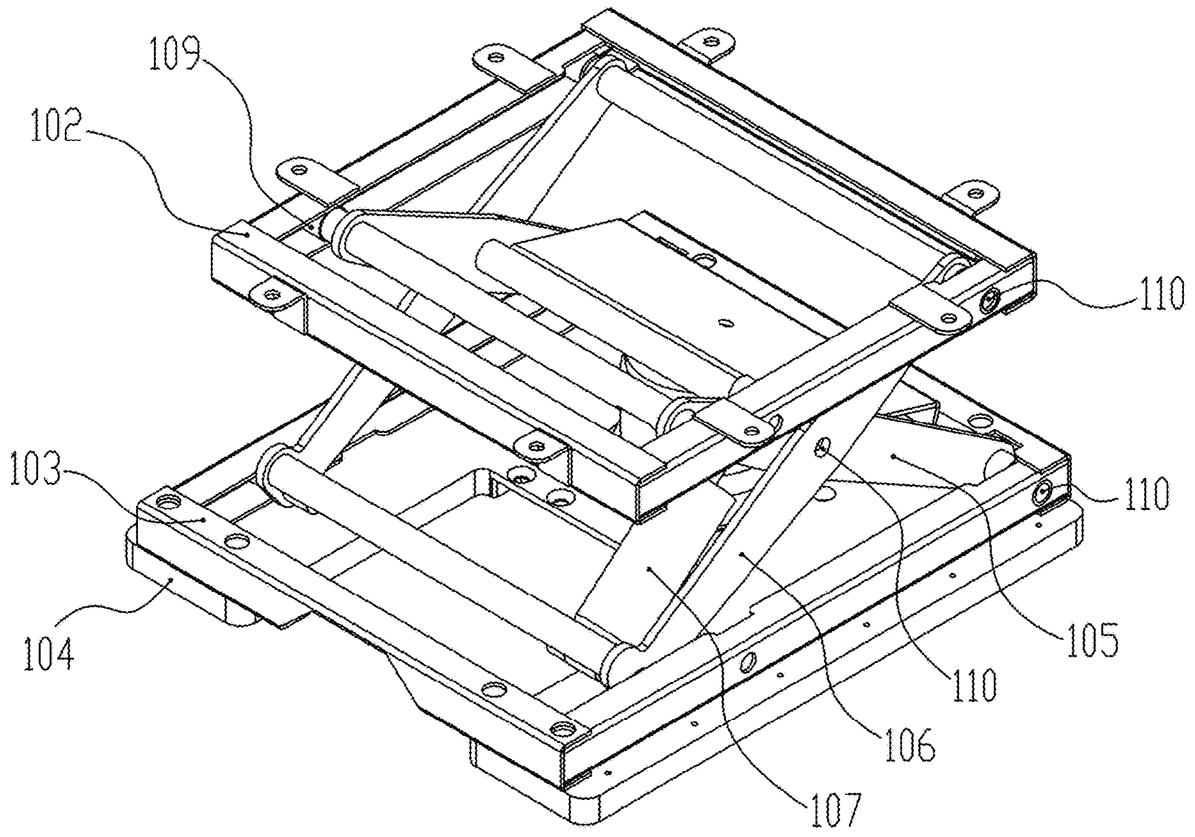
FIG. 14 is a side view mainly reflecting an overall structure of a passive damping mechanism in the present invention.
Figure 15:
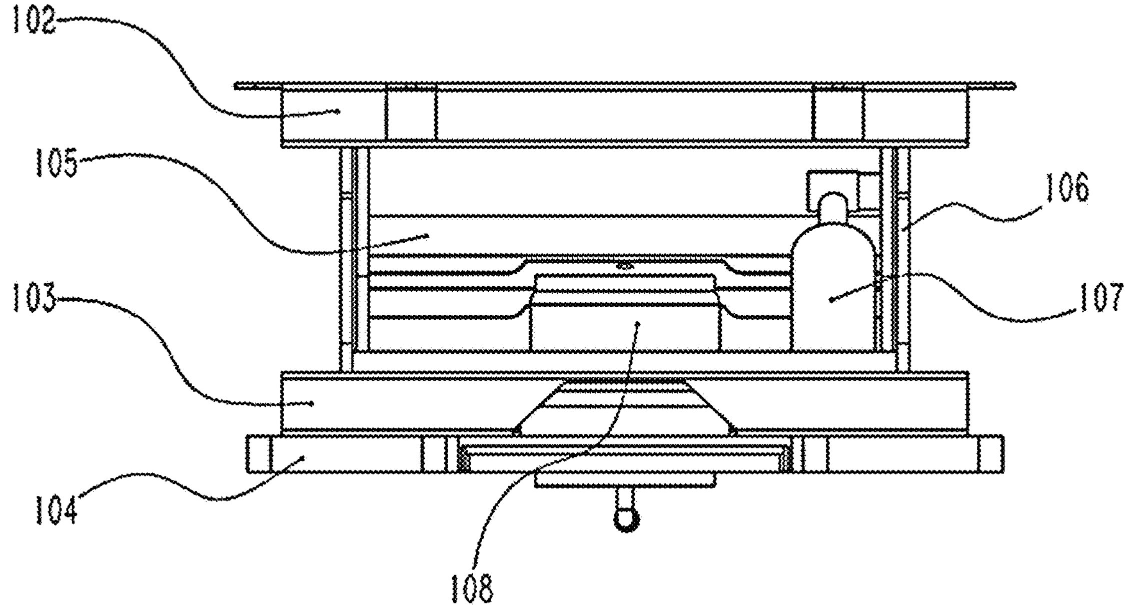
FIG. 15 is a front view mainly reflecting the overall structure of the passive damping mechanism in the present invention.
Figure 16:
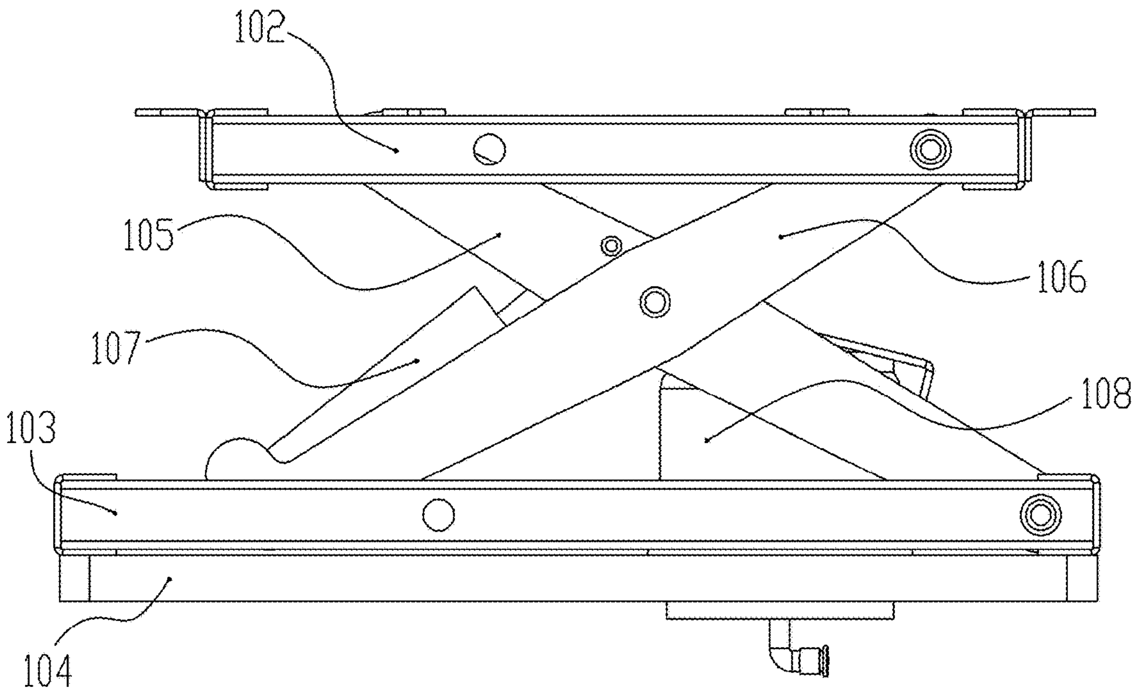
FIG. 16 is a left view mainly reflecting the overall structure of the passive damping mechanism in the present invention.
Figure 17:
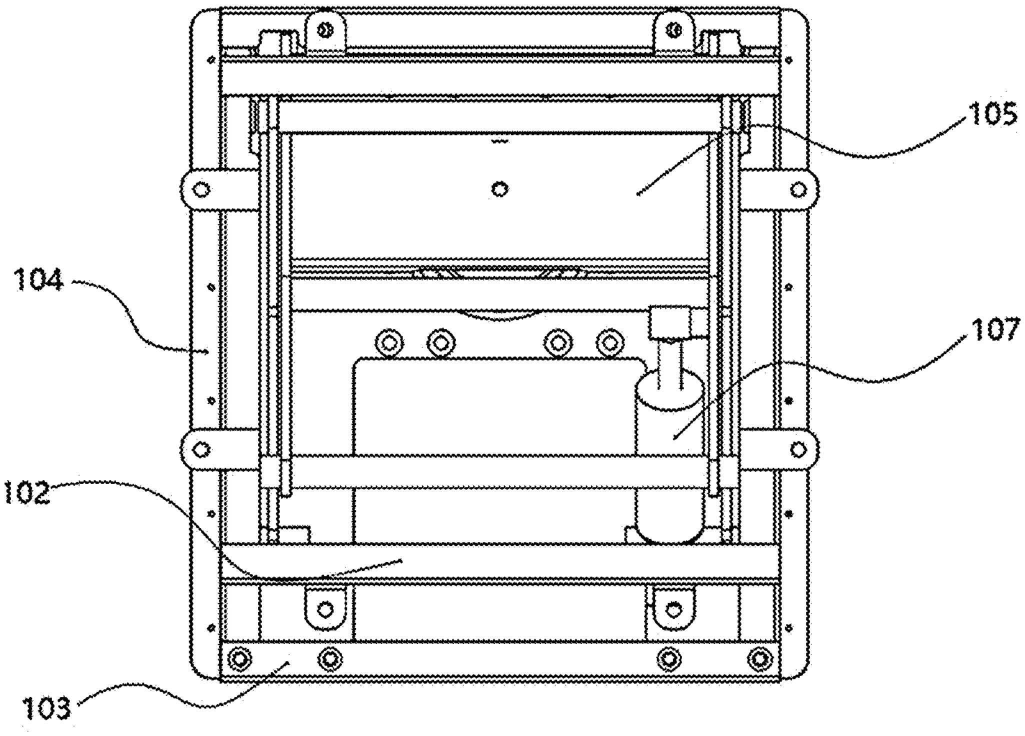
FIG. 17 is a top view mainly reflecting the overall structure of the passive damping mechanism in the present invention.
Figure 18:
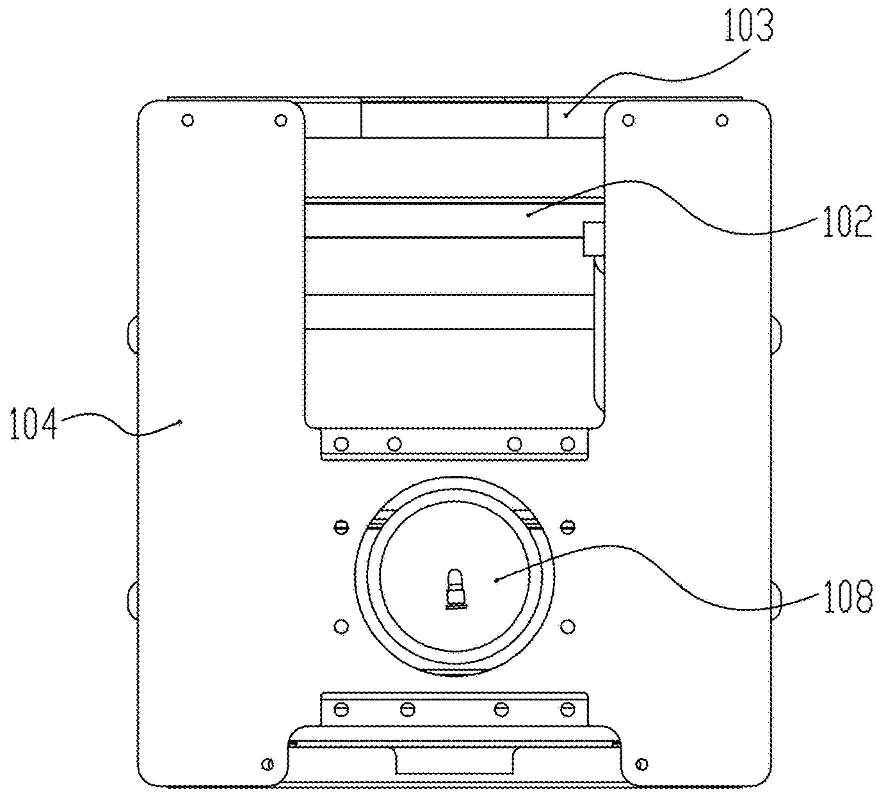
FIG. 18 is a bottom view mainly reflecting the overall structure of the passive damping mechanism in the present invention.
Figure 19:
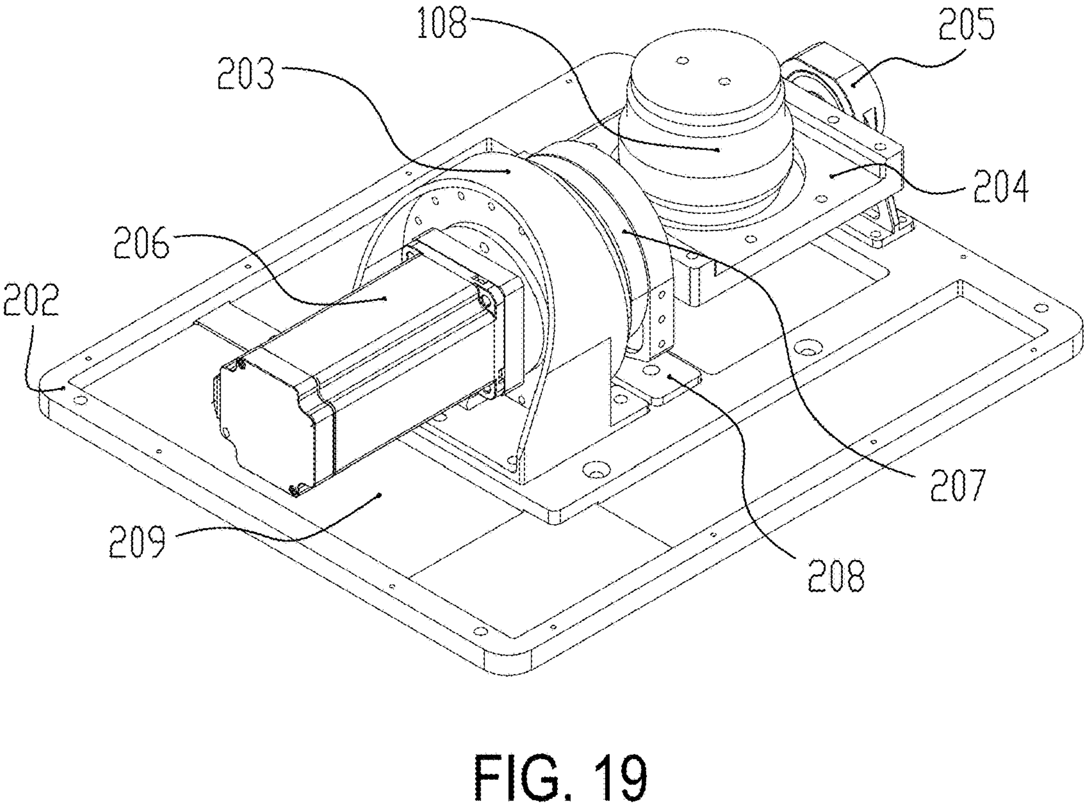
FIG. 19 is a side view mainly reflecting an overall structure of an active stabilizing mechanism in the present invention.
Figure 20:
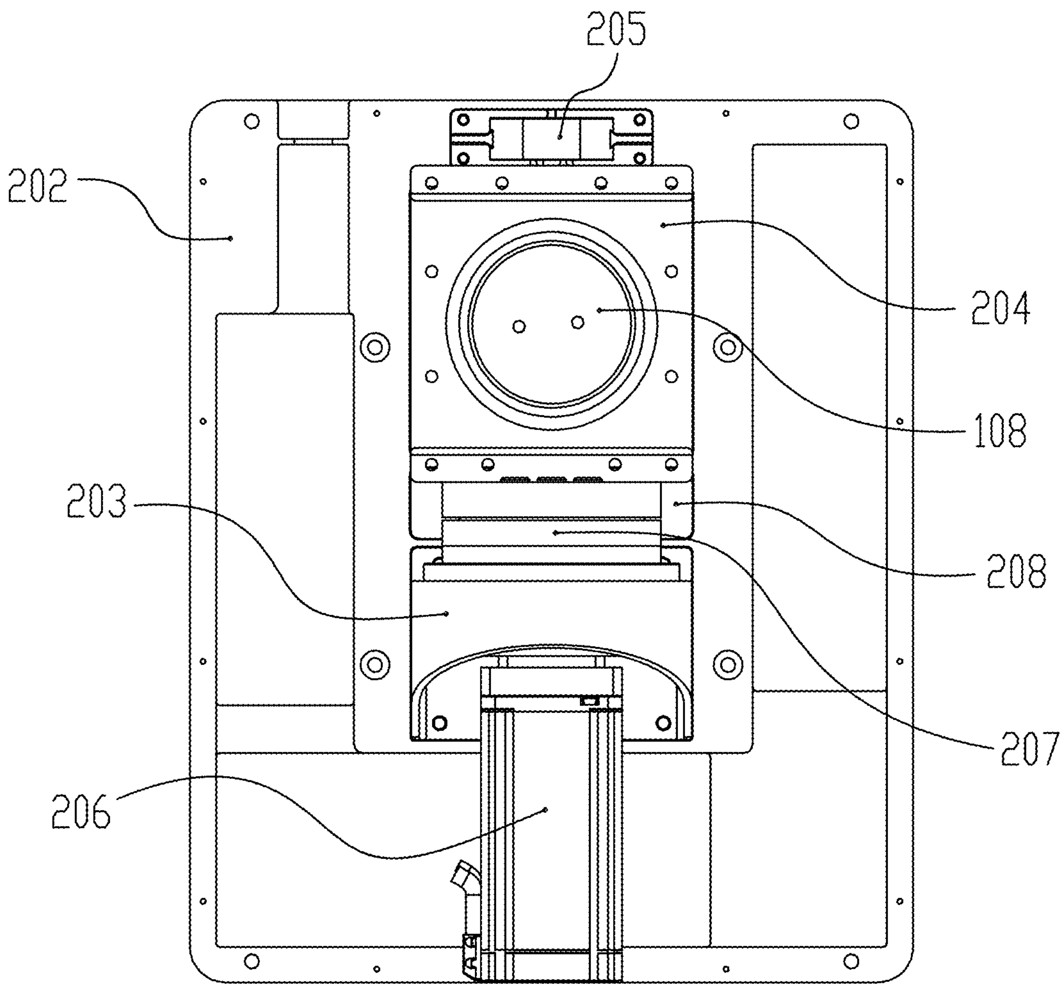
FIG. 20 is a top view mainly reflecting the overall structure of the active stabilizing mechanism in the present invention.
Figure 21:
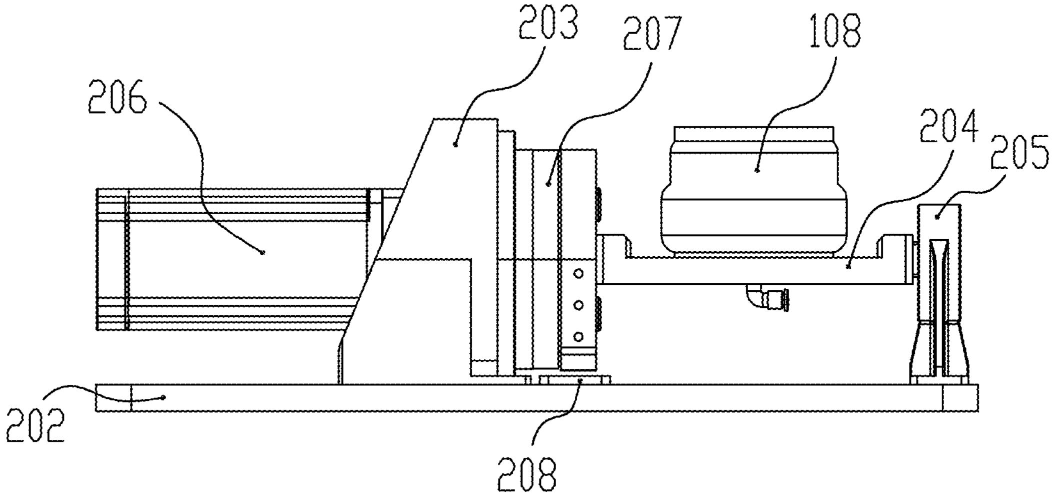
FIG. 21 is a left view mainly reflecting the overall structure of the active stabilizing mechanism in the present invention.
Figure 22:
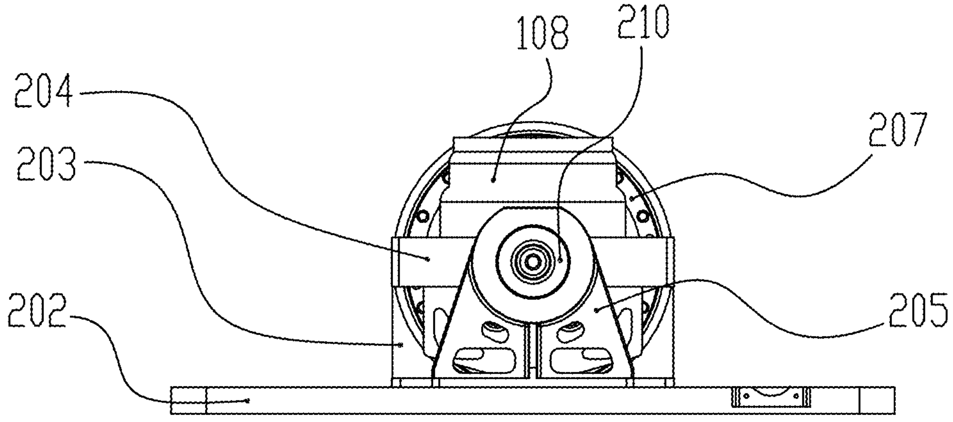
FIG. 22 is a front view mainly reflecting an overall structure of the active stabilizing mechanism in the present invention.
Figure 23:
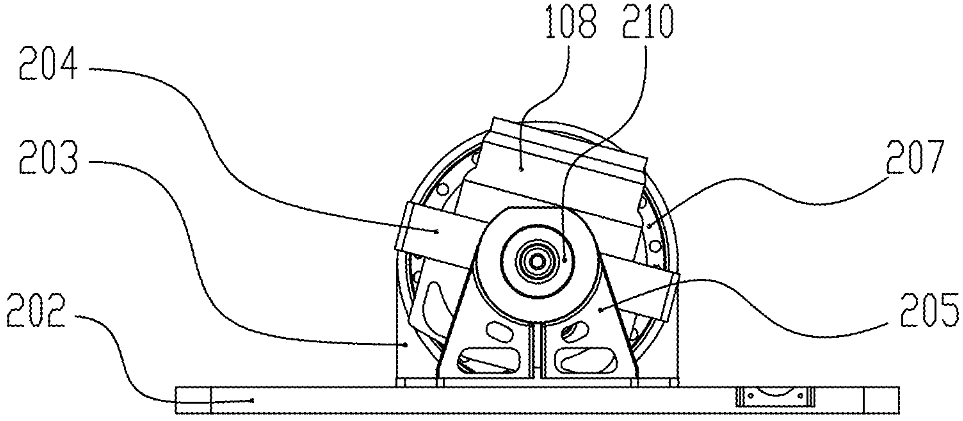
FIG. 23 is a front view mainly reflecting the active damping mechanism in a compensated state in the present invention.
Figure 24:
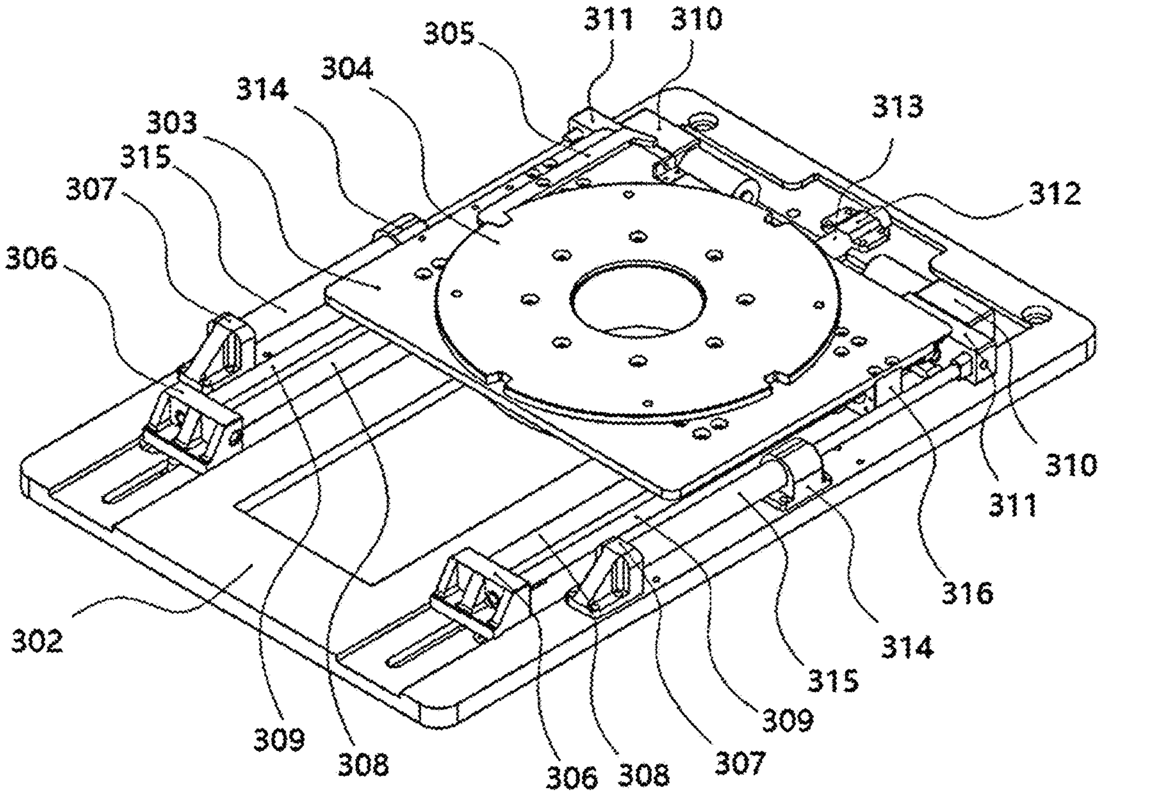
FIG. 24 is a side view mainly reflecting an overall structure of a rotary slip anti-impact mechanism in the present invention.
Figure 25:
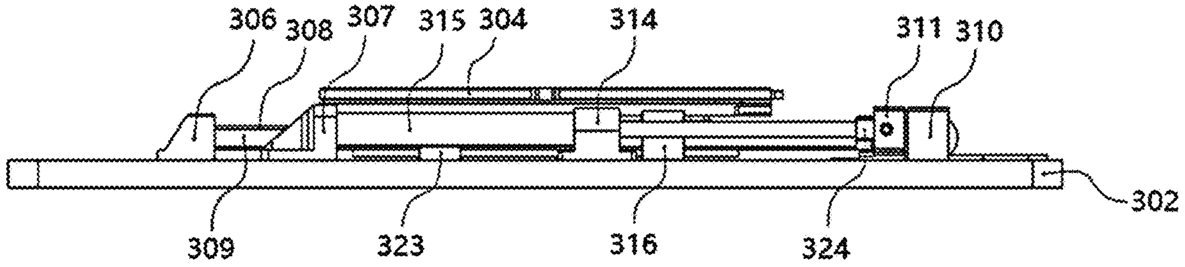
FIG. 25 is a left view mainly reflecting the overall structure of the rotary slip anti-impact mechanism in the present invention.
Figure 26:
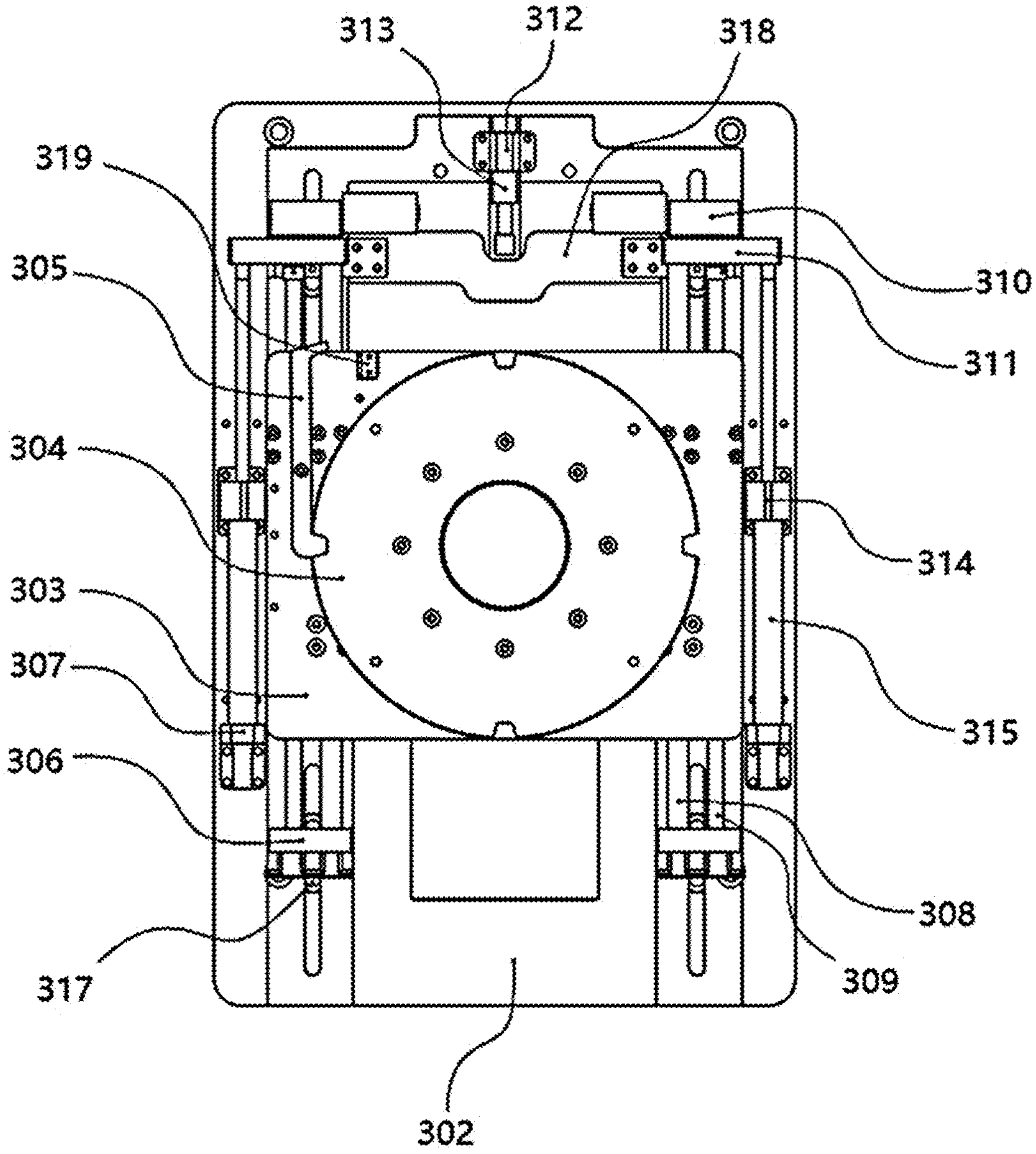
FIG. 26 is a bottom view mainly reflecting the overall structure of the rotary slip anti-impact mechanism in the present invention.
Figure 27:
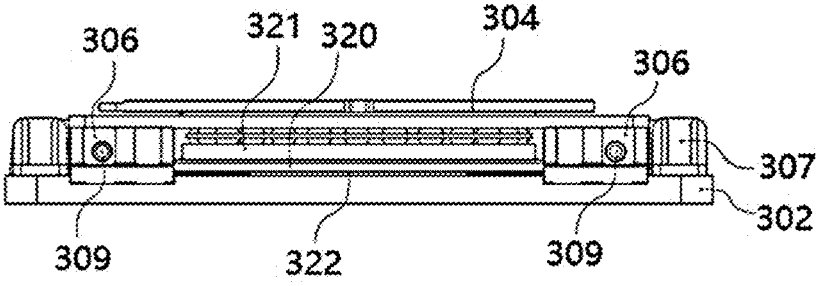
FIG. 27 is a front view mainly reflecting the overall structure of the rotary slip anti-impact mechanism in the present invention.

As shown in FIG. 12 and FIG. 13, the seat damping mechanism provided in the embodiment includes a passive damping mechanism 101, an active stabilizing mechanism 201, and a rotary slip anti-impact mechanism 301 arranged from top to bottom in sequence, and the seat surface (001) is mounted above the passive damping mechanism 101. The passive damping mechanism 101 drives the seat surface 001 to be compressed or released in a direction perpendicular to the seat surface 001, so as to absorb a force in the direction perpendicular to the seat surface 001. The active stabilizing mechanism 201 drives the passive damping mechanism 101 and the seat surface 001 to perform a roll motion, so as to compensate the centrifugal force. The rotary slip anti-impact mechanism 301 drives the active stabilizing mechanism 201, the passive damping mechanism 101, and the seat surface 001 to slide in a horizontal plane, so as to absorb the inertia force. The seat surface 001 in the embodiment can be matched with most automobile seats on the market.

As shown in FIGS. 14-18, due to compression and release of the passive damping mechanism 101, the seat surface 001 performs a reciprocating motion in a direction vertical to the seat surface 001, thereby providing damping buffer to the seat in the vertical direction. The active stabilizing mechanism 201 performs a roll motion at a corresponding angle by collecting displacement data of the chassis of the vehicle body, so as to compensate the centrifugal force. The rotary slip anti-impact mechanism 301 slides in a front-back direction of the seat to absorb the inertia force. Therefore, the riding comfort and safety of the passengers are improved.

Specifically, the passive damping mechanism 101 includes a damping seat mounting plate 102, a damping base 103, a connecting plate 104, an internal intersecting arm 105, an external intersecting arm 106, an elastic assembly, a roll shaft 109, and a rotating pin shaft 110. The internal intersecting arm 105 and the external intersecting arm 106 are arranged between the damping seat mounting plate 102 and the damping base 103, a middle portion of the internal intersecting arm 105 is rotatably connected to a middle portion of the external intersecting arm 106 through the rotating pin shaft 110, a lower end of the internal intersecting arm 105 is rotatably connected to the damping base 103 through the rotating pin shaft 110, an upper end of the internal intersecting arm 105 is slidably connected to the damping seat mounting plate 102 through the roll shaft 109, a lower end of the external intersecting arm 106 is slidably connected to the damping base 103 through the roll shaft 109, and an upper end of the external intersecting arm 106 is rotatably connected to the damping seat mounting plate 102 through the rotating pin shaft 110. The elastic assembly acts on the internal intersecting arm 105 and/or the external intersecting arm 106, and the elastic action direction of the elastic assembly is the direction perpendicular to the seat surface 001.

The elastic assembly includes a magnetorheological damper 107 and an elastic part 108, the elastic action direction of the elastic part 108 is the direction perpendicular to the seat surface 001, the magnetorheological damper 107 acts on the internal intersecting arm 105 and/or the external intersecting arm 106, and the elastic action direction of the magnetorheological damper 107 intersects with the elastic action direction of the elastic part 108. The elastic part 108 in the application includes an air spring and can also be a gas spring or springs in other forms.

In the passive damping mechanism 101, the middle portions of the damping seat mounting plate 102 and the damping base 103 are connected through scissors cross structures of the internal intersecting arm 105 and the external intersecting arm 106, and the elastic part 108 and the magnetorheological damper 107 act on opening and closing of the scissors cross structures.

When the vehicle passes through a potholed pavement or a speed bump, the vehicle body is subjected to corresponding bump and fluctuation, and then the elastic part 108 will be compressed to rebound. The magnetorheological damper 107 can make the elastic part 108 compress and rebound more flexibly and comfortably. The damping seat mounting plate 102 and the damping base 103 opens and closes up and down synchronously with compression and rebound of the elastic part 108, and finally, the seat surface 001 performs a corresponding up-down vertical motion with fluctuation and bump of the pavement to counteract the fluctuation and bump.

When the vehicle passes through a flat pavement such as an overpass and an expressway, the magnetorheological damper 107 will be controlled by the master control module 209 to raise the current, so that the damping force is adjusted to the maximum extent. Thus, the scissors cross structures are locked to close the vertical up-down motion, so that the unnecessary up-down fluctuation of the seat surface 001 on the flat pavement is reduced. The damping base 103 is connected to the active stabilizing mechanism 201 through fastening bolts and the connecting plate 104.

As shown in FIGS. 19-23, further, the active stabilizing mechanism 201 includes a stabilizing mechanism mounting plate 202, an active mounting seat 203, a roll output plate 204, a bearing pedestal 205, a driving assembly, a limiting buffer pad 208, a master control module 209, and a roll bearing 210. The driving assembly includes a roll motor 206 and a decelerator 207.

The roll output plate 204 and the driving assembly both are mounted on the stabilizing mechanism mounting plate 202. An output shaft of the driving assembly is horizontally arranged, the roll output plate 204 is tightly connected to the output shaft of the driving assembly, and the passive damping mechanism 101 is mounted on the roll output plate 204 through fastening bolts and the connecting plate 104. The master control module 209 collects attitude data of the vehicle body, and controls the driving assembly through the attitude data of the vehicle body to drive the roll output plate 204 to rotate. The active stabilizing mechanism further includes a limiting buffer pad 208, and the limiting buffer pad 208 defines a rotating range of the roll output plate 204 to be ±30°.

More specifically, in the active stabilizing mechanism 201, the active mounting seat 203 on the stabilizing mechanism mounting plate 202 is used for fixing the roll motor 206 and the decelerator 207. One end of the roll output plate 204 is mounted on the output shaft of the decelerator 207, and the other end of the roll output plate 204 is supported by the bearing pedestal 205 and the roll bearing 210. The roll motor 206 acts to obtain data operated by the algorithm by collecting vehicle body attitude data by the attitude sensor in the master control module 209, the data is sent to the motor driver in the master control module 209 to drive the roll motor 206 to perform corresponding work. The output of the roll motor 206 will be sent to the decelerator 207, so that the decelerator 207 and the roll output plate 204 both perform corresponding roll motions at the same time.

It is to be further noted that the roll motion in the application is rotation of the roll output plate 204 around the output shaft of the decelerator 207. The axial direction of the output shaft of the decelerator 207 is parallel to the front-back direction of the seat.

With respect to the roll angle, the maximum motion angle of the roll output plate 204 can be limited by adjusting the position of the limiting buffer pad 208, and the maximum motion angle can be +−30°. The roll output plate 204 and the connecting plate 104 are interconnected through fastening bolts, so that the passive damping mechanism 101 and the seat surface 001 both perform corresponding roll motions synchronously. The centrifugal force to the passengers when the vehicle turns is compensated through the roll motion of the seat surface 001, so that the passengers are in a relative comfortable state all along.

As shown in FIGS. 24-27, further, the rotary slip anti-impact mechanism 301 includes a vehicle mechanism base 302, a seat sliding bottom plate 303, a position adjusting assembly, and a buffer assembly. The seat sliding bottom plate 303 is slidably mounted on the vehicle mechanism base 302, the position adjusting assembly adjusts the relative positions between the seat sliding bottom plate 303 and the vehicle mechanism base 302, and the buffer assembly inhibits the relative positions between the seat sliding bottom plate 303 and the vehicle mechanism base 302.

More specifically, the position adjusting assembly includes two ball screw 309 structures, and the two ball screw 309 structures are parallelly mounted on two opposite sides of the seat sliding bottom plate 303 respectively and slidably connected to the overall mechanism base 302.

One ball screw 309 structure is illustrated as an example now: the ball screw 309 structure includes a lead screw tail stock 306, a structural reinforcing bar 308, a ball screw 309, a seat sliding motor 310, a sliding motor base 311, a nut mounting seat 316, a bottom slide block 317, a coupling 324, a lead screw nut 325, a lead screw bearing 327, a seat sliding slide block 326, and a sliding sleeve 323. The lead screw tail stock 306 and the sliding motor base 311 are mounted on the overall mechanism base 302 through the structural reinforcing bar 308, the ball screw 309, the seat sliding motor 310, the bottom slide block 317, and the coupling 324. The lead screw tail stock 306, the structural reinforcing bar 308, the ball screw 309, the seat sliding motor 310, the sliding motor base 311, the bottom slide block 317, and the coupling 324 can slide front and back synchronously in a chute of the overall mechanism base 302. The seat sliding bottom plate 303, the nut mounting seat 316, the lead screw nut 325, and the seat sliding slide block 326 are mounted on the structural reinforcing bar 308 and the ball screw 309; when the seat sliding motor 310 rotates, it drives the coupling 324 and the ball screw 309 to rotate synchronously; the lead screw nut 325 will displace due to rotation of the ball screw 309; by matching the seat sliding slide block 326 with the sliding sleeve 323, the displacement will drive the whole active stabilizing mechanism 201, the passive damping mechanism 101, and the seat surface 001 to displace together, which means a function of adjusting the seat front and back.

It is to be noted that the motor base connecting plate 318 connects the sliding motor bases 311 in the two ball screw 309 structures through screws as a whole.

More specifically, the buffer assembly includes a plurality of buffer parts, and the direction of the action force of any one buffer part is parallel to a moving direction of each of the ball screw 309 structures. One end of any one buffer part is fixedly connected to the overall mechanism base 302 and the other end thereof is fixedly connected to the seat sliding bottom plate 303 and/or the position adjusting assembly.

The buffer assembly includes a gas spring tail stock 307, a damper mounting seat 312, a buffer damper 313, a gas spring fixing seat 314, and a buffer gas spring 315. The buffer parts in the application are preferably the buffer damper 313 and the buffer gas spring 315. The buffer gas spring 315 is arranged on each of two opposite sides of the seat sliding bottom plate 303. Any buffer gas spring 315 is fixedly connected to the overall mechanism base 302 through the gas spring fixing seat 314 and the gas spring tail stock 307. The movable end of the buffer gas spring 315 is connected to the corresponding sliding motor base 311. The buffer damper 313 is mounted through the damper mounting seat 312, one end of the buffer damper 313 is in contact with the overall mechanism base 302, and the other end of the buffer damper 313 is in contact with the motor base connecting plate 318. The sliding motor base 311 will be subjected to resistance of the buffer damper 313 and the buffer gas spring 315 during sliding, and the buffer damper 313 and the buffer gas spring 315 will also be compressed as the sliding motor base 311 slides.

The rotary slip anti-impact mechanism 301 includes a rotating assembly, wherein the rotating assembly includes a seat rotating bottom plate 304, a rotary locking hook 305 and a locking hook top plate 319, the seat rotating bottom plate 304 is rotatably connected to the seat sliding bottom plate 303, and the locking hook top plate 319 acts on the rotary locking hook 305 to lock the seat rotating bottom plate 304 and the seat sliding bottom plate 303 or separate the lock the seat rotating bottom plate 304 and the seat sliding bottom plate 303.

Specifically, the rotating assembly further includes a base tray 320, a seat rotating bearing 321, and a seat turnplate tightening nut 322. A seat rotating bottom plate 304, a rotary locking hook 305, the base tray 320, the seat rotating bearing 321, and the seat turnplate tightening nut 322 are also mounted on the seat sliding bottom plate 303. When the rotary locking hook 305 bounces off, the seat rotating bottom plate 304 is in an unlocked state and can rotate arbitrarily. The seat surface 001 of the seat rotates synchronously due to a series relation. When the vehicle takes emergency braking or is impacted, the seat surface 001 of the seat will slide along the traveling direction of the vehicle as a result of inertia. During sliding, the sliding velocity is slowed down due to resistance of the buffer gas spring 315 and the buffer damper 313, so that there is a forward buffer distance for the seat surface 001 when the vehicle takes emergency braking or is impacted finally. Therefore, the body of the passenger will not displace forwards relative to the seat surface 001 of the seat as a result of emergency braking. Instead, the seat surface 001 of the seat, together with the passenger, displaces, so that the probability that the passenger is injured is reduced when the vehicle takes emergency braking or is impacted.

Figure 28:
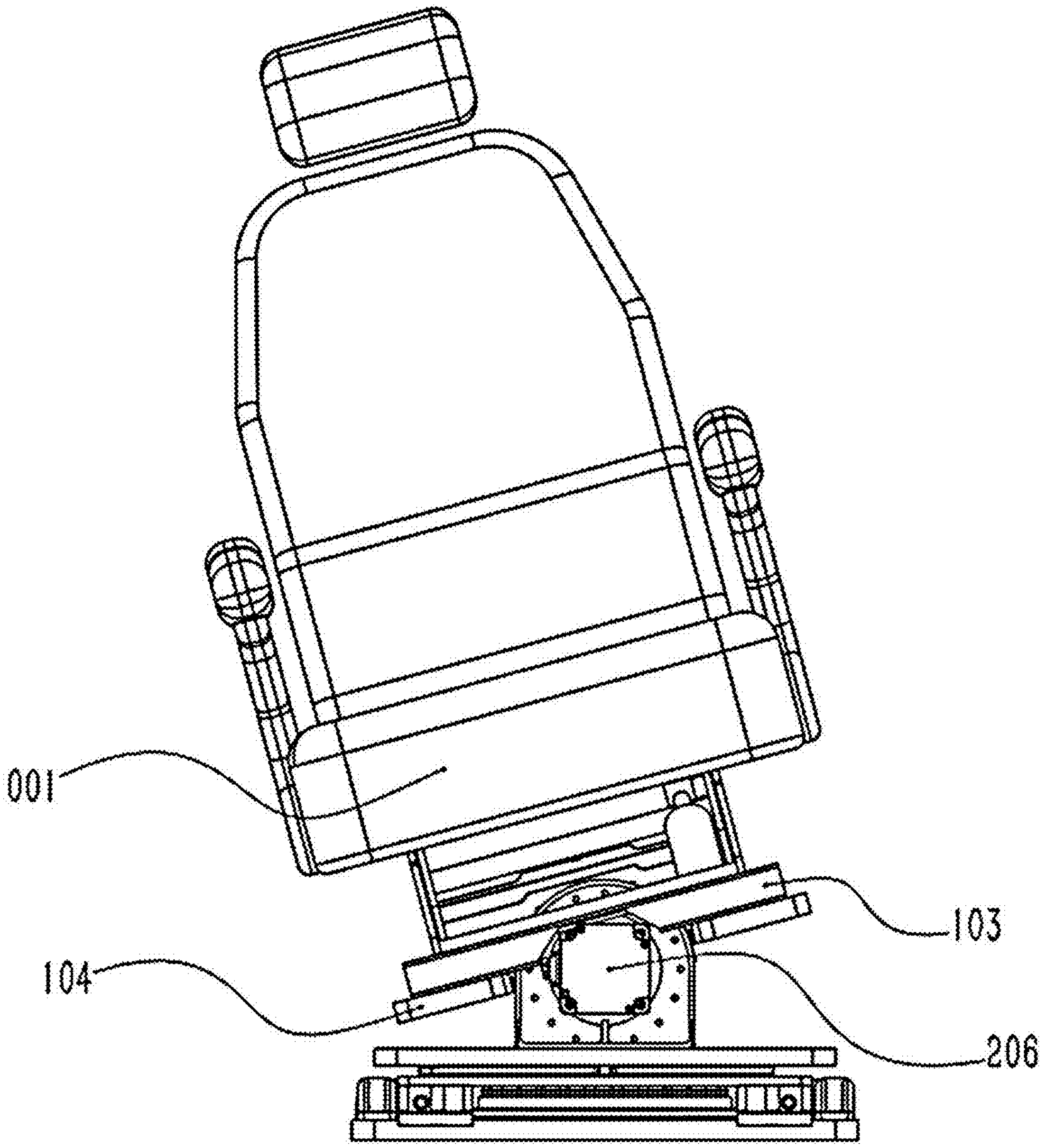
FIG. 28 is a schematic diagram of an overall structure mainly reflecting the active stabilizing mechanism of the seat in the compensated state in the present invention.
Figure 29:
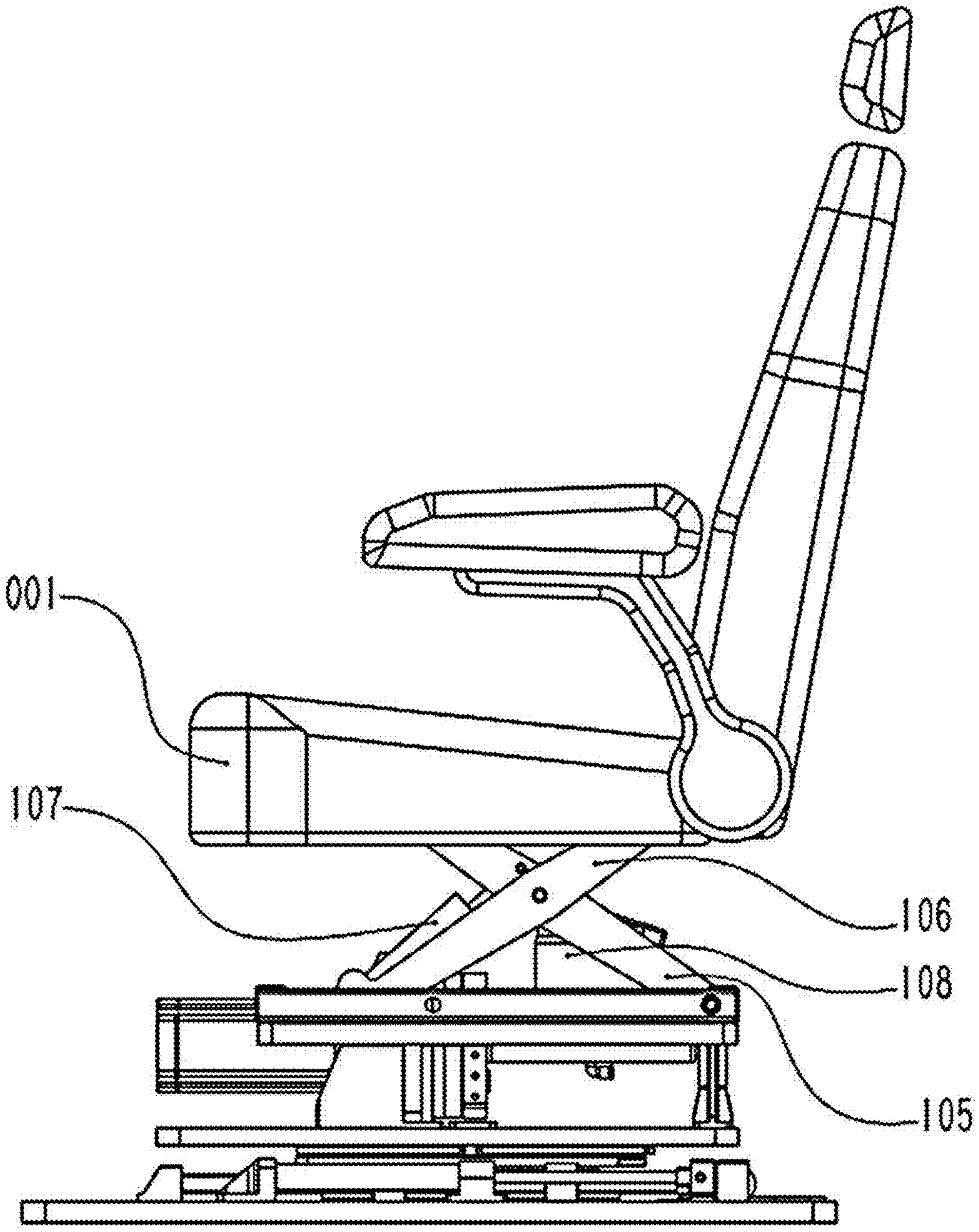
FIG. 29 is a schematic diagram of an overall structure mainly reflecting the passive damping mechanism of the seat in a working state in the present invention.
Figure 30:
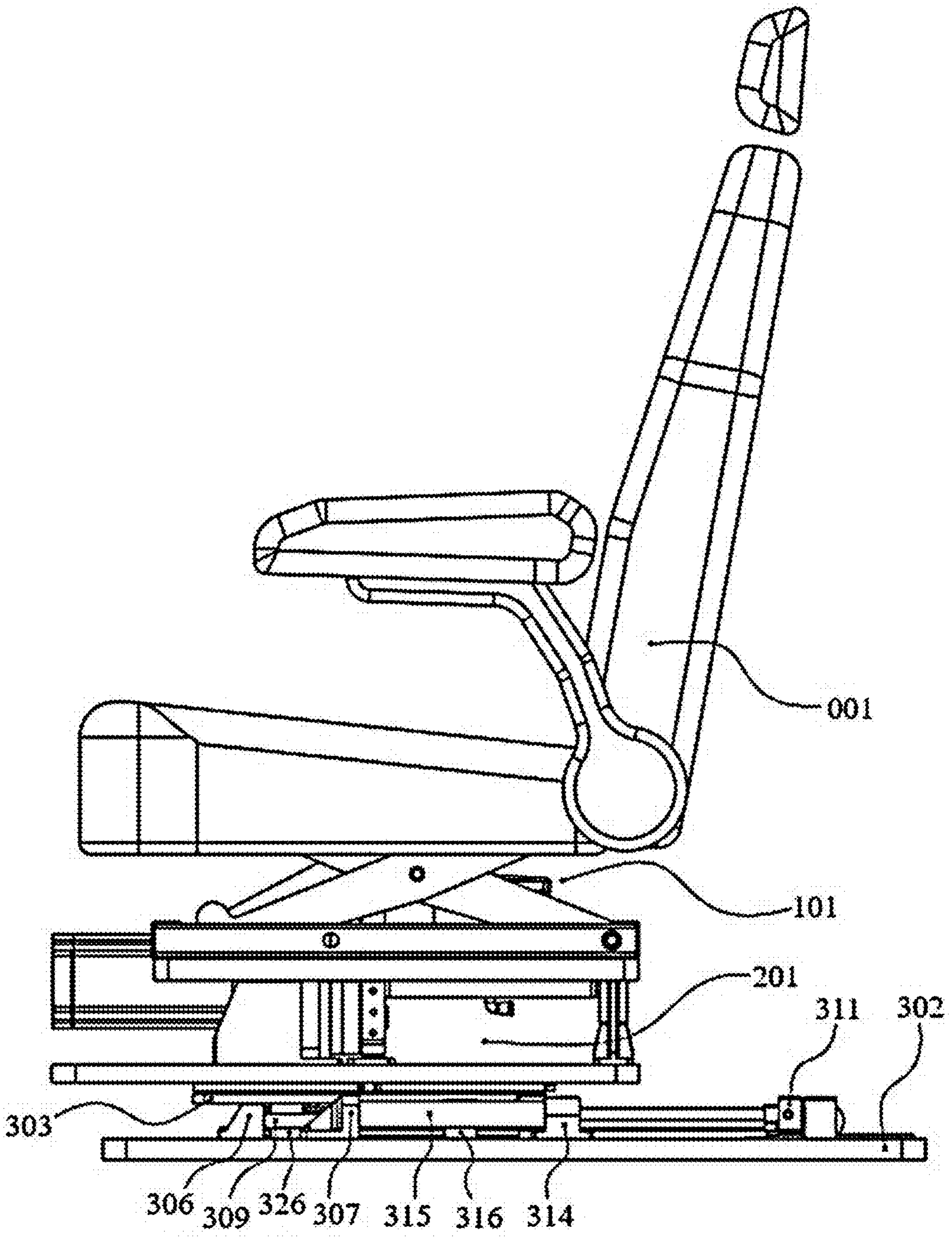
FIG. 30 is a schematic diagram of an overall structure mainly reflecting the rotary slip anti-impact mechanism of the seat in a working state in the present invention.
Figure 31:
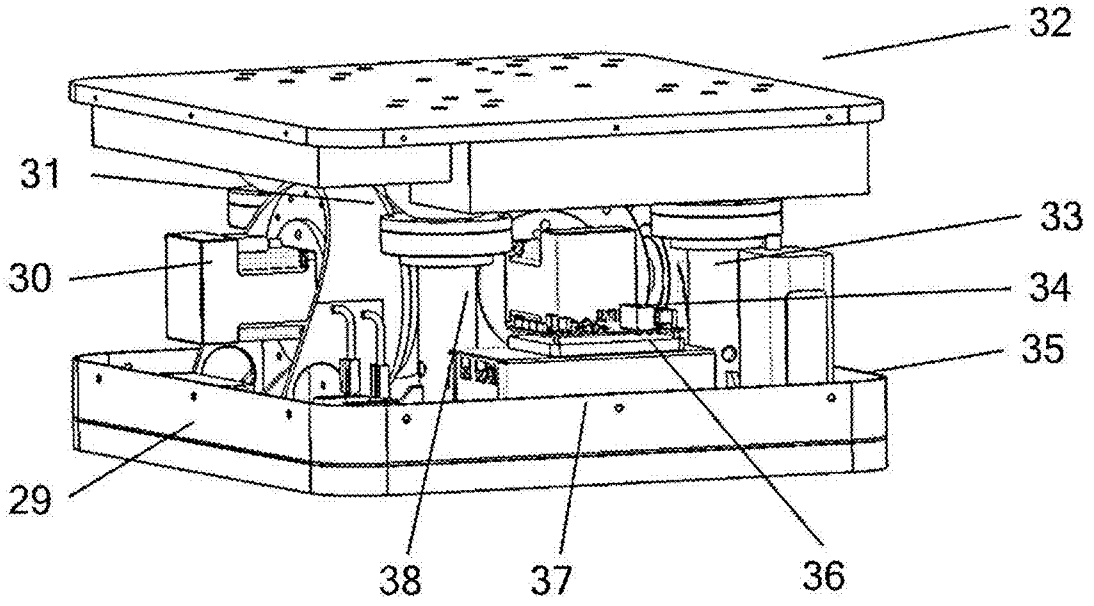
FIG. 31 is a front schematic diagram of a damping device in the present invention.
Figure 32:
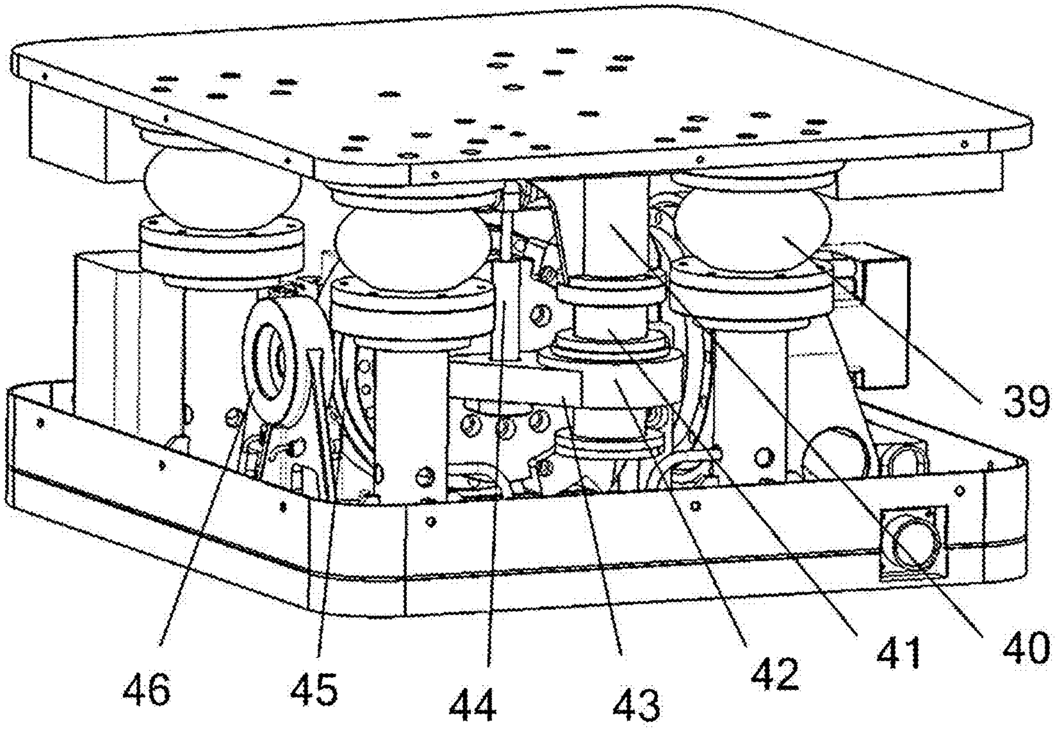
FIG. 32 is a back schematic diagram of the damping device in the present invention.
Figure 33:
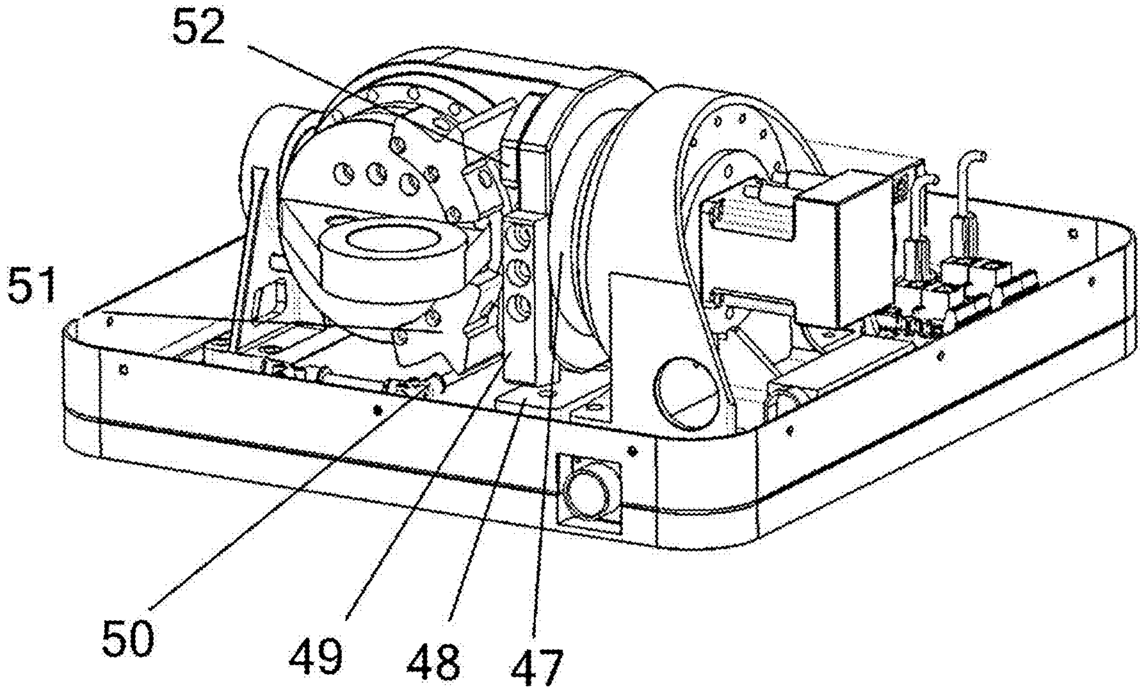
FIG. 33 is a schematic diagram of each limiting device of the damping device in the present invention.
Figure 34:
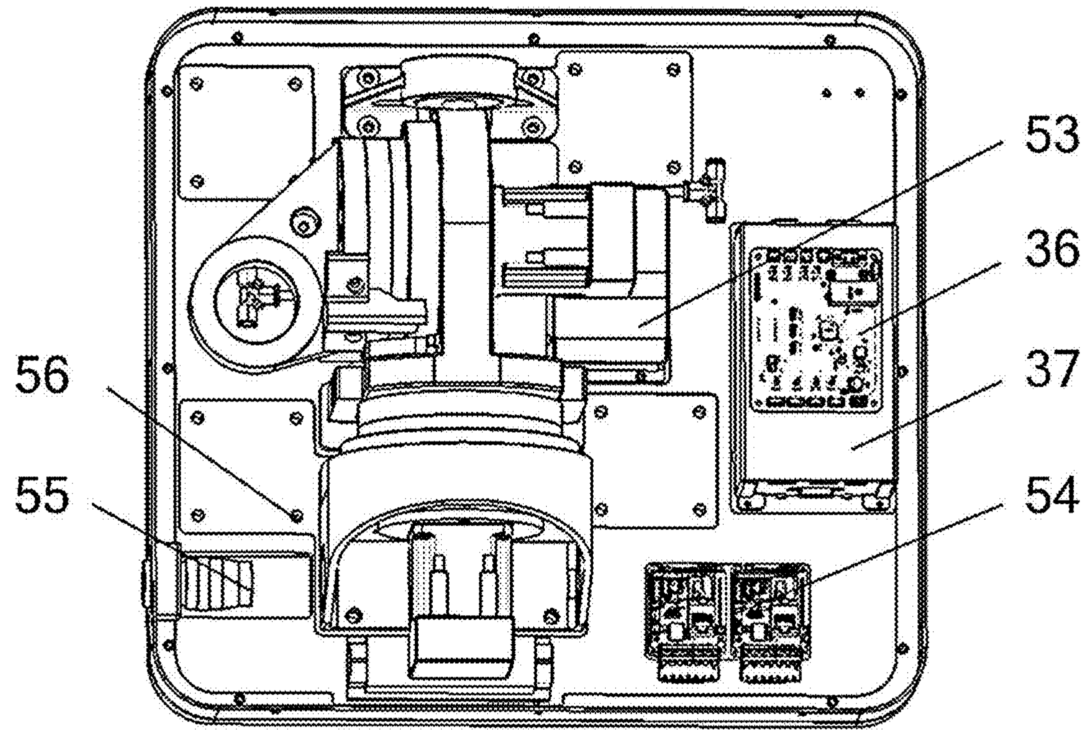
FIG. 34 is a schematic structural diagram of a bottom mounting platform in the present invention.
Figure 35:
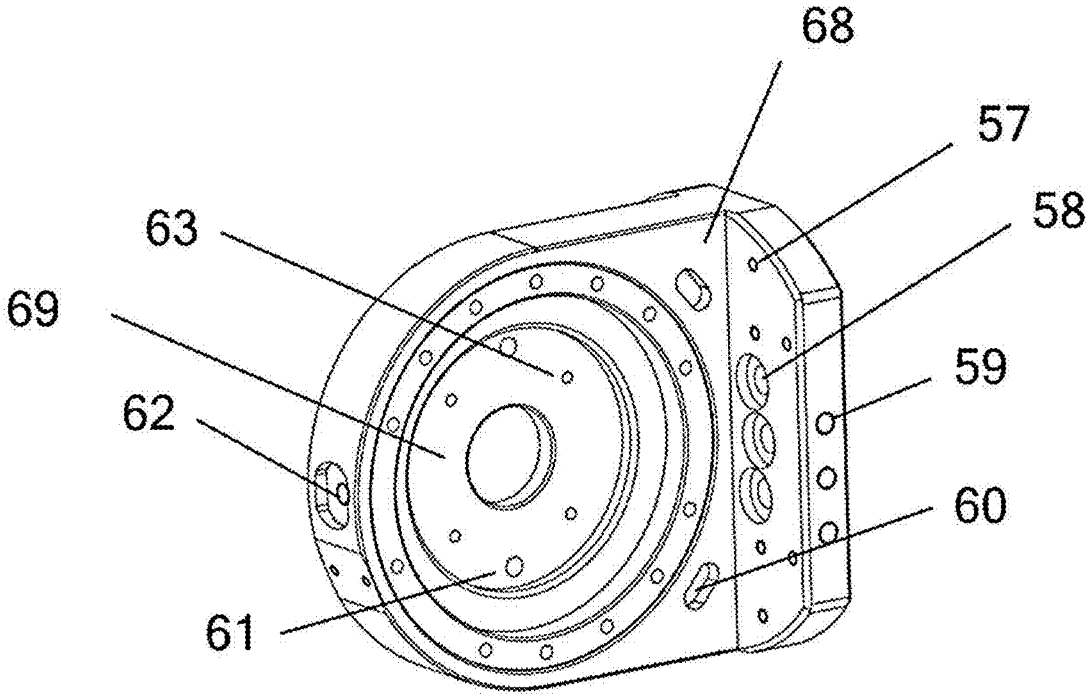
FIG. 35 is a schematic structural diagram of a pitch motion output support in the present invention.
Figure 36:
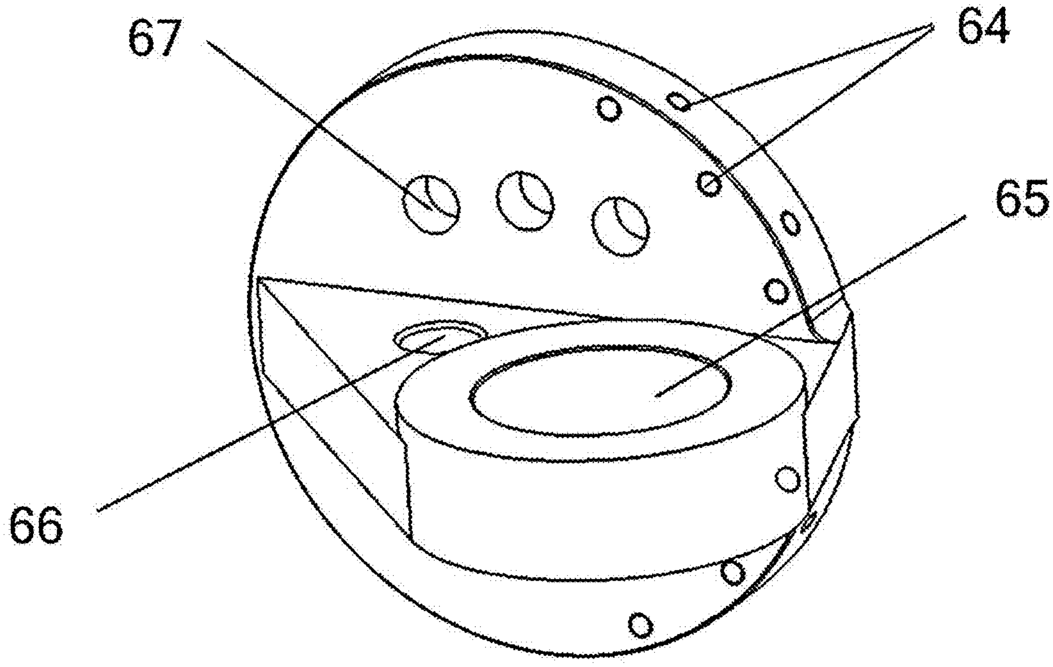
FIG. 36 is a structural schematic diagram of a roll decelerator output support in the present invention.
Figure 37:
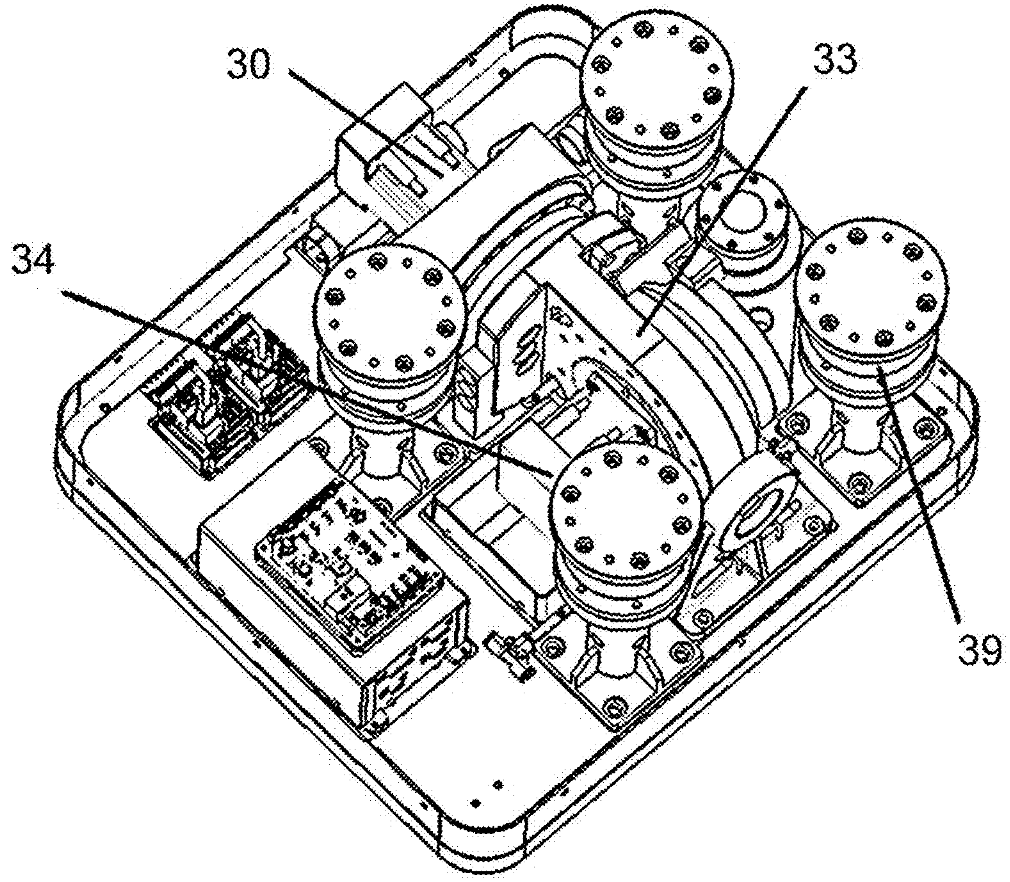
FIG. 37 is a schematic structural diagram of the damping device without a top movable platform in the present invention.
Figure 38:
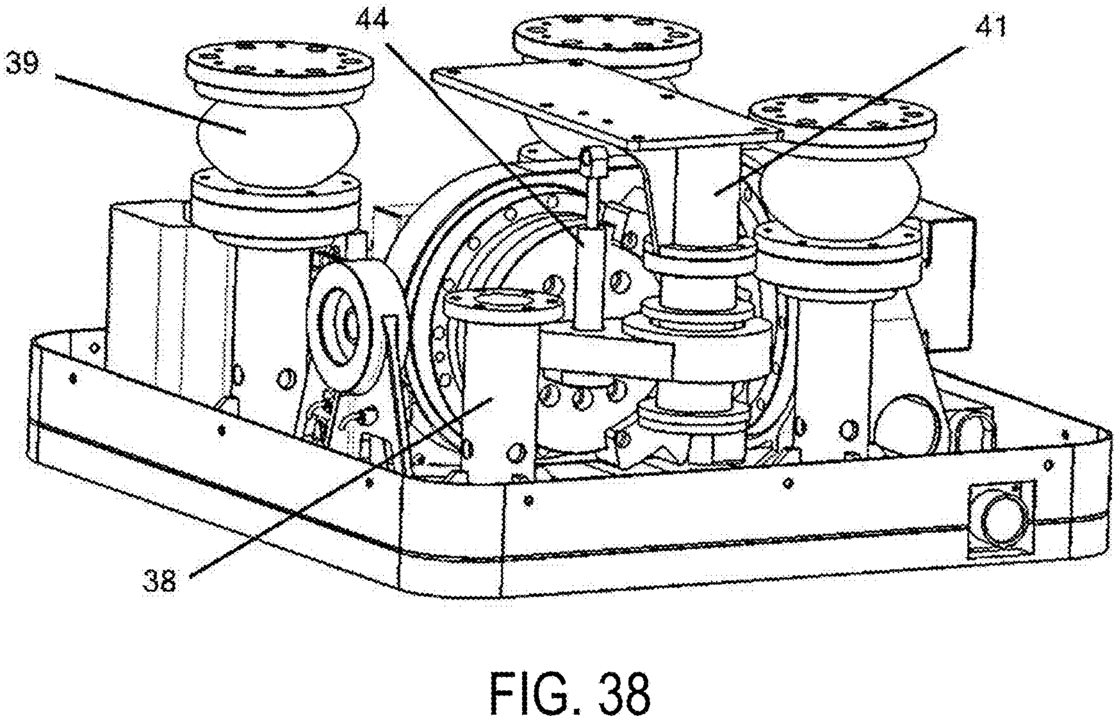
FIG. 38 is a reference schematic diagram of each damping part of the damping device in the present invention.

As shown in FIGS. 28-30, the embodiment further provides a vehicle, adopting the above damping and stabilizing anti-impact structure for the seat, the damping and stabilizing anti-impact structure for the seat being mounted on a vehicle body bottom plate. The damping and stabilizing anti-impact structure for the seat is fixedly connected to the vehicle body bottom plate through the overall mechanism base 302. The overall mechanism base 302 in the application can be mounted in a fit manner on most passenger vehicles and commercial vehicles on the market.

The embodiment absorbs the force in the direction perpendicular to the seat surface through the passive damping mechanism to achieve damping, compensates the centrifugal force through the active stabilizing mechanism to achieve stabilizing, and absorbs the inertia force through the rotary slip anti-impact structure to achieve impact resistance. The embodiment features compact structure and small occupied space while achieving damping, stabilizing and anti-impact functions, which contributes to improving the riding comfort and safety of the passenger;

- the embodiment limits the rotating range of the roll output plate by virtue of the limiting buffer pad, which contributes to improving the stability and safety of the motion of the active stabilizing mechanism; and
- the embodiment locks or separates the seat rotating bottom plate and the seat sliding bottom plate as the locking hook top plate and the rotary locking hook are matched.

Embodiment 5

The embodiment provides a damping device, adopting the active compensation algorithm for an inertia force of onboard equipment in the embodiment 3.

As shown in FIGS. 31-38, the damping device provided by the embodiment includes: a movable platform 32 for being connected to a damped target; a bottom platform 29, wherein the active pitch damping device is fixed on the bottom plate 29; the active pitch damping device includes a pitch motor 30; an active roll damping device, arranged on the active pitch damping device and driven by the pitch motor 30 to rotate around a rotating shaft of the pitch motor 30, wherein the active roll damping device includes a roll motor 34 for driving the active roll damping device to rotate; a damping output device, wherein the damping output device specifically includes a guide pillar 41 and an output support 43, the output support 43 is fixed on the active roll damping device, and the output support 43 is internally provided with a guide hole 65; and one end of the guide pillar 41 is connected to the bottom platform 29, and the other end thereof passes through the guide hole 65 and is connected to the movable platform 32.

In the embodiment, the movable platform 32 is usually arranged at the bottom of the damped target. The damped target can be either a seat of an automobile traveling or any equipment with sway, and the like in the moving process such as a seat on an airplane. The bottom platform 29 is correspondingly fixed on a floor inside a carrier such as the automobile or the airplane, and the bottom plate of the automobile or the airplane, and the like can also be directly used as the corresponding bottom platform 29.

By taking the automobile as an example, the automobile will generate multidimensional vibration in the traveling process, for example linear vibration in the front-back direction during braking, and in this case, a motion acceleration in the pitch direction will be generated on the passenger, so that the passenger pitches front and back. In this case, the active pitch damping device starts the pitch motor 30 to rotate to provide a reverse motion compensation to the movable platform 32, so that the passenger may not swing front and back. Correspondingly, when taking a sudden turn, the automobile will generate a centripetal acceleration in a left-right direction, and in this case, the roll motor 34 needs to provide a centripetal acceleration in the left-right direction for reverse motion compensation.

More specifically, when the pitch motor 30 rotates, it drives the active pitch damping device to rotate integrally and drives the output support 43 arranged on the active roll damping device to move. For example, when there is backward pitching, the guide pillar 41 will incline backwards, and in this case, as the active pitch damping device will provide the guide pillar 41 a forward force through the output support 43, the attitude of the guide pillar 41 is maintained, and the attitude of the movable platform 32 is maintained by maintaining the attitude of the guide pillar 41. In a similar way, when encountering a leftward lateral motion, the guide pillar 41 will incline leftwards, and in this case, the roll motor 34 drives the active roll damping device to rotate and provides the guide pillar 41 with a rightward force through the output support 43, so that the attitude of the guide pillar 41 is maintained, and the attitude of the movable platform is maintained by maintaining the attitude of the guide pillar 41. In terms of mounting the guide pillar 41, the base is provided with a guide pillar support 40 for mounting the guide pillar 41.

Assuming that encountering the acceleration motion in the left-right direction and front-back direction incompletely, according to the principle of force decomposition, the two motors are controlled to rotate, and the active compensation motion is transferred to the movable platform 32 through the damping output device.

In the embodiment, the motors in the roll direction and the pitch direction are respectively arranged for active compensation, and output through the guide pillar 41, so that left-right and front-back sway is reduced, the high frequency vibration of the same platform is reduced, and thus, the stability of the damped target is improved.

Preferably, the active pitch damping device further specifically includes a pitch decelerator support 31, a pitch decelerator 47, a pitch motion output support 33, and a bearing pedestal 46; the pitch decelerator support 31 is fixed on the bottom platform 29; one end of the pitch decelerator support 31 is connected to the pitch motor 30 and the other end thereof is connected to the pitch decelerator 47; one end of the pitch motion output support 33 is connected to the pitch decelerator 47, and the other end thereof is connected to the bearing pedestal 46; and the bearing pedestal 46 is fixed on the bottom platform 29;

the pitch motion output support 33 specifically includes a pitch mounting base 68 and a motor mounting block 69; one end of the pitch mounting base 68 is fixedly mounted on the pitch decelerator 47, and the other end thereof extends outwards along a center of the pitch mounting base 68 to form the motor mounting block 69; and the pitch mounting base 68 and the motor mounting block 69 form a T-shaped structure;

a roll device mounting hole is formed at a center of the motor mounting block 69, and the active roll damping device is mounted on the pitch motion output support 33 through the roll device mounting hole.

In specific implementation of damping in the pitch direction, as the motor itself is not usually a high horse power motor but a low horse power servo motor, the motor features relatively small twisting force, so a corresponding decelerator needs to be arranged to output a large twisting force.

Specifically speaking, a fixed bearing pedestal 46 and the pitch decelerator support 31 are fixed on the bottom platform 29, one end of the pitch decelerator 47 is connected to the pitch motor 30 and the other end thereof is connected to the pitch motion output support 33, the formed whole is arranged between the fixed bearing pedestal 46 and the pitch decelerator support 31 in a bestriding manner, and the active roll damping device is mounted through the roll device mounting hole.

More specifically speaking, the side surface of the pitch motion output support 33 is T-shaped, the T-shaped structure of the pitch motion output support 33 is provided with a plurality of mounting holes including a pitch decelerator mounting hole 58 formed in the bottom of the pitch mounting base 68, and the pitch motion output support 33, the pitch decelerator 47, and the pitch motor 30 form a whole through the mounting hole. Therefore, the active compensation motion of the pitch motor 30 is conducted to the pitch motion output support 33, so that the compensation is transferred to the output support 43 through the active roll damping device arranged on the pitch motion output support 33. The roll device mounting hole specifically includes a roll decelerator mounting hole 61 and a roll motor base mounting hole 63 respectively used for mounting the roll decelerator and the roll motor, and a bearing pedestal mounting hole 62 is formed for mounting the bearing pedestal 34.

Further preferably, the active pitch damping device further includes pitch anti-collision blocks 49 and a pitch anti-collision pad 48; the pitch anti-collision pad 48 is mounted on the bottom platform 29 and is located below the pitch decelerator support 31; the pitch anti-collision blocks 49 are mounted on both sides of the pitch motion output support 33, and rotate along with rotation of the active pitch damping device; and when the pitch anti-collision blocks 49 impact to the pitch anti-collision pad 48 in a rotating process, the pitch anti-collision pad 48 is matched with the pitch anti-collision blocks 49 to limit further rotation of the active pitch damping device.

Meanwhile, in a specific rotating process, to prevent the pitch motion output support 33 from directly impacting on the bottom platform 29 to damage the bottom platform 29 or the pitch motion output support 33, the pitch anti-collision pad 48 is arranged on the bottom platform 29, and the corresponding anti-collision blocks 49 are arranged in positions corresponding to both sides of the pitch motion output support 33, so that in the rotating process of the pitch motion output support 33, the rotating range is limited between two collision points between the anti-collision blocks 49 and the pitch anti-collision pad 48.

More specifically speaking, the pitch motion output support 33 is provided with pitch anti-collision mounting holes 59 which are respectively formed in both sides of the pitch motion output support 33 on the axis taking the inverted trapezoidal T-shaped structure of the pitch mounting base 68 as the longitudinal structure for mounting the pitch anti-collision blocks 49.

Further preferably, the active roll damping device further specifically includes a roll decelerator 45 and a roll motion output support 43, wherein one side of the roll motion output support 43 is connected to the output support 43 and the other side thereof is connected to the roll decelerator 45; and one side of the roll decelerator 45 is connected to the roll motion output support 43 and the other side thereof is connected to the pitch motion output support 33; the roll motion output support 43 specifically includes a mounting base and an output connecting block 70, wherein one side of the mounting base is connected to the output connecting block 70 and the other side thereof is connected to the roll decelerator 45; and one end of the output connecting block 70 is connected to the mounting base and the other end thereof is connected to the output support 43.

In the preferred embodiment, the roll motion device arranged on the pitch motion output support 33 will perform a pitch motion along with the pitch motion output support 33 and outputs motion through the roll decelerator 45 because the motor 34 itself is not usually a high horse power motor but a low horse power servo motor, the motor features relatively small twisting force, so a corresponding decelerator needs to be arranged to output a large twisting force. The mounting base arranged on the roll decelerator 45 performs a rotating motion along with the roll decelerator 45, drives the output connecting block 70 to rotate, and further acts the motion on the output support 43 for motion compensation. Meanwhile, the roll decelerator mounting hole 67 is formed in the mounting base for mounting the roll decelerator.

Further preferably, the active roll damping device includes a damper 44, wherein one end of the damper 44 is connected to the output connecting block 70 and the other end thereof is connected to the movable platform 32 through a revolute pair.

In the preferred embodiment, by additionally arranging the damper 44 in the device, the damping efficiency can be improved as far as possible, very small friction and air resistance in the system can be compensated, and the frequency response can be improved greatly.

Specifically speaking, the damper 44 is mounted between the output connecting block 70 and the movable platform 32; the lower end of the damper 44 is fixed to the output connecting block 70, and is fixed through a damper mounting hole 66 formed in the output connecting block 70; the upper end of the damper is connected to the movable platform 32 through the revolute pair, and the axis of the revolute pair is parallel to the rotating axis of the pitch motor 30; and as the axis of the revolute pair is parallel to the rotating axis of the pitch motor 30, in the moving process, break of the revolute pair due to motion of the pitch motor 30 will be avoided.

Further preferably, the roll motion output support further includes a roll anti-collision block 51 and a roll anti-collision pad 52, wherein the roll anti-collision pad 52 is arranged on a side, adjacent to the damping output device, of the pitch motion output support 33; the roll anti-collision block 51 is arranged on a side surface of the mounting base, and rotates along with rotation of the roll motor 34; when the roll anti-collision block 51 impacts to the roll anti-collision pad 52 in a rotating process, the roll anti-collision pad 52 limits further rotation of the active roll damping device.

In the further preferred embodiment, in a specific rotating process, to prevent the pitch motion output support 43 from directly impacting on the bottom platform 29 to damage the bottom platform 29 or the output support 43, the roll anti-collision pad 52 is arranged on the side, adjacent to the roll anti-collision pad 52, of the pitch motion output support 33, and the corresponding anti-collision blocks 51 are arranged in positions corresponding to the side surface of the mounting base, so that in the rotating process of the output support 43, the rotating range is limited between two collision points between the anti-collision blocks 51 and the pitch anti-collision pad 52.

In terms of specific mounting, the roll anti-collision mounting holes 64 are symmetrically formed in the side surface and the top surface of the mounting base by taking the output connecting block 70 as an axis of symmetry, and the roll anti-collision pad mounting hole 57 is formed in the side, adjacent to the output support 43, of the pitch mounting base 68 of the pitch motion output support 33 for mounting the roll anti-collision pad 52. Meanwhile, a roll limiting switch reserved hole 60 is reserved for reserving a refitting position for a limiting switch in the future.

Preferably, axis of rotation of the pitch motor 30 perpendicularly intersects with axis of rotation of the roll motor 34 all along.

Preferably, a ball guide sleeve 42 is arranged between the output support 43 and the guide pillar 41; and the output support 43 moves up and down along the guide pillar 41 through the ball guide sleeve 42.

In the moving process, as a result of large probable sway, it is assumed that the output support 43 is rigidly connected to the guide pillar 41, so in the using process, the guide pillar 41 will break as it cannot bear the so large force due to large sway. Therefore, in the embodiment, the ball guide sleeve 42 is arranged between the output support 43 and the guide pillar 41, so that the output support 43 and the guide pillar 41 are not rigidly fixed but the output support 43 moves up and down on the guide pillar 41. Therefore, the guide pillar 41 is prevented from breaking due to rigid fixation.

Preferably, both ends of the guide pillar 41 are provided with limiting bosses, and when the output support 43 impacts to the limiting bosses in the up-down moving process, the limiting bosses limit further movement of the output support 43 towards an edge of the guide pillar 41.

Embodiment 6

The embodiment provides a damping device, adopting the active compensation algorithm for an inertia force of on-board equipment in the embodiment 3.

As shown in FIGS. 30-38, the damping device provided by the embodiment includes: a movable platform 32 for being connected to a damped target; a bottom platform 29, wherein the active pitch damping device is fixed on the bottom plate 29; the active pitch damping device includes a pitch motor 30; an active roll damping device, arranged on the active pitch damping device and driven by the pitch motor 30 to rotate around a rotating shaft of the pitch motor 30, wherein the active roll damping device includes a roll motor 34 for driving the active roll damping device to rotate; a damping output device, wherein the damping output device specifically includes a guide pillar 41 and an output support 43, the output support 43 is fixed on the active roll damping device, and the output support 43 is internally provided with a guide hole 65; and the guide pillar 41 passes through the guide hole 65 and is connected to the movable platform 32.

The damping device further includes a passive damping device, specifically including an air spring 39, wherein one end of the air spring 39 is arranged on the movable platform 32 and the other end thereof is arranged on the bottom platform 29; the bottom platform 29 is further provided with an air pump 35, and is connected to the air spring 39 through a gas pipeline 50 for maintaining a pressure of the air spring 39; there are four air springs 39; and the air springs 39 are respectively arranged at four corners of the bottom platform 29.

In the embodiment, the passive damping device shall be arranged while active damping is arranged to control high frequency vertical vibration. In the implementation mode, passive damping is usually achieved by using the four air springs 39 distributed at four corners of the bottom platform 29 and the movable platform 32, and the air pump 35 is connected through the gas pipeline 50 extending to the air springs 39, so that the internal air pressure in the air springs 39 is maintained.

By taking automobile operation as an example, when the movable platform 32 generates vibration, the air springs 39 located at the four corners of the bottom platform 29 deform correspondingly as the buffer pads to buffer the movable platform 32, so as to eliminate influence of the high frequency vertical vibration on the movable platform 32.

By combining active damping and passive damping, when there is high frequency vertical vibration, the air springs 39 will play a passive damping role, so that influence of the high frequency vertical vibration on the movable platform 32 is alleviated.

Preferably, the passive damping device further includes an air spring bottom pillar 38 arranged on the bottom platform 29 for fixedly connecting the air spring 39 and the bottom platform 29; and the gas pipeline 50 is connected to the air spring 39 through the air spring bottom pillar 38. The bottom platform 29 is provided with an air spring bottom pillar mounting hole 56.

In the preferred embodiment, the bottom platform 29 is provided with an air spring 39 basal pillar mounting hole 10; the air spring bottom pillar 38 is mounted on the bottom platform 29 through the air spring 39 basal pillar mounting hole 10, and the gas pipeline 50 enters the air spring bottom pillar 38 from the air spring 39 basal pillar mounting hole 10 formed in the bottom platform 29 and is then connected to the air spring 39 through the air spring bottom pillar 38, so that the air pump 35 can inflate the air spring 39.

Further preferably, the air spring 39 is internally provided with an air pressure sensor, the air pressure sensor is electrically connected to an automatic air pressure inflating control panel 36;

when the air pressure sensor detects that the air pressure in the air spring 39 is lower than a preset air pressure, the automatic air pressure inflating control panel 36 controls the air pump 35 to inflate the air spring 39 through the gas pipeline 50.

In the preferred embodiment, the air spring 39 is internally provided with the air pressure sensor for detecting the air pressure in the air spring 39 and transmitting the air pressure to the automatic air pressure inflating control panel 36, so that the air pump 35 is controlled through the automatic air pressure inflating control panel 36.

More specifically speaking, when the air pressure in the air spring 39 detected by the air pressure detector is lower than the preset air pressure, the automatic air pressure inflating control panel 36 sends out an inflating command to control the air pump 35 to inflate a high pressure gas into the air spring 39 through the gas pipeline 50; and the high pressure gas is inflated into the air spring 39 through the gas pipeline 50 by passing through the air spring bottom pillar 38, so that the air pressure in the air spring 39 is maintained at a target value.

Embodiment 7

The embodiment provides a damping device, adopting the active compensation algorithm for an inertia force of on-board equipment in the embodiment 3.

As shown in FIGS. 30-38, the damping device provided by the embodiment includes: a movable platform 32 for being connected to a damped target; a bottom platform 29, wherein the active pitch damping device is fixed on the bottom plate 29; the active pitch damping device includes a pitch motor 30; an active roll damping device, arranged on the active pitch damping device and driven by the pitch motor 30 to rotate around a rotating shaft of the pitch motor 30, wherein the active roll damping device includes a roll motor 34 for driving the active roll damping device to rotate; a damping output device, wherein the damping output device specifically includes a guide pillar 41 and an output support 43, the output support 43 is fixed on the active roll damping device, and the output support 43 is internally provided with a guide hole 65; and one end of the guide pillar 41 is connected to the bottom platform 29, and the other end thereof passes through the guide hole 65 and is connected to the movable platform 32.

The damping device further includes an attitude sensor 53, a master control panel 37, and a motor driver 54; wherein the attitude sensor 53 is electrically connected to the master control panel 37 and is configured to detect the acceleration of the damped target to generate an acceleration signal and transmit the acceleration signal to the master control panel 37, and the master control panel 37 controls the motor driver 54 according to the acceleration signal to drive the pitch motor 30 and the roll motor 34 to operate.

In the embodiment, the bottom platform 29 is provided with the attitude sensor 53, the master control panel 37, and the motor driver 54. The attitude sensor 53 is usually achieved by directly using the acceleration sensor and is configured to detect the acceleration of the damped target, and the master control panel 37 achieves driving control of the motor according to the acceleration. Meanwhile, the bottom platform is provided with a power interface 55 for supplying power to all electrical equipment and providing 48V and 12V voltages.

Specifically speaking, when the master control panel 37 considers that it is necessary to compensate the data transmitted by the attitude sensor 53 to the master control panel 37, the master control panel 37 sends out a corresponding driving signal to the motor driver 54. Controlled by the driving signal, the motor driver 54 sends out motion signals to the pitch motor 30 and the roll motor 34, so as to control operations of the pitch motor 30 and the roll motor 34.

By arranging the attitude sensor 53 in the embodiment, the active damping direction is detected by the attitude sensor 53, so that the damping efficiency is effectively improved, and the comfort in the damping process is enhanced.

Further preferably, when the attitude sensor 53 detects the linear acceleration of the damped target, the master control board 37 controls the motor driver 54 according to the linear acceleration to drive operation of the pitch motor 30.

In the preferred embodiment, by taking the automobile as an example, when the attitude sensor 53 detects the linear acceleration, it indicates braking or accelerating conditions. The automobile will generate linear vibration in the front-back direction during braking and accelerating, and in this case, it will generate the motion acceleration to the passenger in the pitch direction, so that the passenger pitches front and back. In this case, the active pitch damping device starts the pitch motor 30 to rotate to provide a reverse motion compensation to the movable platform 32, so that the passenger may not swing front and back.

Further preferably, when the attitude sensor 53 detects the centripetal acceleration of the damped target, the master control panel 37 controls the motor driver 54 according to the centripetal acceleration to drive operation of the roll motor 34.

In the preferred embodiment, by taking the automobile as an example, when the attitude sensor 53 detects the centripetal acceleration, it indicates sudden turning, and the like. When the automobile takes a sudden turn, it will generate linear vibration in the left-right direction, and in this case, the roll motor 34 needs to provide a linear acceleration in the left-right direction for reverse motion compensation, so that the passenger may not swing left and right.

The present invention further provides a seat, including a seat body and the damping device according to the embodiments 5-7. The seat body is fixed on a movable platform 32 of the damping device.

In the embodiment, the damping device is usually applied to the seat to compensate vibration of the seat. The seat can be arranged either on an automobile or an airplane, and can be adjusted according to an actual demand.

The present invention further provides an automobile, using the above seat.

In the embodiment, the seat is usually applied to the automobile for enhancing the comfort level of the automobile passenger.

Specifically speaking, when the attitude sensor 53 detects the linear acceleration, it indicates braking or accelerating conditions. The automobile will generate linear vibration in the front-back direction during braking and accelerating, and in this case, it will generate the motion acceleration to the passenger in the pitch direction, so that the passenger pitches front and back. In this case, the active pitch damping device starts the pitch motor 30 to rotate to provide a reverse motion compensation to the movable platform 32, so that the passenger may not swing front and back. When the attitude sensor 53 detects the centripetal acceleration, it indicates sudden turning, and the like. When the automobile takes a sudden turn, it will generate centripetal vibration in the left-right direction, and in this case, the roll motor 34 needs to provide a centripetal acceleration in the left-right direction for reverse motion compensation, so that the passenger may not swing left and right.

The following beneficial effects are achieved by the embodiments 5-7:

(1) the motors in the roll direction and the pitch direction are respectively arranged for active compensation, so that the left-right and front-back sway is reduced, and outputting is performed by the guide pillar, so that the high frequency vibration of the same platform is reduced, and thus, the stability of the damped target is improved;

(2) by combining active damping and passive damping, when there is high frequency vertical vibration, the air springs will play a passive damping role, so that influence of the high frequency vertical vibration on the movable platform is alleviated; and (3) by arranging the attitude sensor in the embodiment, the active damping direction is detected by the attitude sensor, so that the damping efficiency is effectively improved, and the comfort in the damping process is enhanced.

Embodiment 8

The embodiment provides an active damping seat, adopting the damping device in any one embodiment of the embodiments 5-7, and adopting the active compensation algorithm for an inertia force of on-board equipment in the embodiment 3.

Referring to FIGS. 40-43, the active damping seat in the preferred embodiment includes a seat base 71 and a self-balancing damping device 72, wherein the seat base 71 is mounted on the self-balancing damping device 72; the self-balancing damping device 72 is applicable to mounting carrying equipment, including a sensing module 721, a damping device 722, and a control module 723; the sensing module 721 is configured to acquire motion data of the carrying equipment; the control module 723 is configured to receive the data of the sensing module 721 and to control motion parameters of the damping device 722; and the damping device 722 includes a first rotating assembly 7221 and a second rotating assembly 7222, wherein the first rotating assembly 7221 is applicable to being mounted on the carrying equipment, the second rotating assembly 7222 is mounted at a driving end of the first rotating assembly 7221, and the first rotating assembly 7221 and the second rotating assembly 7222 are capable of driving the seat 71 to perform roll and pitch motions;

when the first rotating assembly 7221 drives the seat base 71 to perform the roll motion, the second rotating assembly 7222 drives the seat base 71 to perform the pitch motion; or the first rotating assembly 7221 drives the seat base 71 to perform the pitch motion, the second rotating assembly 7222 drives the seat base 71 to perform the roll motion.

Figure 39:
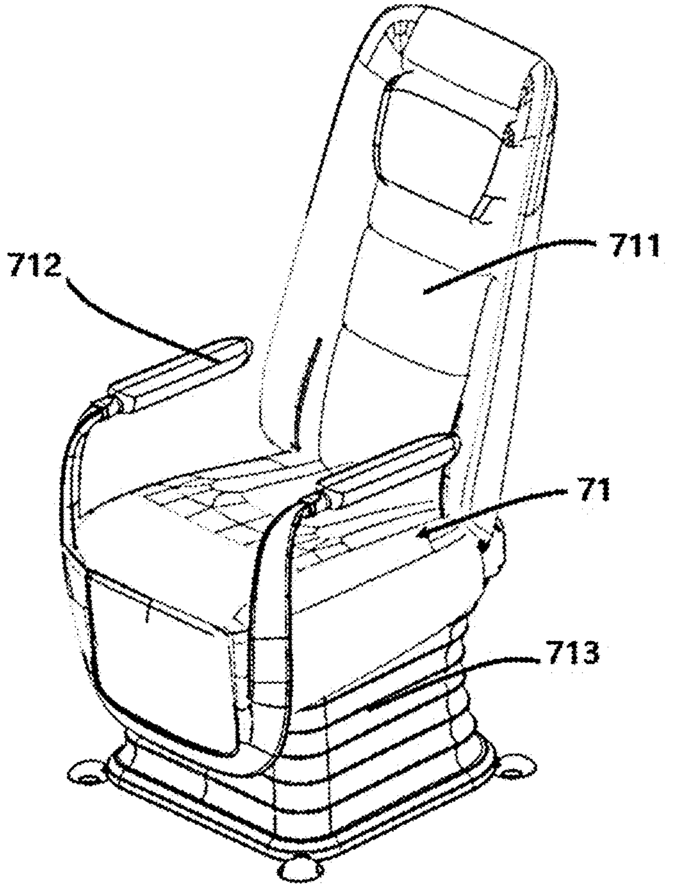
FIG. 39 is an overall diagram of an active damping seat in an embodiment of the present invention.
Figure 40:
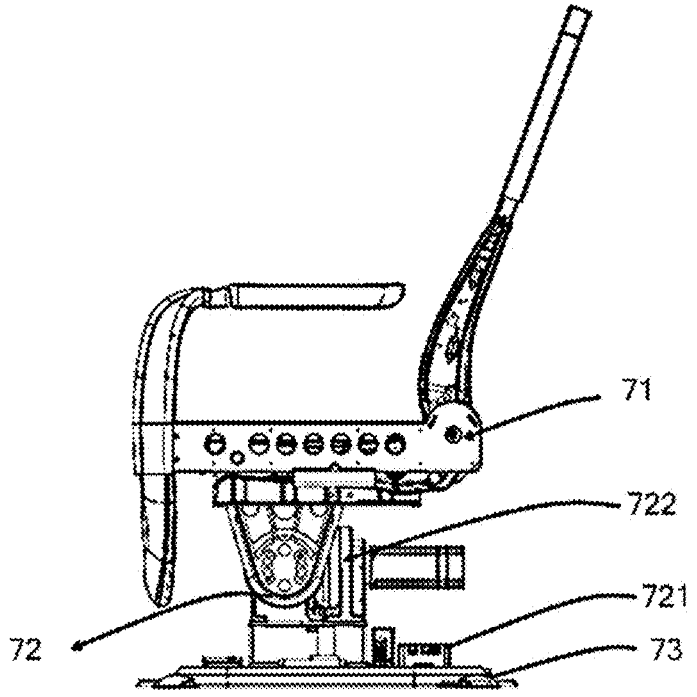
FIG. 40 is a right view of the active damping seat in an embodiment of the present invention.
Figure 41:
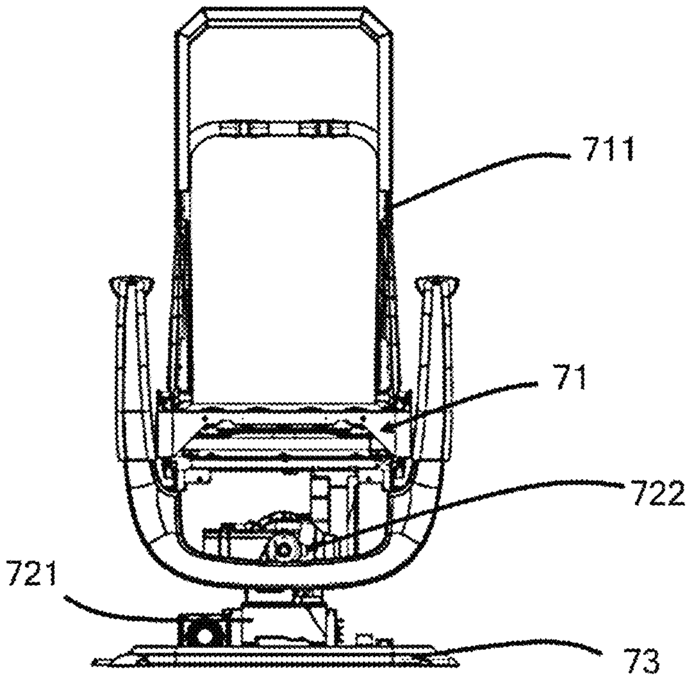
FIG. 41 is a front view of the active damping seat in an embodiment of the present invention.
Figure 42:
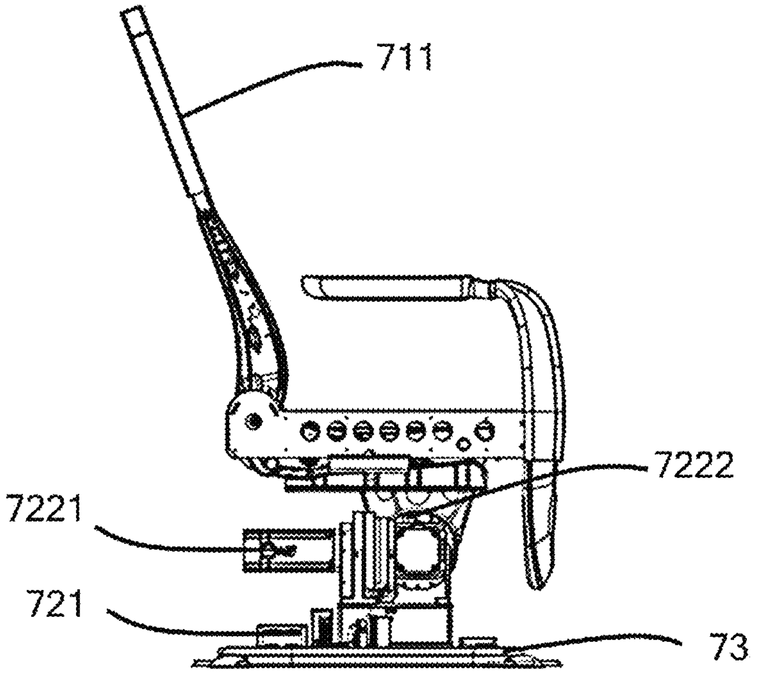
FIG. 42 is a left view of the active damping seat in an embodiment of the present invention.
Figure 43:
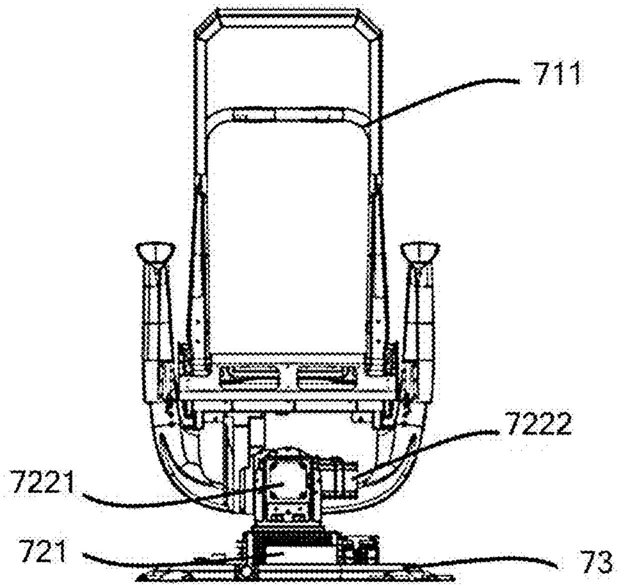
FIG. 43 is a rear view of the active damping seat in an embodiment of the present invention.

Referring to FIG. 39, the seat base 71 in the embodiment includes a seat back 711, an armrest 712, and a rubber ring 713. The seat back 711 is convenient for a driver to lean against, so that the comfort and the wrapping performance of the active damping seat are improved. The armrest 712 is convenient for the driver to place arms and place some objects as well. The self-balancing damping device 72 is placed in the rubber ring 713, the rubber ring is capable of being hermetic and waterproof, and the rubber ring 713 shrinks with motion of the self-balancing damping device 72, and is difficultly damaged.

In the embodiment, the sensing module 721 is mounted in the self-balancing damping device 72 to acquire motion data of the carrying equipment; the control module 723 can control the first rotating assembly 7221 and the second rotating assembly 7222 to operate according to the motion data acquired by the sensing module 721 so as to control the degrees of freedom of motions in roll and pitch directions of the seat base 71, i.e., to provide a reverse action force in the inclined direction of the seat base 71, so that the seat base 71 is kept stable, thereby achieving a self-balancing damping effect. The motion data of the carrying equipment can specifically include, for example, vehicle velocity, displacement, acceleration, and the like. In the patent, the active damping device 2 is assembled on the seat base 71 to form a self-balancing damping system, which effectively damps the seat base 71 in a high frequency low amplitude environment and a low frequency high amplitude environment, thereby achieving the self-balancing damping effect. Therefore, the seat base 71 is kept in a stable operating state all along.

It is worth noting that in the embodiment, the carrying equipment can be, for example, any traffic tool such as a vehicle, a ship or a yacht. The active damping seat provided in the embodiment can be applied to a driver's cab of the any traffic tool, which is not limited herein. Of course, for the convenience of illustrating the technical solution in a clear and detailed manner, the carrying equipment provided in the embodiment is specifically explained and described by taking the vehicle as an example.

The sensing module 721 can collect motion data of the vehicle in real time and actively control the first rotating assembly 7221 and the second rotating assembly 7222 of the damping device 722 to operate according to the motion data; the first rotating assembly 7221 and the second rotating assembly 7222 are jointed and matched in an assisted manner to control the degrees of freedom of motions in the roll and pitch directions of the seat base 71, i.e., to provide the reverse action force in the incline direction of the seat base 71 relative to the vehicle. The two forces are counteracted, so that the seat base will not change in attitude synchronously with the vehicle. The seat base is ensured to be kept in a stable state all along, so that it can be ensured that the active damping seat is capable of being kept stable all along.

Figure 44:
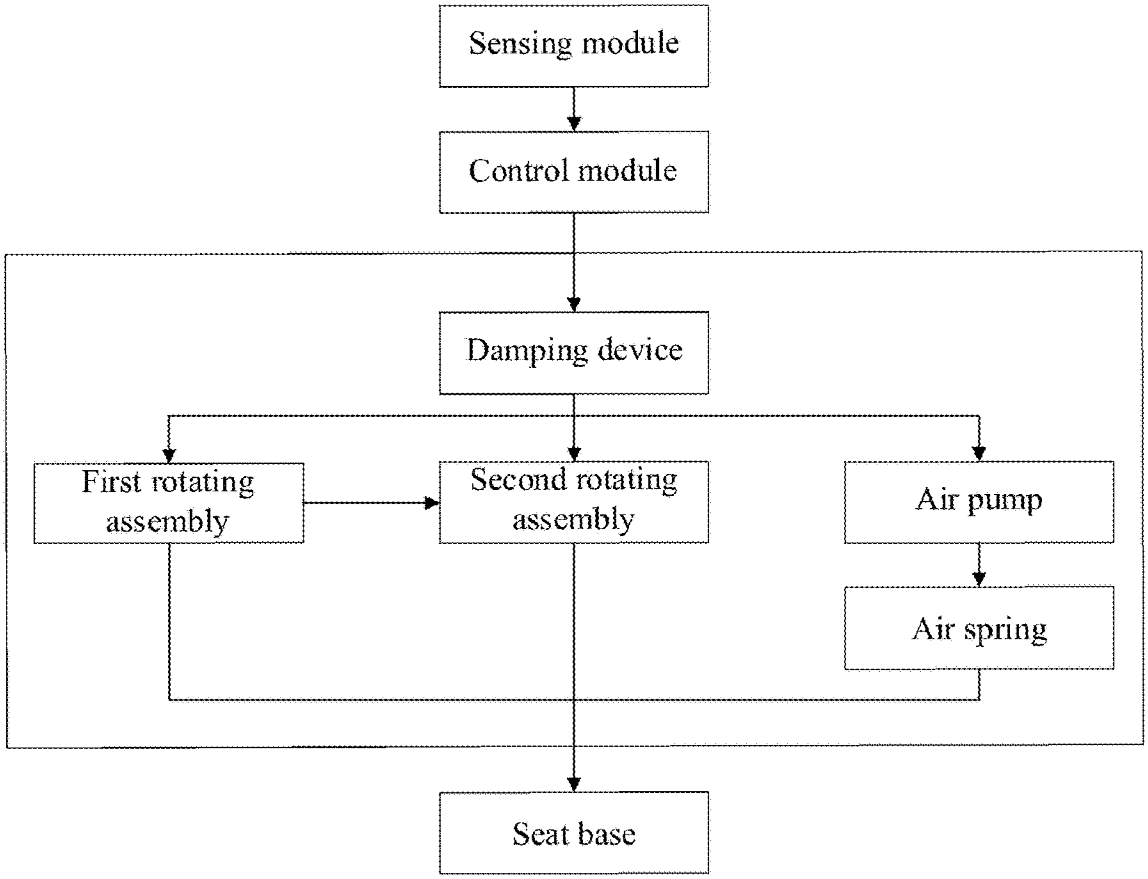
FIG. 44 is a control flow chart of a control module in an embodiment of the present invention.
Figure 45:
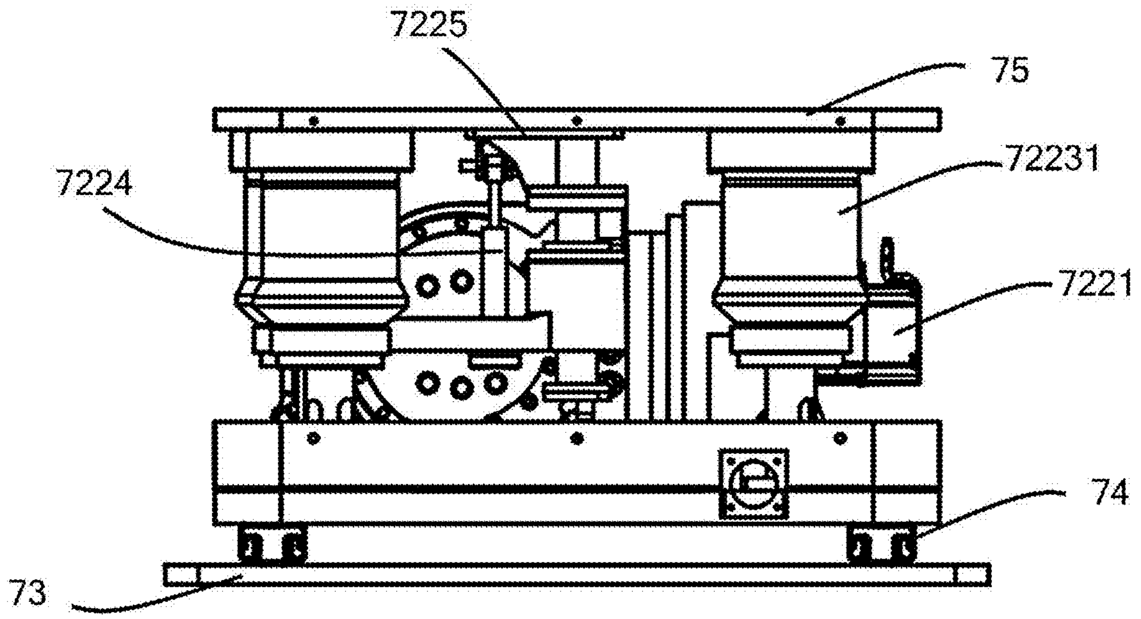
FIG. 45 is a front view of a self-balancing damping device in an embodiment of the present invention.
Figure 46:
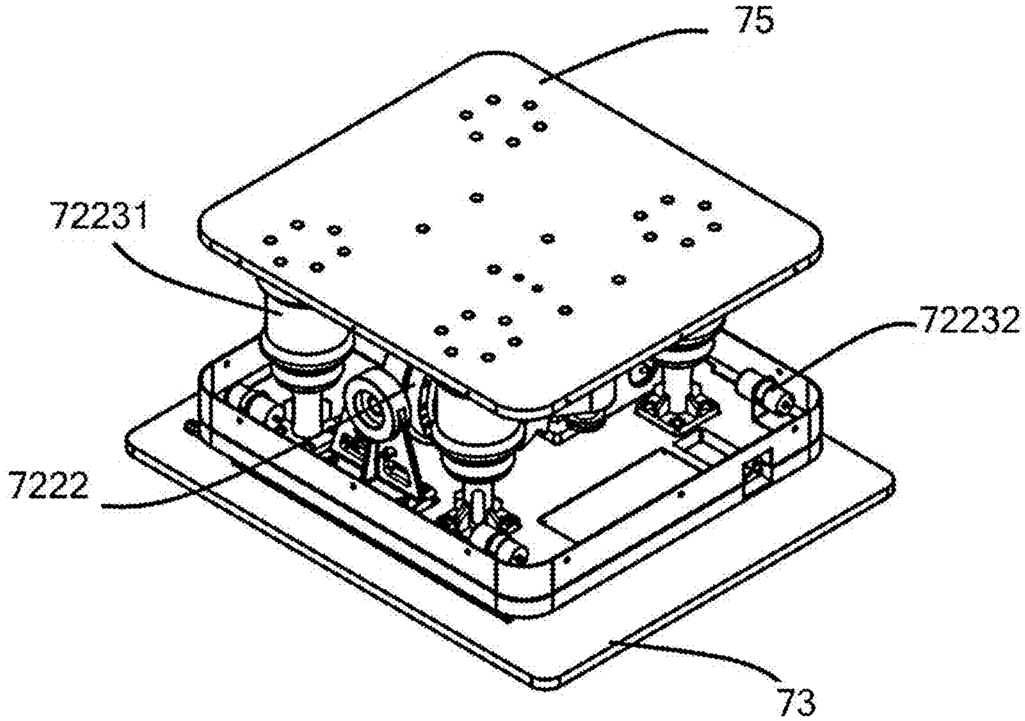
FIG. 46 is a front side view of the self-balancing damping device in an embodiment of the present invention.
Figure 47:
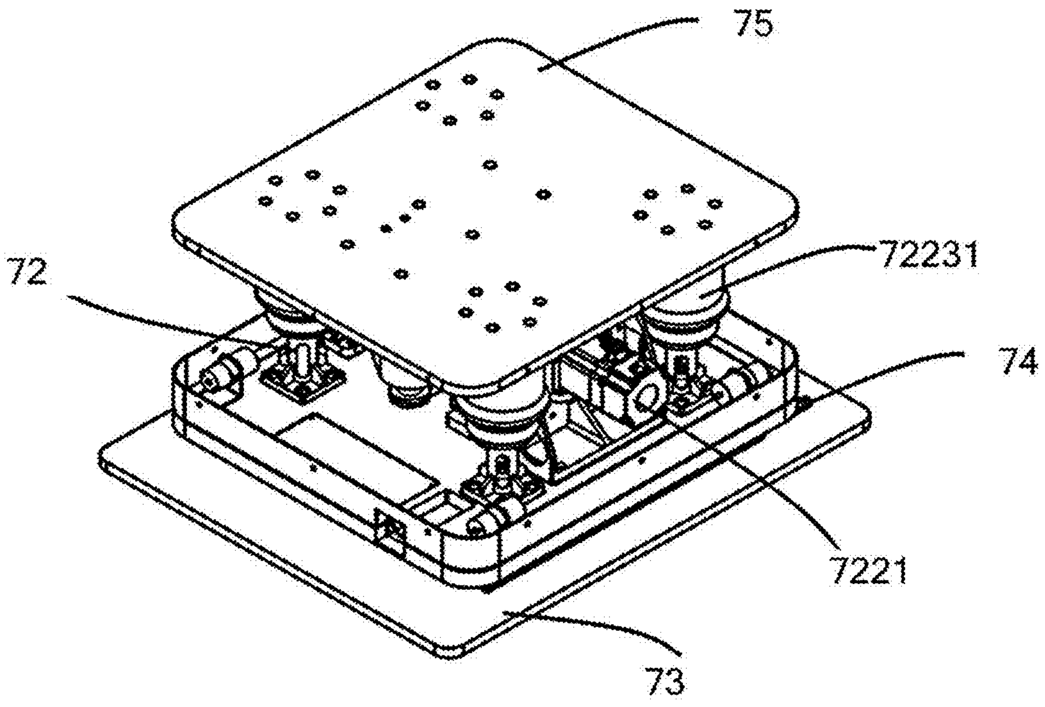
FIG. 47 is a rear view of the self-balancing damping device in an embodiment of the present invention.
Figure 48:
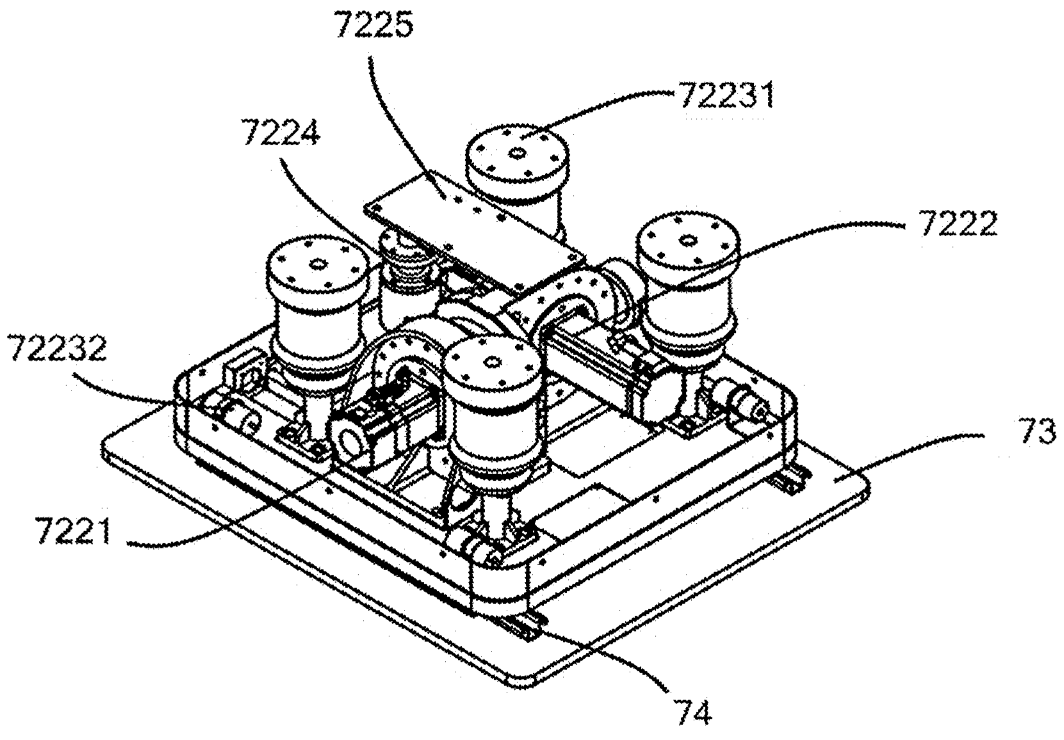
FIG. 48 is a structural diagram of the self-balancing damping device in an embodiment of the present invention.

Specifically, referring to FIG. 44, when the carrying equipment is subjected to vibration, the sensing module 721 will measure motion data such as an attitude angle deviation and an acceleration variable quantity of the seat base 71 in a balanced state, and transfers the motion data in real time to the control module 723. To keep the seat base 71 be balanced all along, i.e., the attitude of the seat base 71 does not change with change of the attitude of the carrying equipment, the control module 723 can calculate parameters such as velocity, displacement, and acceleration needed by the first rotating assembly 7221 and the second rotating assembly 7222 to make the seat base 71 be kept balanced based on an active and passive damping self-balancing algorithm of a series-parallel robot, and performs corresponding actions according to commands of the control module 723, so as to achieve self-balancing of the seat base.

It is to be specifically illustrated that the first rotating assembly 7221 and the second rotating assembly 7222 both can be driven by the motors independently, wherein the second rotating assembly 7222 can be driven by either the motors or the first rotating assembly 7221 as it is mounted at the driving end of the first rotating assembly 7221. Therefore, when only the roll or pitch motion in the single direction is needed, the second rotating assembly 7222 can be directly driven by the motor to achieve the reverse motion of the seat base 71, so that it is ensured that the seat base 71 is kept stable all along. When the roll and pitch motions in two directions are needed, the first rotating assembly 7221 and the second rotating assembly 7222 are rotated in a combined manner according to the commands of the control module 723 to provide a reverse equivalent action force relative to the inclined direction of the vehicle, thereby ensuring that the seat base 71 is stable all along.

The above damping device is without the passive damping device. The embodiment further provides a damping seat with a passive damping device, as shown in FIGS. 45-48.

Referring to FIGS. 45-48, further, in the embodiment, the damping device 722 further includes an elastic damping assembly 7223, wherein a top end of the elastic damping assembly 7223 is mounted on the seat base 71, and a bottom end thereof is fixed to a mounting plane of the self-balancing damping device 72 for applying an action force to the seat 1 in the height direction.

The mounting plane of the self-balancing damping device 72 can be either the carrying equipment or a bottom surface of the active damping seat. When the mounting plane of the self-balancing damping device 72 is the bottom surface of the active damping seat, the self-balancing damping device 72 and the elastic damping assembly 7223 are internal parts of the active damping seat.

It is worth noting that the control module 723 can control the elastic damping assembly 7223 to actively drive the seat base 71 to move up and down in the height direction, so as to provide the action force to the seat 1 in the height direction. Meanwhile, the control module 723 can further control the elastic damping assembly 7223 to assist the first rotating assembly 7221 and the second rotating assembly 7222 to coordinate to work, so as to control the degrees of freedom of motions of the seat base 71 in the roll and pitch directions, thereby enhancing the damping performance of the active damping seat.

Specifically, referring to FIG. 44, when the vehicle is subjected to a front-back pitch motion, a left-right roll motion, an inertial motion, and the like due to an external force, the suspension system of the vehicle itself will buffer part of high frequency vibration at the vehicle chassis. The self-balancing damping device 72 can be mounted on the vehicle chassis. Low frequency vibration and part of unbuffered high frequency vibration will be transferred to the self-balancing damping device 72 through the suspension system. The elastic damping assembly 7223 mounted on the self-balancing damping device 72 can actively drive the seat base 71 to move up and down in the height direction according to the high frequency vibration to effectively alleviate the part of residual high frequency vibration, thereby ensuring that the seat base 71 is kept stable in the height direction. Meanwhile, when the vehicle takes emergency braking, the seat base 71 will generate a huge forward inclining action force due to the inertial action, and the elastic damping assembly 7223 will assist the first rotating assembly 7221 to provide an action force with a reverse forward inclining direction to the seat base 71. In detail, when the vehicle takes emergency braking, the front end of the seat base 71 will have a downward moving inertia force, which makes the seat base 71 incline front and back. In this case, the control module 723 will control the motor to drive the first rotating assembly 7221 to drive the seat base 71 to rotate backwards, so that the front end and the back end of the seat base 71 area kept stable. The elastic damping assembly 7223 at the front end will also improve the lift force in the height direction, so that the lift force is larger than the lift force of the elastic damping assembly 7223 in the height direction to assist the first rotating assembly 7221 to control the degree of freedom of motion of the seat base 71 in the pitch direction, and therefore, the front end and the back end of the seat base 71 can be kept stable more rapidly and sensitively. When the vehicle is subjected to rollover, the same is true. There will form a difference value between the lift forces of the elastic damping assemblies 7223 at the left and right ends in the height direction for assisting the second rotating assembly 7222 to control the degree of freedom of motion of the seat base 71 in the roll direction.

It is worth noting that there is no limitation on the specific quantity of the elastic damping assemblies 7223, and the elastic damping assemblies can be flexibly arranged to actual using demands.

Preferably, there are four elastic damping assemblies 7223 located at four corners of the seat base 71, respectively.

The four elastic damping assemblies are distributed at the four corners of the seat base 71 to effectively alleviate the part of residual high frequency low amplitude vibration and also response to the seat base 71 most sensitively, so that the stability of the active damping seat equipment is effectively improved.

Further, the elastic damping assembly 7223 further includes an air spring 72231, wherein a top end of the air spring 72231 is mounted on the seat base 71, and a bottom end thereof is mounted on the mounting plane of the self-balancing damping device 72.

The air spring 72231 has an excellent nonlinear hard characteristic, is capable of effectively limiting the amplitude, avoiding resonance, and preventing impact, and features wide load range, low inherent frequency, good vibration isolation effect, compact structure, small overall size, convenient installation, good service life, high adaptability to the working environment, and the like. The air spring 72231 can be used to control the degree of freedom of motion of the seat base 71 in the height direction. Meanwhile, as the air spring 72231 mainly uses air as a medium, active control is easily implemented.

It is worth noting that the elastic damping assembly 7223 can also be any other spring damping member, which is not limited herein.

Further, the elastic damping assembly 7223 further includes an air pump 35. The air pump 35 is connected to the air spring 72231 and is further connected to the control module 723. The control module 723 is capable of controlling the air pump 35 to work based on data of the sensor module 21, so as to control the air spring 72231 to drive the seat base 71 to move in the height direction.

Referring to FIG. 44, in the embodiment, the control module 723 controls motion of the air spring through the air pump 35 by inflating an air bag in the air spring 72231. Specifically, when the vehicle takes emergency braking, the front end of the seat base 71 will have an inertia force of a downward pitch motion, which makes the seat base 71 to incline front and back. The control module 723 controls the air pump 35 to inflate compressed air into the air bag of the air spring 72231 at the front end to form a compressed air column. The air pressure of the air bag increases continuously to lift up and the front end of the seat base 71, so that the seat base 71 is kept stable and balanced front and back.

Further, the damping device 722 further includes a telescopic rod 7224, wherein one end of the telescopic rod 7224 is connected to the seat base 71 and the other end thereof is connected to a plane of the self-balancing damping device 72 for controlling the seat base 71 to move within a limited range in the process that the damping device 722 controls the seat base 71 to move.

In the embodiment, the telescopic rod 7224 is connected to the seat base 71 and the self-balancing damping device 72 to prevent the seat base 71 from being separated from the self-balancing damping device 72 when the damping device 722 drives the seat base 71 to move, so as to control the moving range of the seat base 71 within an effective range.

Specifically, when the vehicle takes emergency braking, to keep the seat base 71 stable, the control module 723 will control the damping device 722 to perform a degree-of-freedom motion in the pitch direction on the seat base 71. As the vehicle inclines forwards severely, the motion of the damping device 722 in the pitch direction will be great in amplitude, and in this case, the telescopic rod 7224 also stretches up and down along with the pitch motion of the seat base 71 to tightly connect the seat base 71 to the self-balancing damping device 72, so as to prevent the seat base 71 and the self-balancing damping device 72 from being separated up and down due to the great amplitude of the pitch motion.

Further, the telescopic rod 7224 is located on an outer side of a driving end of the second rotating assembly 7222, and the seat base 71 is provided with a mounting plate 7225 in a position corresponding to the telescopic rod 7224 for fixing the telescopic rod 7224 to face one end of the seat base 71.

In the embodiment, the mounting plate 7225 can improve the structural stability of the telescopic rod 7224 in the using process, so that the damping performance thereof is guaranteed. Preferably, a perforated hole can be formed in a position, corresponding to the mounting plate 7225, of the seat base 71, and the telescopic rod 7224 can be fixed in a perforated manner on the mounting plate 7225. The mounting plate 7225 can be in leaning fit with the perforated hole for limiting the seat base 71 from being separated from a free end of the telescopic rod 7224, so that the seat base 71 can move stably. Such a structure can expand the contact range of the telescopic rod 7224 and the seat base 71. The structure is not limited herein, and any structure will be within the protection scope of the patent.

Further, the active damping seat further includes a base 73, wherein the self-balancing damping device 72 is mounted on the base 73, and the base 73 is applicable to being mounted on the carrying equipment;

the active damping seat further includes a slide rail 74 mounted under the base 73 for adjusting the distance between the base 73 and the carrying equipment.

In the embodiment, the self-balancing damping device 72 is mounted on the base 73, and the active damping seat is integrally mounted on the carrying equipment. The slide rail 74 is an indispensable critical mechanical component for controlling the active damping seat, is an intermediate component to connect the whole seat to the carrying equipment, and has supporting performance. To control the adjusting function of the seat, front and back adjustment of the slide rail 74 is a common function of the seat.

Specifically, the self-balancing damping device 72 and the seat base 71 assembled are mounted on the base 73. The active damping seat is mounted on the slide rail 74 in the driver's cab of the vehicle through the base 73. A driver can control the slide rail 74 to adjust the front-back position of the base 73 according to his/her demand to seek for an appropriate seat position, so that the driver can keep a comfortable in-cabin space within the driver's cab. The slide rail 74 also features very high safety function. When the carrying equipment fails, a locking structure of the slide rail 74 has a strong safety protection characteristic, so that the slide rail is a quite important tool for the drivers and crews.

Further, the active damping seat further includes a fixed plate 75, the top end of the second rotating assembly 7222 is fixedly mounted on the fixed plate 75, and the fixed plate 75 is detachably mounted on the seat base 71.

The embodiment is applicable to water transport equipment such as a yacht, and is to mainly solve the inertial motion problem of the yacht caused by braking, turning and the like in the traveling process. The self-balancing damping device 72 can guarantee stability of equipment such as personnel and seats or other matters in the yacht only by solving the pitch motion and the roll motion caused by the inertial motion. Based on fluctuation of a current wave, according to the active damping seat in the embodiment, the air spring 72231 in the above embodiments is mounted to actively control the degree-of-freedom motion in the height direction, and other common spring damping members can be mounted to passively control the degree-of-freedom motion in the height direction to effectively alleviate part of high frequency low amplitude vibration, so as to effectively improve the stability of the seat equipment.

It is worth noting that in the above all embodiments, the self-balancing device 2 can be integrally designed as a whole on the fixed plate 75. The whole can be integrally assembled inside the active damping seat. The whole seat achieves the active damping action and is then assembled on the carrying equipment, or is taken as a whole connecting part independently to connect the active damping seat to the carrying equipment, thereby achieving the damping function of the active damping seat. Even under a certain circumstance, the fixed plate 75 can also be used as the seat base 71.

The cost can be saved while the structure in the embodiment is simplified, and the structure can also be widely applied to water transport equipment such as the yacht.

Further, in the preferred embodiment, provided is carrying equipment, including any one active damping seat in the above preferred embodiments.

The control module in the embodiment can control the first rotating assembly and the second rotating assembly to operate according to the motion data acquired by the sensing module so as to control the degrees of freedom of motions of the seat base in roll and pitch directions, i.e., to provide a reverse action force in the inclined direction of the seat base, so that the self-balancing damping effect is achieved;

the control module in the embodiment can control the elastic damping assembly to assist the roll and pitch motions of the first and second rotating assemblies, and the elastic damping assembly can further achieve the degree-of-freedom motion of the seat base up and down in the height direction to further enhance the active damping effect of the active damping seat;

In the embodiment, one end of the telescopic rod is connected to the seat base and the other end thereof is connected to the plane of the self-balancing damping device, which can guarantee that the damping device control the seat base top move within the limited range in the process of controlling the seat to move, so as to prevent sudden decrease of the active damping effect as the seat base and the self-balancing device are separated.

The algorithm provided by the present invention can calculate the centrifugal force compensation angle, so as to achieve a better centrifugal force compensation function to the seat body through the damping motor.

In description of the application, it should be understood that orientation or position relationships indicated by terms: 'upper, 'lower', 'front', 'back', 'left', 'right', 'vertical', 'horizontal', 'top', 'bottom', 'inner', 'outer' and the like are orientation or position relationships indicated by the drawings and are only to describe the disclosure and simplify the description rather than indicates or implies that the indicated device or components must have specific orientations and are configured and operated in the specific orientations. Therefore, it cannot be construed as limitations to the application.

Specific embodiments of the present invention are described above. It is needed to understand that the present invention is not limited to the specific embodiments, and those skilled in the art can made various variations or modifications within the scope of the claims without affecting the substantial contents of the present invention. In the absence of conflict, the embodiments of the application and features in the embodiments can be combined with one another arbitrarily.

What is claimed is:

1. A non-transitory computer readable media storing thereon an active compensation algorithm for an inertia force of on-board equipment, executed by a controller to perform the following steps:

a compensation angle acquisition step: acquiring an expected real-time inertia force compensation angle of a damped target when a vehicle takes a sudden turn or emergency braking based on velocity information, acceleration information, and angular velocity information of a vehicle chassis; and a control step: adjusting an angle of a damping motor by adopting a control algorithm according to the expected real-time inertia force compensation angle, wherein the damping motor keeps pace with the expected real-time inertia force compensation angle in real time.

2. The active compensation algorithm for the inertia force of the on-board equipment according to claim 1, wherein the compensation angle acquisition step comprises the following specific step:

calculating the expected real-time inertia force compensation angle of the damped target by a sensor fusion algorithm when the vehicle takes the sudden turn based on the velocity information, the acceleration information, and the angular velocity information of the vehicle chassis.

3. The active compensation algorithm for the inertia force of the on-board equipment according to claim 2, wherein the control step comprises the following specific step: adjusting the angle of the damping motor by adopting a proportional integral (PI) control algorithm according to the expected real-time inertia force compensation angle, wherein the damping motor keeps pace with the expected real-time inertia force compensation angle in the real time.

4. The active compensation algorithm for the inertia force of the on-board equipment according to claim 3, wherein the control step comprises the following steps:

a trajectory planning step: planning a trajectory of the damped target in a rebounding process after the vehicle turns according to a maximum inertia force compensation angle; and a PI control step: adjusting the angle of the damping motor by adopting the PI control algorithm according to the expected real-time inertia force compensation angle and a trajectory planning result, wherein the damping motor keeps pace with the expected real-time inertia force compensation angle in real time.

5. The active compensation algorithm for the inertia force of the on-board equipment according to claim 4, wherein the trajectory planning step comprises the following specific step: acquiring a maximum turning angle of the damped target in an inertia force compensation stage to plan a trajectory within a preset time by taking the maximum turning angle as an initial point and a zero angle as an endpoint.

6. The active compensation algorithm for the inertia force of the on-board equipment according to claim 4, wherein the PI control step comprises the following specific step: tracking the angle of the damping motor, wherein by taking position information of a motor encoder as a feedback signal, the damping motor keeps pace with the expected real-time inertia force compensation angle by adjusting a proportional integral parameter.

7. The active compensation algorithm for the inertia force of the on-board equipment according to claim 4, further comprising a turning type detection step, wherein the turning type detection step comprises: detecting a turning type of the vehicle, the turning type comprising general turning, consecutive turning, and S turning; wherein the general turning is turning within 90 degrees, the consecutive turning is turning consecutively within 3 seconds in a same direction, and the S turning is turning consecutively within 3 seconds in different directions;

when the turning is the consecutive turning, plus and minus signs of the normalized value calculated in a compensation angle calculation step are same within a preset time;

when the turning is the S turning, plus and minus signs of the normalized value calculated in the compensation angle calculation step are opposite within the preset time; and when the turning is the general turning, the normalized value calculated in the compensation angle calculation step appears only once within the preset time.

8. The active compensation algorithm for the inertia force of the on-board equipment according to claim 2, wherein the compensation angle acquisition step comprises the following steps:

step a1: acquiring lateral acceleration information, normal angular velocity information and velocity information of the vehicle in an inertial space;

step a2: filtering high frequency noise of the information acquired in the step a1, and normalizing the filtered information to obtain a normalized value; and step a3: acquiring the expected real-time inertia force compensation angle of the damped target according to a mapping relation among the normalized value in the step a2, the vehicle velocity and the inertia force compensation angle, wherein the information comprises the velocity information, the acceleration information, and the angular velocity information.

9. The active compensation algorithm for the inertia force of the on-board equipment according to claim 5, wherein in the step a2, the high frequency noise of the acquired information is filtered by a finite impulse response (FIR) digital filter to obtain filtered information, and the filtered information is normalized by a fusion algorithm;

in the step a3, the mapping relation is a mapping model based on a wavelet neural network;

the wavelet neural network model is set as a three-layered network, comprising an input layer, a hidden layer, and an output layer, respectively;

there are 3 nodes in the input layer of the wavelet neural network: vehicle velocity $x_1$, normalized value $x_2$, and error feedback value $x_3$, respectively; there are 4 nodes in the hidden layer of the wavelet neural network; and there is one node in the output layer of the wavelet neural network: the inertia force compensation angle;

an output formula of the wavelet neural network model is as follows:

$$y = \sum_{j=1}^{4} w_j \left\{ 1 - \frac{1}{b_j^2}\left[\left(\sum_{i=1}^{3} w_{ij} x_i\right) - a_j\right]^2 e^{-\frac{\frac{1}{b_j^2}\left[\left(\sum_{i=1}^{3} w_{ij} x_i\right) - a_j\right]^2}{2}} \right\},$$

wherein $a_j$ and $b_j$ are a compression and stretching factor and a translational factor of a wavelet basis function, respectively, $w_{ij}$ is a weight from an $i^{th}$ node of the input layer to a $j^{th}$ node of the hidden layer, $w_j$ is a weight from the $j^{th}$ node of the hidden layer to the output layer, and y is the inertia force compensation angle; and in the step a3, when an absolute value of the normalized value is greater than a preset threshold, the inertia force compensation angle of the damping motor is calculated; and when the absolute value of the normalized value is less than or equal to the preset threshold, the inertia force compensation angle of the damping motor is not calculated.

10. The active compensation algorithm for the inertia force of the on-board equipment according to claim 2, wherein the damped target is a seat, and the seat is provided with a seat damping mechanism;

the seat damping mechanism comprises a passive damping mechanism, an active stabilizing mechanism and a rotary slip anti-impact mechanism arranged from top to bottom in sequence, and a seat surface is mounted above the passive damping mechanism;

the passive damping mechanism drives the seat surface to be compressed or released in a direction perpendicular to the seat surface, so as to absorb a force in the direction perpendicular to the seat surface;

the active stabilizing mechanism drives the passive damping mechanism and the seat surface to perform a roll motion, so as to compensate the centrifugal force; and the rotary slip anti-impact mechanism drives the active stabilizing mechanism, the passive damping mechanism, and the seat surface to slide in a horizontal plane, so as to absorb the inertia force.

11. The active compensation algorithm for the inertia force of the on-board equipment according to claim 10, wherein in the seat damping mechanism, the passive damping mechanism comprises a damping seat mounting plate, a damping base, an internal intersecting arm, an external intersecting arm, and an elastic assembly;

the internal intersecting arm and the external intersecting arm are arranged between the damping seat mounting plate and the damping base, a middle portion of the internal intersecting arm is rotatably connected to a middle portion of the external intersecting arm, a lower end of the internal intersecting arm is rotatably connected to the damping base, an upper end of the internal intersecting arm is slidably connected to the damping seat mounting plate, a lower end of the external intersecting arm is slidably connected to the damping base, and an upper end of the external intersecting arm is rotatably connected to the damping seat mounting plate;

the elastic assembly acts on the internal intersecting arm and/or the external intersecting arm, and an elastic action direction of the elastic assembly is the direction perpendicular to the seat surface;

the elastic assembly comprises a magnetorheological damper and an elastic part, wherein an elastic action direction of the elastic part is the direction perpendicular to the seat surface, the magnetorheological damper acts on the internal intersecting arm and/or the external intersecting arm, and an elastic action direction of the magnetorheological damper intersects with the elastic action direction of the elastic part;

the damping base is provided with a displacement sensor for measuring a vertical distance between the damping base and the damping seat mounting plate, and the damping seat mounting plate is provided with a weight sensor for measuring a weight of an object on the damping seat mounting plate;

the active stabilizing mechanism comprises a stabilizing mechanism mounting plate, a roll output plate, a driving assembly, and a master control module, wherein the roll output plate and the driving assembly both are mounted on the stabilizing mechanism mounting plate, wherein the master control module comprises an attitude sensor and a motor driver;

an output shaft of the driving assembly is horizontally arranged, the roll output plate is tightly connected to the output shaft of the driving assembly, and the passive damping mechanism is mounted on the roll output plate;

the master control module collects attitude data of the vehicle body, and controls the driving assembly through the attitude data of the vehicle body to drive the roll output plate to rotate; and the active stabilizing mechanism further comprises a limiting buffer pad, and the limiting buffer pad defines a rotating range of the roll output plate to be ±30°.

12. The active compensation algorithm for the inertia force of the on-board equipment according to claim 10, wherein in the seat damping mechanism, the rotary slip anti-impact mechanism comprises an overall mechanism base, a seat sliding bottom plate, a position adjusting assembly, and a buffer assembly;

the seat sliding bottom plate is slidably mounted on the overall mechanism base, the position adjusting assembly adjusts relative positions of the seat sliding bottom plate and the overall mechanism base, and the buffer assembly inhibits relative motions of the seat sliding bottom plate and the overall mechanism base;

the position adjusting assembly comprises two ball screw structures, wherein the two ball screw structures are parallelly mounted on two opposite sides of the seat sliding bottom plate respectively and slidably connected to the overall mechanism base;

the buffer assembly comprises a plurality of buffer parts, wherein a direction of an action force of each buffer part of the plurality of buffer parts is parallel to a moving direction of each of the ball screw structures;

a first end of each buffer part is fixedly connected to the overall mechanism base, and a second end of each buffer part is fixedly connected to the seat sliding bottom plate and/or the position adjusting assembly; and the rotary slip anti-impact mechanism comprises a rotating assembly, wherein the rotating assembly comprises a seat rotating bottom plate, a rotary locking hook and a locking hook top plate, the seat rotating bottom plate is rotatably connected to the seat sliding bottom plate, and the locking hook top plate acts on the rotary locking hook to lock the seat rotating bottom plate and the seat sliding bottom plate or separate the seat rotating bottom plate and the seat sliding bottom plate.

13. The active compensation algorithm for the inertia force of the on-board equipment according to claim 1, wherein the compensation angle acquisition step comprises the following steps:

step S1: collecting, by a sensor module, a transverse acceleration and a longitudinal acceleration of a body in real time, wherein the sensor module comprises an inertial measurement unit (IMU); and step S2: establishing a dynamics model of the damped target, calculating an expected control target of a rotary driving assembly relative to the transverse acceleration and the longitudinal acceleration according to the dynamics model, and acquiring the expected real-time inertia force compensation angle when the vehicle takes the sudden turn.

14. The active compensation algorithm for the inertia force of the on-board equipment according to claim 13, wherein the control step is step S3, comprising the following step: controlling the rotary driving assembly based on the expected control target by adopting a model predictive control (MPC) algorithm.

15. The active compensation algorithm for the inertia force of the on-board equipment according to claim 14, wherein the step S3 comprises the following steps:

step S3.1: rotating a first driving assembly and a second driving assembly according to a control decision module, wherein the control decision module comprises the controller; and step S3.2: adjusting the control decision module in real time according to an attitude angle of the stretcher body relative to a vehicle body acquired by the sensor module in real time to track an expected trajectory;

the step S3.2 comprises the following steps:

step S3.2.1: establishing a dynamics equation of an axis of motion of a first rotary driving assembly and a dynamics equation of an axis of motion of a second rotary driving assembly, and constructing a target function according to an error between a predicted output and a real output of a system; and step S3.2.2: setting rotation range constraints of the first rotary driving assembly and the second rotary driving assembly, and calculating control input quantities of the first rotary driving assembly and the second rotary driving assembly under the rotation range constraints;

the dynamics equation of the axis of motion of the first rotary driving assembly is:

$$J(\alpha_h)\ddot{\alpha}_h+C(\alpha_h,\dot{\alpha}_h)\dot{\alpha}_h+G(\alpha_h)=B(\alpha_h)u_\alpha,$$

the dynamics equation of the axis of motion of the second rotary driving assembly is:

$$J(\beta_h)\ddot{\beta}_h+C(\beta_h,\dot{\beta}_h)\dot{\beta}_h+G(\beta_h)=B(\beta_h)u_\beta,$$

Wherein $u_\alpha$ is a driving force of the first rotary driving assembly, and $u_\beta$ is a driving force of the second rotary driving assembly; $J(\alpha_h)$ and $J(\beta_h)$ are respectively moment of inertia of the axis of motion of the first rotary driving assembly and moment of inertia of the axis of motion of the second rotary driving assembly, $C(\alpha_h,\dot{\alpha}_h)$ and $C(\beta_h,\dot{\beta}_h)$ are Coriolis force, centrifugal force, and frictional force matrixes of the first rotary driving assembly and the second rotary driving assembly, $G(\alpha_h)$ and $G(\beta_h)$ are gravity matrixes of the first rotary driving assembly and the second rotary driving assembly, and $B(\alpha_h)$ and $B(\beta_h)$ are input matrixes of the first rotary driving assembly and the second rotary driving assembly; the target function is constructed in the following way:

the pitch angle $\beta_h$ and the roll angle $\alpha_h$ of the stretcher body are made accurate by controlling $u_\alpha$ and $u_\beta$, so that the control target is an expected tracking target;

the dynamics equations are discretized using Forward Euler method to obtain:

$$\beta_h(k+1)=A_\beta(k)\beta_h(k)+B_\beta(k)u_\beta(k),$$

$$\alpha_h(k+1)=A_\alpha(k)\alpha_h(k)+B_\alpha(k)u_\alpha(k),$$

wherein $A_\beta(k)$, $B_\beta(k)$, $A_\alpha(k)$ and $B_\alpha(k)$ are corresponding coefficient matrixes;

the target function is constructed as follows according to the error between the predicted output and the real output of the system:

$$J(k)=\sum_{i=1}^{N_P}[\hat{\theta}(k+i|k)-\hat{\theta}_r(k+i|k)]^T Q(k)[\hat{\theta}(k+i|k)-\hat{\theta}_r(k+i|k)]+\sum_{i=1}^{N_C-1}[\Delta u(k+i|k)]^T R(k)[\Delta u(k+i|k)]+\rho\varepsilon^2,\ \theta=\beta_h \text{ or } \alpha_h,$$

wherein $N_p$ is a predicted time domain, $N_c$ is a control time domain, Q is an error weight matrix of a control system, R is a control weight matrix of the control system, p is a weight coefficient, and ε is a relaxing factor; $\hat{\theta}(k+i|k)$ is an estimated value of θ on a time k+i at a time k, $\hat{\theta}_r(k+i|k)$ is a reference estimated value of θ on the time k+i at the time k, and Au(k+i|k) is a control quantity on the time k+i at the time k;

the step S3.2 comprises the following steps:

setting motion constraints of the rotary driving assemblies as follows:

$$\begin{cases}\theta_{min}(k)\le\theta(k)\le\theta_{max}(k)\\ \Delta u_{min}(k)\le\Delta u(k)\le\Delta u_{max}(k)\end{cases},$$

wherein k=0, 1, . . . , $N_c-1$; $\theta_{min}(k)$ and $\theta_{max}(k)$ are respectively a minimum value and a maximum value of an output, and $\Delta u_{min}(k)$ and $\Delta u_{max}(k)$ are respectively a minimum value and a maximum value of a corresponding control quantity;

converting control quantity solving into solving of the following optimized problems:

$$\min J(k)$$

s.t.

$$\theta(k+1)=A(k)\theta(k)+B(k)u(k),\ k=0,1,N_{c-1}$$

$$\theta(k|k)=\theta_0(k)$$

$$\theta_{min}(k)\le\theta(k)\le\theta_{max}(k)$$

$$\Delta u_{min}(k)\le\Delta u(k)\le\Delta u_{max}(k),$$

solving the above formula at a sampling time once, wherein a series of control input increments in the control time domain obtained are:

$$\Delta U_t^*=[\Delta u_t^*,\Delta u_{t+1}^*,\ldots,\Delta u_{t+N_{c-1}}^*]^T,$$

and applying the first element in the control sequence as the actual control input increment to the system, i.e., $$u(t)=u(t-1)+\Delta u_t^*.$$

16. The active compensation algorithm for the inertia force of the on-board equipment according to claim 13, wherein the damped target is a stretcher, and the step S2 comprises the following step:

setting a pitch angle of an upper table top of the stretcher relative to a base to be $\beta_h$, and a roll angle to be $\alpha_h$; then $$\tan(\beta_h+\beta_e)=\frac{F}{G}=\frac{a_y}{g},$$

wherein G is the gravity acting on a patient, F is a longitudinal impact force acting on the patient lying on the stretcher, $a_y$ is a longitudinal acceleration acting on a compartment, $\beta_e$ is a pitch angle of the body relative to the ground, and from the above formula, an expected value of $\beta_h$ is $$\beta_{hd}=\arctan\left(\frac{a_y}{g}-\beta_e\right),$$

in a similar way, an expected value $\alpha_{hd}$ and of a roll angle of a stretcher body is $$\alpha_{hd}=\arctan\left(\frac{a_y}{g}-\alpha_e\right),$$

wherein $\alpha_e$ is the roll angle of the body relative to the ground.

17. The active compensation algorithm for the inertia force of on-board equipment according to claim 13, wherein the damped target is a stretcher;

the stretcher comprises a base, a stretcher body, the sensor module, a control decision module, a passive damping module, a first rotary driving assembly, and a second rotary driving assembly, wherein the sensor module comprises the inertial measurement unit (IMU), and the control decision module comprises the controller;

the sensor module is arranged on the base to acquire acceleration data and an attitude angle of the base;

the first rotary driving assembly is fixedly arranged on the base, the second rotary driving assembly is fixedly arranged on a driving shaft of the first rotary driving assembly, the driving shaft of the first rotary driving assembly and the driving shaft of the second rotary driving assembly are connected in series and orthogonally arranged, and the driving shaft of the second rotary driving assembly is connected to the stretcher body through the passive damping module;

the control decision module is electrically connected to the sensor module, the first rotary driving assembly and the second rotary driving assembly, and the first rotary driving assembly and the second rotary driving assembly adjust an attitude of a seat body according to swing data;

the passive damping module uses an air bag; and the damping stretcher further comprises a fuse device, wherein the fuse device is electrically connected to the first rotary driving assembly and the second rotary driving assembly for overload protection.

18. A damping device, adopting an active compensation algorithm for an inertia force of on-board equipment, comprising a first rotating assembly and a second rotating assembly, wherein the first rotating assembly is adapted to be mounted on carrying equipment, the second rotating assembly is mounted at a driving end of the first rotating assembly, and the first rotating assembly and the second rotating assembly are configured to drive the damped target to perform roll and pitch motions;

when the first rotating assembly drives the damped target to perform the roll motion, the second rotating assembly drives the damped target to perform the pitch motion; or when the first rotating assembly drives the damped target to perform the pitch motion, the second rotating assembly drives the damped target to perform the roll motion, wherein the active compensation algorithm for the inertia force of the on-board equipment, comprising the following steps:

a compensation angle acquisition step: acquiring an expected real-time inertia force compensation angle of a damped target when a vehicle takes a sudden turn or emergency braking based on velocity information, acceleration information, and angular velocity information of a vehicle chassis; and a control step: adjusting an angle of a damping motor by adopting a control algorithm according to the expected real-time inertia force compensation angle, wherein the damping motor keeps pace with the expected real-time inertia force compensation angle in real time, wherein the compensation angle acquisition step comprises the following steps:

step S1: collecting, by a sensor module, a transverse acceleration and a longitudinal acceleration of a body in real time, wherein the sensor module comprises an inertial measurement unit (IMU); and step S2: establishing a dynamics model of the damped target, calculating an expected control target of a rotary driving assembly relative to the transverse acceleration and the longitudinal acceleration according to the dynamics model, and acquiring the expected real-time inertia force compensation angle when the vehicle takes the sudden turn.

19. The damping device according to claim 18, wherein the first rotating assembly is an active roll damping device, and the second rotating assembly is an active pitch damping device;

the damping device further comprises:

a movable platform, connected to the damped target, wherein a top end of the active pitch damping device is fixedly mounted on the movable platform, and the movable platform is detachably mounted on the damped target;

a bottom platform, wherein the active pitch damping device is fixed on the bottom plate; the active pitch damping device comprises a pitch motor; the bottom platform is adapted to be mounted on the carrying equipment; and a slide rail is arranged under the bottom platform and is used for adjusting a distance between the bottom platform and the carrying equipment;

the active roll damping device, arranged on the active pitch damping device and driven by the pitch motor to rotate around a rotating shaft of the pitch motor, wherein the active roll damping device comprises a roll motor for driving the active roll damping device to rotate;

a damping output device, wherein the damping output device comprises a guide pillar and an output support, wherein the output support is fixed on the active roll damping device, and the output support is internally provided with a guide hole;

the guide pillar passes through the guide hole and is connected to the movable platform;

the damping device further comprises a sensing module and a control module, wherein the sensing module is configured to acquire motion data of the carrying equipment, and the control module is configured to receive the data of the sensing module and to control motion parameters of the damping device;

the sensing module comprises an attitude sensor, and the control module comprises a master control panel and a motor driver;

the attitude sensor is electrically connected to the master control panel and is configured to detect the acceleration of the damped target to generate an acceleration signal and transmit the acceleration signal to the master control panel, and the master control panel controls the motor driver according to the acceleration signal to drive the pitch motor and the roll motor to operate;

when the attitude sensor detects a linear acceleration of the damped target, the master control panel controls the motor driver according to the linear acceleration to drive the pitch motor to operate;

when the attitude sensor detects a centripetal acceleration of the damped target, the master control panel controls the motor driver according to the centripetal acceleration to drive the roll motor to operate;

the sensing module, the control module, and the damping device form a self-balancing damping device, and the damped target is arranged on the self-balancing damping device, wherein the active pitch damping device further comprises a pitch decelerator support, a pitch decelerator, a pitch motion output support, and a bearing pedestal;

the pitch decelerator support is fixed on the bottom platform;

a first end of the pitch decelerator support is connected to the pitch motor, and a second end of the pitch decelerator support is connected to the pitch decelerator;

a first end of the pitch motion output support is connected to the pitch decelerator, and a second end of the pitch motion output support is connected to the bearing pedestal; and the bearing pedestal is fixed on the bottom platform;

the pitch motion output support comprises a pitch mounting base and a motor mounting block;

a first end of the pitch mounting base is fixedly mounted on the pitch decelerator, and a second end of the pitch mounting base extends outwards along a center of the pitch mounting base to form the motor mounting block; and the pitch mounting base and the motor mounting block form a T-shaped structure;

a roll device mounting hole is formed at a center of the motor mounting block, and the active roll damping device is mounted on the pitch motion output support through the roll device mounting hole;

the active pitch damping device further comprises pitch anti-collision blocks and a pitch anti-collision pad;

the pitch anti-collision pad is mounted on the bottom platform and is located below the pitch decelerator support;

the pitch anti-collision blocks are mounted on both sides of the pitch motion output support, and rotate along with rotation of the active pitch damping device;

when the pitch anti-collision blocks impact to the pitch anti-collision pad in a rotating process, the pitch anti-collision pad is matched with the pitch anti-collision blocks to limit further rotation of the active pitch damping device;

the active roll damping device further comprises a roll decelerator and a roll motion output support, wherein a first side of the roll motion output support is connected to the output support, and a second side of the roll motion output support is connected to the roll decelerator; and a first side of the roll decelerator is connected to the roll motion output support, and a second side of the roll decelerator is connected to the pitch motion output support;

the roll motion output support comprises a mounting base and an output connecting block, wherein a first side of the mounting base is connected to the output connecting block, and a second side of the mounting base is connected to the roll decelerator; and a first end of the output connecting block is connected to the mounting base, and a second end of the output connecting block is connected to the output support;

the active roll damping device further comprises a damper, wherein a first end of the damper is connected to the output connecting block, and a second end of the damper is connected to the movable platform through a revolute pair;

the roll motion output support further comprises a roll anti-collision block and a roll anti-collision pad, wherein the roll anti-collision pad is arranged on a side, adjacent to the damping output device, of the pitch motion output support;

the roll anti-collision block is arranged on a side surface of the mounting base, and rotates along with rotation of the roll motor, when the roll anti-collision block impacts to the roll anti-collision pad in a rotating process, the roll anti-collision pad limits further rotation of the active roll damping device;

an axis of rotation of the pitch motor perpendicularly intersects with an axis of rotation of the roll motor all along;

a ball guide sleeve is arranged between the output support and the guide pillar;

the output support moves up and down along the guide pillar through the ball guide sleeve; and both ends of the guide pillar are provided with limiting bosses, and when the output support impacts to the limiting bosses in the up-down moving process, the limiting bosses limit further movement of the output support towards an edge of the guide pillar.

20. The damping device according to claim 19, further comprising a passive damping device, wherein the passive damping device is an elastic damping assembly;

a top end of the elastic damping assembly is mounted on the movable platform, and a bottom end of the elastic damping assembly is fixed on the bottom platform for applying an action force to the damped target in a height direction;

the elastic damping assembly comprises an air spring, wherein a first end of the air spring is arranged on the movable platform, and a second end of the air spring is arranged on the bottom platform;

the elastic damping assembly further comprises an air pump, wherein the air pump is connected to the air spring, the air pump is further connected to the control module, and the control module is configured to control work of the air pump based on data of the sensing module, so as to control the air spring to drive the damped target to move in the height direction;

the air pump is arranged on the bottom plate and is connected to the air spring through a gas pipeline for maintaining a pressure of the air spring;

the sensing module comprises an air pressure sensor, wherein the air pressure sensor is arranged in the air spring, the control module comprises an automatic air pressure inflating control panel, and the air pressure sensor is electrically connected to the automatic air pressure inflating control panel;

when the air pressure sensor detects that an air pressure in the air spring is lower than a preset air pressure, the automatic air pressure inflating control panel controls the air pump to inflate the air spring through the gas pipeline;

there are four elastic damping assemblies located at four corners of the movable platform, respectively;

the passive damping device further comprises an air spring bottom pillar arranged on the bottom platform for fixedly connecting the air spring and the bottom platform;

the gas pipeline is connected to the air spring through the air spring bottom pillar;

the damping device further comprises a telescopic rod, wherein a first end of the telescopic rod is connected to the damped target, and a second end of the telescopic rod is connected to a plane where the damping device is mounted for controlling the damped target to move within a limited range in a process that the damping device controls the damped target to move; and the telescopic rod is located on an outer side of a driving end of the second rotating assembly, and the damped target is provided with a mounting plate in a position corresponding to the telescopic rod for fixing the first end of the telescopic rod, wherein the first end of the telescopic rod faces the damped target.

* * * * *